US010738243B2

(12) United States Patent
Junge et al.

(10) Patent No.: US 10,738,243 B2
(45) Date of Patent: Aug. 11, 2020

(54) LIQUID-CRYSTALLINE MEDIUM AND LIQUID-CRYSTAL DISPLAY

(71) Applicant: MERCK PATENT GMBH, Darmstadt (DE)

(72) Inventors: Michael Junge, Pfungstadt (DE); Volker Reiffenrath, Rossdorf (DE); Elvira Montenegro, Weinheim (DE); Michael Wittek, Erzhausen (DE); Markus Czanta, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/202,126

(22) Filed: Jul. 5, 2016

(65) Prior Publication Data
US 2017/0002269 A1 Jan. 5, 2017

(30) Foreign Application Priority Data

Jul. 3, 2015 (DE) .................. 10 2015 008 508
Mar. 2, 2016 (DE) .................. 10 2016 002 502

(51) Int. Cl.
C09K 19/30 (2006.01)
C09K 19/58 (2006.01)
(Continued)

(52) U.S. Cl.
CPC ............ C09K 19/588 (2013.01); C09K 19/20 (2013.01); C09K 19/3001 (2013.01); C09K 19/3066 (2013.01); C09K 19/3402 (2013.01); C09K 19/54 (2013.01); C09K 19/586 (2013.01); G02F 1/1362 (2013.01); C09K 2019/0466 (2013.01); C09K 2019/123 (2013.01); C09K 2019/301 (2013.01); C09K 2019/3004 (2013.01); C09K 2019/3009 (2013.01);
(Continued)

(58) Field of Classification Search
CPC ..................................... C09K 19/44
See application file for complete search history.

(56) References Cited

U.S. PATENT DOCUMENTS 6,444,278 B1 * 9/2002 Reiffenrath ............. C07B 63/04
252/299.5
9,234,135 B2 1/2016 Archetti et al.
(Continued)

FOREIGN PATENT DOCUMENTS

DE 19539141 A1 4/1997
DE 102011108276 A1 2/2012
(Continued)

OTHER PUBLICATIONS

European Search Report for EP16001302 dated Nov. 23, 2016.
(Continued)

Primary Examiner — Chanceity N Robinson
(74) Attorney, Agent, or Firm — Millen White Zelano and Branigan, PC

(57) ABSTRACT

The present invention relates to dielectrically positive liquid-crystalline media comprising one or more compounds of the formula I,

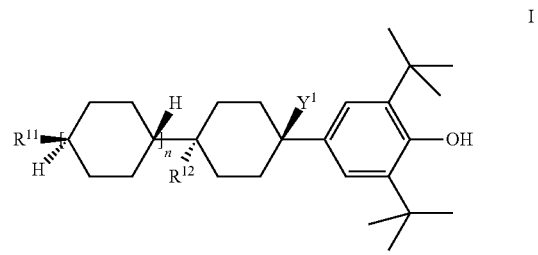

and one or more compounds selected from the group of the compounds of the formulae II and III and/or IV,

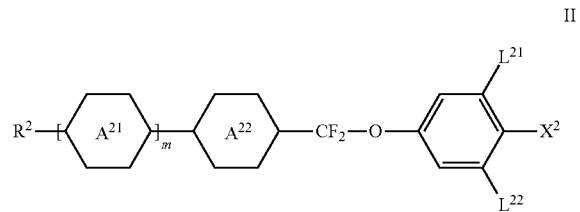

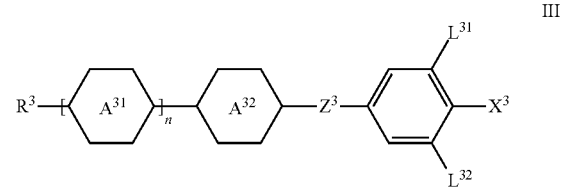

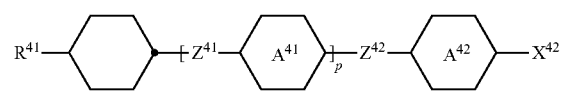

in which the parameters have the respective meanings indicated in the specification, and optionally one or more further dielectrically positive compounds and optionally one or more further dielectrically neutral compounds, and to liquid-crystal displays, especially active-matrix displays and in particular TN, IPS and FFS displays, containing these media.

15 Claims, No Drawings

(51) Int. Cl.
*C09K 19/54* (2006.01)
*C09K 19/20* (2006.01)
*C09K 19/34* (2006.01)
*G02F 1/1362* (2006.01)
*C09K 19/04* (2006.01)
*C09K 19/12* (2006.01)

(52) U.S. Cl.
CPC ............... *C09K 2019/3016* (2013.01); *C09K 2019/3025* (2013.01); *C09K 2019/3422* (2013.01)

(56) References Cited

U.S. PATENT DOCUMENTS

| | | |
|---|---|---|
| 9,249,355 B2 | 2/2016 | Archetti et al. |
| 9,376,622 B2 | 6/2016 | Hirschmann et al. |
| 9,737,854 B2 | 8/2017 | Kaetzel |
| 2013/0148069 A1 | 6/2013 | Archetti et al. |
| 2013/0182202 A1* | 7/2013 | Graziano ............... C09K 19/42 349/86 |
| 2013/0207038 A1 | 8/2013 | Haensel |
| 2013/0314655 A1 | 11/2013 | Archetti et al. |
| 2015/0315472 A1* | 11/2015 | Hirschmann ...... C09K 19/3444 252/299.61 |

FOREIGN PATENT DOCUMENTS

| | | | |
|---|---|---|---|
| DE | 102011108708 A1 | 3/2012 | |
| DE | 102012000632 A1 | 8/2012 | |
| DE | 102013021279 A1 | 6/2015 | |
| EP | 2652088 B1 * | 10/2014 | ......... C09K 19/3402 |
| WO | 2012079710 A1 | 6/2012 | |
| WO | 2014094999 A1 | 6/2014 | |

OTHER PUBLICATIONS

English Abstract for WO2012079710, Publication Date: Jun. 21, 2012.

Office Action in corresponding EP application No. 16001302.5 dated Nov. 14, 2018 (pp. 1-5).

* cited by examiner

LIQUID-CRYSTALLINE MEDIUM AND LIQUID-CRYSTAL DISPLAY

FIELD OF THE INVENTION

The present invention relates to liquid-crystalline media and to liquid-crystal displays containing these media, especially to displays addressed by an active matrix and in particular to displays of the twisted nematic (TN), in-plane switching (IPS) or fringe-field switching (FFS) type.

STATE OF THE ART AND PROBLEM TO BE SOLVED

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is substantially perpendicular to the substrates or the liquid-crystal layer. Besides these modes, there are also electro-optical modes that utilise an electric field which is substantially parallel to the substrates or the liquid-crystal layer, such as, for example, the in-plane switching (IPS) mode (as disclosed, for example, in DE 40 00 451 and EP 0 588 568) and the fringe-field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and are intended for use in displays for TV sets and multimedia applications. The liquid crystals in accordance with the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The addressing times in particular have to be improved for many types of application. Thus, liquid-crystalline media having lower viscosities ($\eta$), especially having lower rotational viscosities ($\gamma_1$), are required. In particular for monitor applications, the rotational viscosity should be 80 mPa·s or less, preferably 60 mPa·s or less and especially 55 mPa·s or less. Besides this parameter, the media must have a nematic phase range of suitable width and position and an appropriate birefringence ($\Delta n$). In addition, the dielectric anisotropy ($\Delta\varepsilon$) should be sufficiently high to allow a fairly low operating voltage. $\Delta\varepsilon$ should preferably be greater than 2 and more preferably greater than 3, but preferably not greater than 20 and in particular not greater than 17, as this would prevent an at least fairly high resistivity.

For applications as displays for notebooks or other mobile applications, the rotational viscosity should preferably be 120 mPa·s or less and particularly preferably 100 mPa·s or less. The dielectric anisotropy ($\Delta\eta$) here should preferably be greater than 8 and particularly preferably greater than 12.

The displays in accordance with the present invention are preferably addressed by an active matrix (active-matrix LCDs, AMDs for short), preferably by a matrix of thin-film transistors (TFTs). However, the liquid crystals according to the invention can also advantageously be used in displays having other known addressing means.

There are numerous different display modes which use composite systems of low-molecular-weight liquid-crystal materials together with polymeric materials. These are, for example, polymer dispersed liquid crystal (PDLC), nematic curvilinearly aligned phase (NCAP) and polymer network (PN) systems, as disclosed, for example, in WO 91/05 029, or axially symmetric microdomain (ASM) systems and others. In contrast to these, the modes that are especially preferred in accordance with the present invention use the liquid-crystal medium as such, oriented on surfaces. These surfaces are typically pretreated in order to achieve uniform alignment of the liquid-crystal material. The display modes in accordance with the present invention preferably use an electric field which is substantially parallel to the composite layer.

Liquid-crystal compositions which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these compositions have severe disadvantages. Amongst other deficiencies, most of them result in disadvantageously long addressing times, have inadequate values of the resistivity and/or require excessively high operating voltages. In addition, there is a need to improve the low-temperature behaviour of LCDs. Both an improvement in the operating properties and also in the shelf life and, in particular, in the stability to visible light and UV radiation, but also to heat and, in particular, to a combination of heat and light and/or UV radiation, are necessary here.

This relates not only to the usual life cycle of the displays, but also to individual steps in the production of the displays in which these are subjected to in some cases extreme loads compared with normal operation. Thus, for example, a process is frequently employed in the production of the bonding of the frame which causes very high thermal loads of the displays which already contain the liquid crystal. In order that the liquid crystal survives this strong thermal load as far as possible without damage, it is advantageous correspondingly to add one or more thermal stabilisers to the liquid-crystal formulation. In subsequent everyday operation of the displays, loads due to the light of the backlighting and due to the ambient light, typically daylight, and temperature loads from the environment may then occur as important load factors. This means that, in particular, the combination of various load quantities may have particular importance in practice.

Such a combination of various loads may occur both in a sequential time sequence and also in parallel in time. Thus, for example, displays which are used as electronic advertising panels may simultaneously be subjected to strong heating and insolation during operation and in the rest state, depending on the set-up location.

The compound hexadecyl 3,5-di-tert-butyl-4-hydroxybenzoate (also known as "Cyasorb UV 2908"), of the following formula:

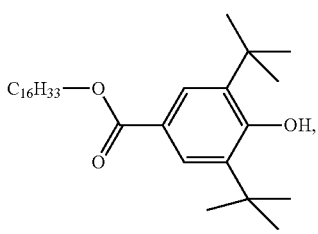

and 2,4-di-tert-butylphenyl 3,5-di-tert-butyl-4-hydroxybenzoate (also known as "Tinuvin® 120 UVA-3"), of the following formula:

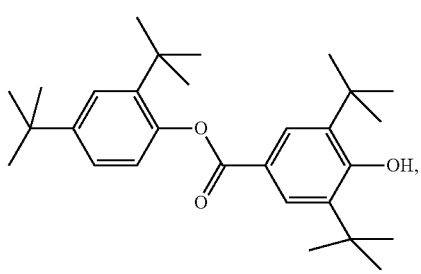 [SMILES: CC(C)(C)c1ccc(OC(=O)c2cc(C(C)(C)C)c(O)c(C(C)(C)C)c2)c(C(C)(C)C)c1]

are described in Jan Pospisil: "Polymer Degradation and Stability" 40, (1993), page 217 ff. for improving the photostability of phenols.

The compound of the formula

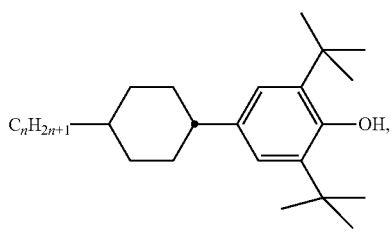

which has a significantly more pronounced mesogenic character than the prior-art compounds described above, is proposed in DE 19539141 for the stabilisation of nematic liquid-crystal mixtures. This compound has a reduced adverse effect on the properties of the material compared with the prior art of the time. However, even this is no longer acceptable given the significantly increased demands now made of the quality and durability of the products, and must be reduced further.

Many liquid-crystal media, particularly those having large polarities or high dielectric anisotropy, do not meet the high stability requirements necessary for practical applications.

There is therefore a considerable demand for liquid-crystalline media having suitable properties for practical applications, such as a broad nematic phase range, suitable optical anisotropy Δn corresponding to the display type used, a high Δε and particularly low viscosities for particularly short response times.

PRESENT INVENTION

Surprisingly, it has now been found that it is possible to achieve liquid-crystalline media having a suitably high Δε, a suitable phase range and suitable Δn which do not have the disadvantages of the materials from the prior art, or at least only do so to a significantly reduced extent.

Surprisingly, it has been found here that the compounds of the formula I, as indicated below, result in considerable, in most cases adequate, stabilisation of liquid-crystal mixtures and in particular in combination with other stabilisers, in particular with ortho-(tert-butyl)phenol derivatives or di-ortho(tert-butyl)phenol derivatives, i.e. compounds which contain a structural element of the formula

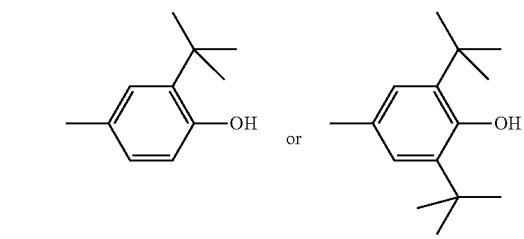 [SMILES: Cc1ccc(O)c(C(C)(C)C)c1 ; Cc1cc(C(C)(C)C)c(O)c(C(C)(C)C)c1]

and/or compounds which contain a structural element of the formula

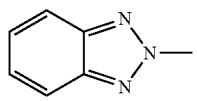

where these structural elements may optionally carry further substituents, preferably alkyl or halogen. Compounds of this type, for example Tinuvin®-P, are triplet quenchers and correspondingly have a photo-stabilising action.

The invention relates to a liquid-crystalline medium having a nematic phase and positive dielectric anisotropy which comprises
a) one or more compounds of the formula I, preferably in a concentration in the range from 1 ppm to 25,000 ppm,

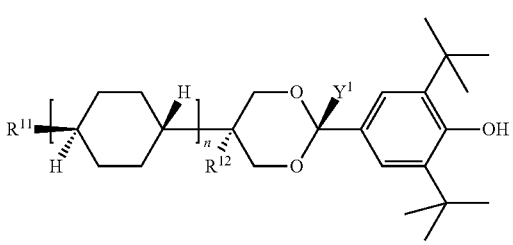

in which
n denotes 0 or 1,
$R^{11}$ denotes H, F, Cl, a straight-chain or branched alkyl chain having 1-20 C atoms, in which one —$CH_2$— group or a plurality of —$CH_2$— groups may be replaced by —O—, —C(=O)— or

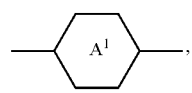

but two adjacent —$CH_2$— groups cannot be replaced by —O—, a hydrocarbon radical which contains a cycloalkanediyl unit, preferably a cyclohexanediyl unit, or an alkylcycloalkanediyl unit, and in which one —CH$_2$— group or a plurality of —CH$_2$— groups may be replaced by —O— or —C(=O)—, but two adjacent —CH$_2$— groups cannot be replaced by —O—, R$^{12}$ denotes H, F, Cl, CN, CF$_3$, OCF$_3$ or a straight-chain or branched alkyl chain having 1-20 C atoms, in which one —CH$_2$— group or a plurality of —CH$_2$— groups may be replaced by —O— or —C(=O)—, but two adjacent —CH$_2$— groups cannot be replaced by —O—, preferably H, F, Cl, or a straight-chain or branched alkyl chain having 1-20 C atoms, in which one —CH$_2$— group or a plurality of —CH$_2$— groups may be replaced by —O— or —C(=O)—, particularly preferably H or CH$_3$, Y$^1$ denotes H, F, Cl, CN, CF$_3$, OCF$_3$ or a straight-chain or branched alkyl chain having 1-20 C atoms, in which one —CH$_2$— group or a plurality of —CH$_2$— groups may be replaced by —O— or —C(=O)—, but two adjacent —CH$_2$— groups cannot be replaced by —O—, preferably H or CH$_3$, and

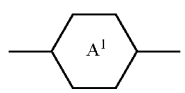

on each appearance, independently of one another, denotes

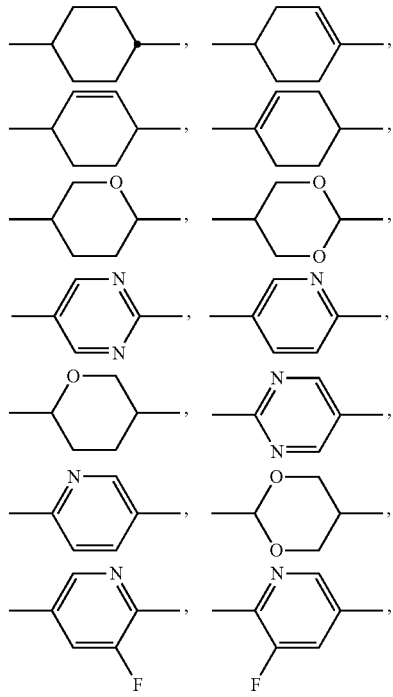

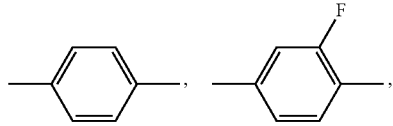

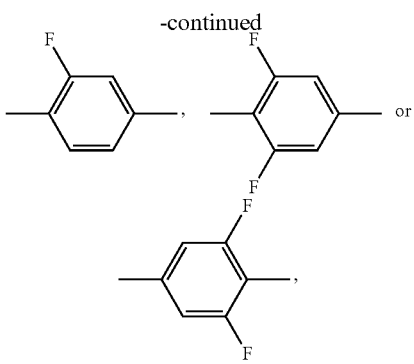

where, in the case of cyclohexanediyl and in the case of the cyclohexenediyl units, one or more, preferably axial, H atoms may also be replaced, independently of one another, by F, Cl or CN, preferably by F or CN, particularly preferably by F, and b) one or more compounds selected from the group of the compounds of the formulae II and III

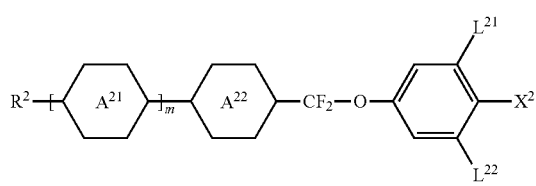

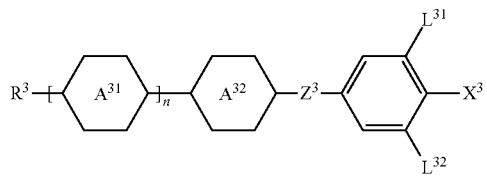

in which

R$^2$ and R$^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and preferably R$^2$ and R$^3$ denote alkyl or alkenyl,

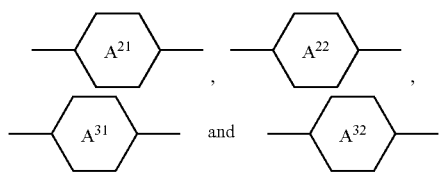

on each appearance, independently of one another, denote

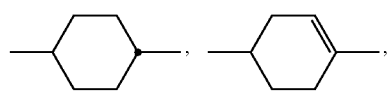

-continued

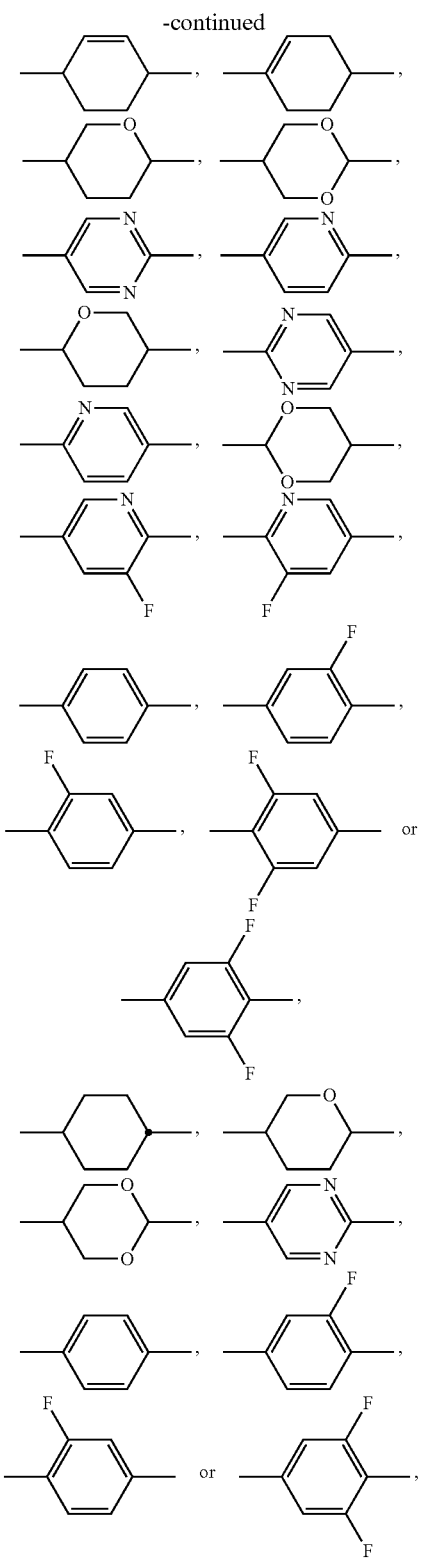

$L^{21}$, $L^{22}$, $L^{31}$ and $L^{32}$, independently of one another, denote H or F, preferably $L^{21}$ and/or $L^{31}$ denote F, $X^2$ and $X^3$, independently of one another, denote halogen, halogenated alkyl or alkoxy having 1 to 3 C atoms or halogenated alkenyl or alkenyloxy having 2 or 3 C atoms, preferably F, Cl, —OCF₃ or —O—CH=CF₂, —CF₃, especially F, —OCF₃ or —O—CH=CF₂, $Z^3$ denotes —CH₂CH₂—, —CF₂CF₂—, —COO—, trans-CH=CH—, trans-CF=CF—, —CH₂O— or a single bond, preferably —CH₂CH₂—, —COO—, trans-CH=CH— or a single bond and very preferably —COO—, trans-CH=CH— or a single bond, and m and n, independently of one another, denote 0, 1, 2 or 3, m preferably denotes 1, 2 or 3, and n preferably denotes 0, 1 or 2 and particularly preferably 1 or 2, and/or c) one or more compounds of the formula IV

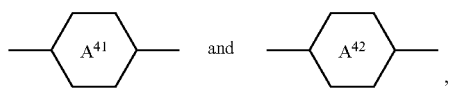

in which $R^{41}$ and $R^{42}$, independently of one another, have the meaning indicated for $R^2$ above under formula II, preferably $R^{41}$ denotes alkyl and $R^{42}$ denotes alkyl or alkoxy or $R^{41}$ denotes alkenyl and $R^{42}$ denotes alkyl,

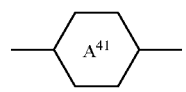

independently of one another, and, is

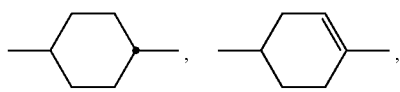

occurs twice, also these independently of one another, denote

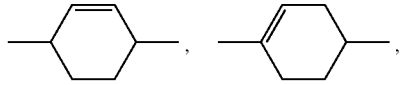

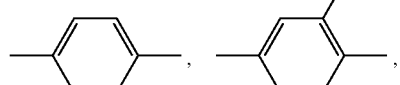

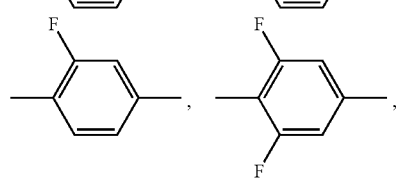

-continued

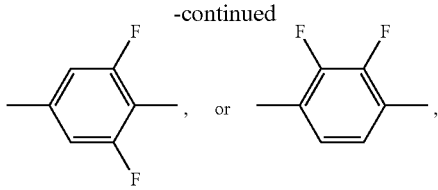

preferably one or more of

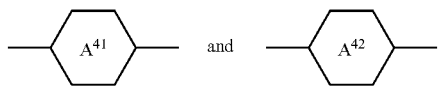

denote(s)

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more of them denote(s) a single bond, and p denotes 0, 1 or 2, preferably 0 or 1.

In the present application, the elements all include their respective isotopes. In particular, one or more H in the compounds may be replaced by D, and this is also particularly preferred in some embodiments. A correspondingly high degree of deuteration of the corresponding compounds enables, for example, detection and recognition of the compounds. This is very helpful in some cases, in particular in the case of the compounds of the formula I.

In the present application,
alkyl particularly preferably denotes straight-chain alkyl, in particular CH$_3$—, C$_2$H$_5$—, n-C$_3$H$_7$—, n-C$_4$H$_9$— or n-C$_5$H$_{11}$—, and alkenyl particularly preferably denotes CH$_2$=CH—, E-CH$_3$—CH=CH—, CH$_2$=CH—CH$_2$—CH$_2$—, E-CH$_3$—CH=CH—CH$_2$—CH$_2$— or E-(n-C$_3$H$_7$)—CH=CH—.

The liquid-crystalline media in accordance with the present application preferably comprise in total 1 ppm to 25,000 ppm, preferably 50 ppm to 20,000 ppm, even more preferably 100 to 15,000 ppm, preferably up to 10,000 ppm, and, very particularly preferably, 200 ppm to 10,000 ppm, of compounds of the formula I. In a further preferred embodiment, the liquid-crystalline media in accordance with the present application comprise in total 1 ppm to 2,000 ppm, preferably 10 ppm to 1,000 ppm, even more preferably 20 to 600 ppm, preferably up to 500 ppm, and, very particularly preferably, 50 ppm to 400 ppm, of compounds of the formula I.

The compounds of the formula I are eminently suitable as stabilisers in liquid-crystal mixtures. In particular, they provide very efficient heat stabilisation of such mixtures. In contrast to these compounds, compounds known to date which provide good heat stabilisation result in a more or less considerable decrease in the "voltage holding ratio" (VHR or merely HR for short) on UV exposure. In comparison, the compounds of the formula I exhibit a significant improvement. Although the HR of the mixtures after UV exposure frequently still decreases, this decrease in the HR on UV exposure is, however, significantly reduced compared to that which occurs in the case of the materials known to date.

In a preferred embodiment of the present invention, the media according to the invention in each case comprise one or more compounds of the formula I selected from the group of the compounds of the formulae I-1 to I-3, preferably compounds of the formula I-1,

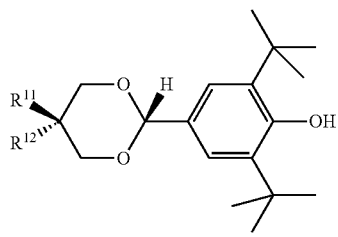

I-1

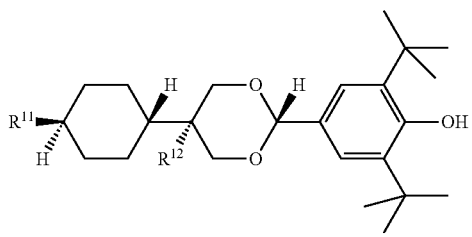

I-2

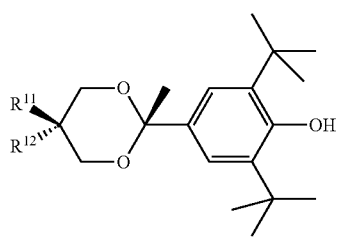

I-3 in which the parameters have the meanings indicated above under formula I and preferably R$^{11}$ denotes H or a straight-chain or branched alkyl chain of the formula C$_n$H$_{2n+1}$, n denotes an integer from 1 to 10, preferably from 1 to 5 and, particularly preferably, from 1 to 3.

R$^{12}$ denotes H or a straight-chain or branched alkyl chain of the formula C$_m$H$_{2m+1}$, in which m denotes an integer from 1 to 10, preferably from 1 to 5 and, particularly preferably, from 1 to 3.

In an even more preferred embodiment of the present invention, the media according to the invention in each case comprise one or more compounds of the formula I selected from the group of the following compounds, of the formulae I-1-1 to I-3-1,

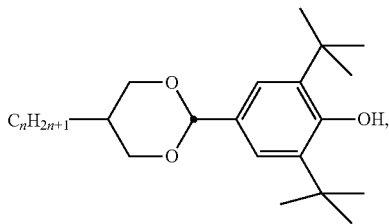

I-1-1

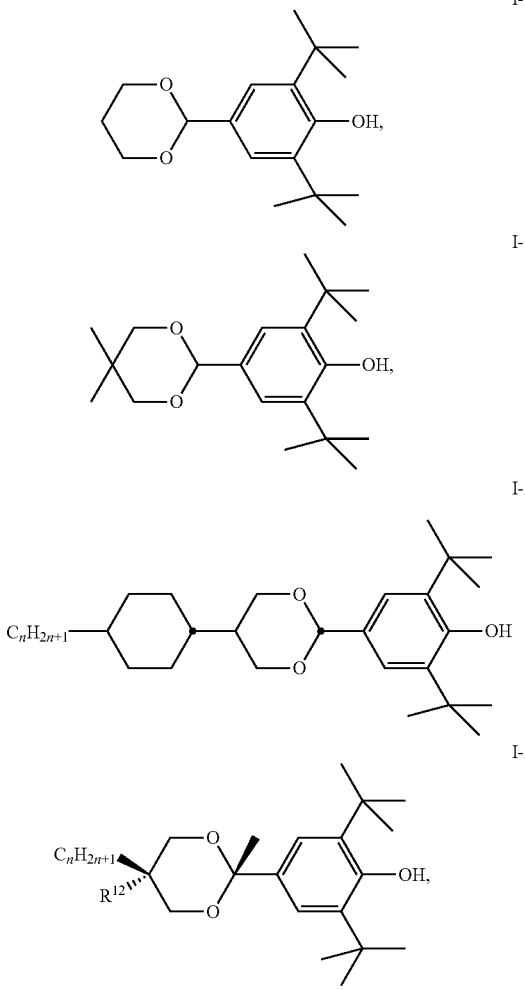

in which the parameters have the meanings indicated above under formulae I-1 and I-2 and I-3 and preferably n denotes an integer from 1 to 7, preferably from 2 to 5 and, particularly preferably, 3.

In a preferred embodiment of the present invention, the media according to the invention comprise one or more compounds of the formula I, preferably selected from the preferred sub-formulae thereof,
and/or
one or more compounds of the formula II, preferably selected from the preferred sub-formulae thereof,
and/or
one or more compounds of the formula III, preferably selected from the preferred sub-formulae thereof,
and/or
one or more compounds of the formula IV, preferably selected from the preferred sub-formulae thereof.

In addition to the compounds of the formula I or preferred sub-formulae thereof, the media in accordance with the present invention preferably comprise one or more dielectrically neutral compounds of the formula IV in a total concentration in the range from 5% or more to 90% or less, preferably from 10% or more to 80% or less, particularly preferably from 20% or more to 70% or less.

The compounds of the formulae II and III are preferably dielectrically positive compounds, preferably having a dielectric anisotropy of greater than 3.

The compounds of the formula IV are preferably dielectrically neutral compounds, preferably having a dielectric anisotropy in the range from −1.5 to 3.

The compounds of the formula I are eminently suitable as stabilisers in liquid-crystal mixtures. In particular, they provide very efficient heat stabilisation of mixtures. Materials to date which provide good heat stabilisation result in a more or less considerable decrease in the HR on UV exposure. In comparison, the compounds of the formula I exhibit an improvement, i.e. the decrease in the HR on UV exposure is reduced.

The individual compounds of the formulae II and/or III are employed in a concentration of 1 to 20%, preferably 1 to 15%. These limits apply, in particular, if in each case two or more homologous compounds, i.e. compounds of the same formula, are employed. If only a single substance, i.e. only one homologue, of the compounds of a formula is employed, its concontration can thus be in the range from 2 to 20%, preferably from 3 to 14%.

In addition to the compounds of the formula I or preferred sub-formulae thereof, the media according to the present invention preferably comprise one or more dielectrically positive compounds having a dielectric anisotropy of greater than 3, selected from the group of the formulae II and III.

In a preferred embodiment of the present invention, the media according to the invention comprise one or more compounds selected from the group of the compounds of the formulae II-1 to II-4, preferably of the formulae II-1 and/or II-2,

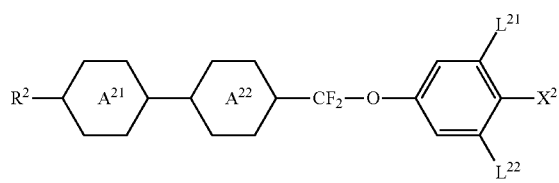

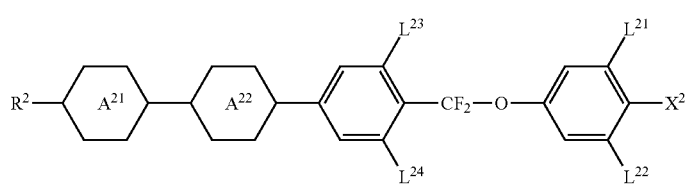

-continued

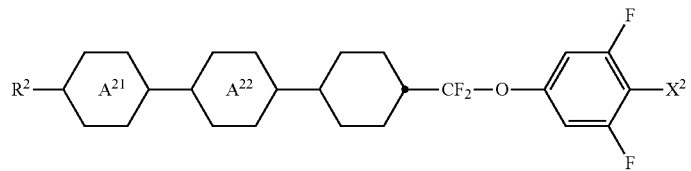

II-3

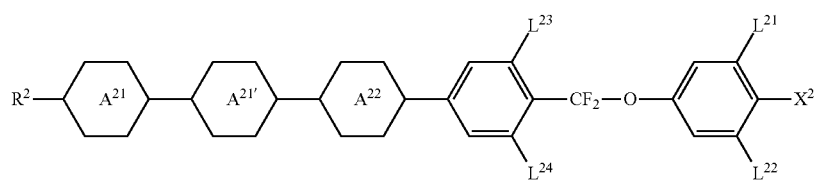

II-4 in which the parameters have the respective meanings indicated above under formula II, and $L^{23}$ and $L^{24}$, independently of one another, denote H or F, preferably $L^{23}$ denotes F, and

has one of the meanings given for

and, in the case of the formulae II-1 and II-4, $X^2$ preferably denotes F or $OCF_3$, particularly preferably F, and, in the case of the formula II-3,

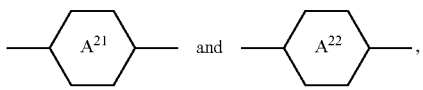

independently of one another, preferably denote

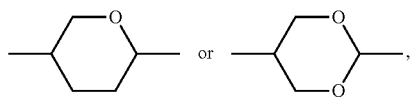

and/or are selected from the group of the compounds of the formulae III-1 and III-2:

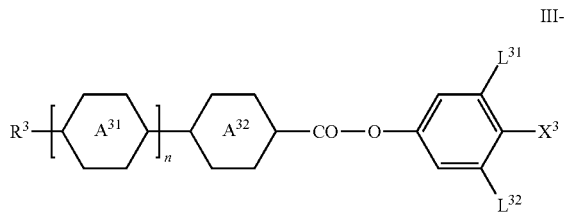

III-1

-continued

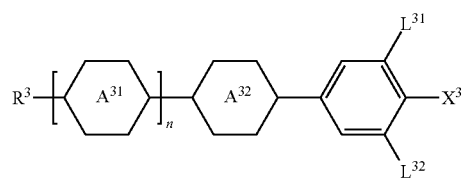

III-2 in which the parameters have the meaning given under formula III.

In a preferred embodiment, the media according to the present invention alternatively or in addition to the compounds of the formulae III-1 and/or III-2 comprise one or more compounds of the formula III-3

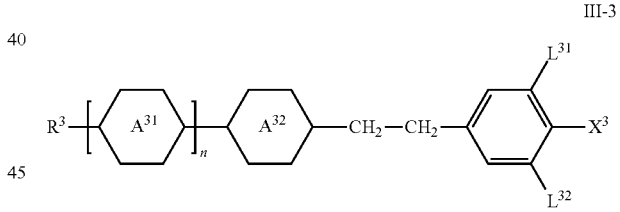

III-3 in which the parameters have the respective meanings indicated above, and the parameters $L^{31}$ and $L^{32}$, independently of one another and of the other parameters, denote H or F.

The media according to the invention preferably comprise one or more compounds selected from the group of the compounds of the formulae II-1 to II-4 in which $L^{21}$ and $L^{22}$ and/or $L^{23}$ and $L^{24}$ both denote F.

In a preferred embodiment, the media comprise one or more compounds which are selected from the group of the compounds of the formulae II-2 and II-4 in which $L^{21}$, $L^{22}$, $L^{23}$ and $L^{24}$ all denote F.

The media preferably comprise one or more compounds of the formula II-1. The compounds of the formula II-1 are preferably selected from the group of the compounds of the formulae II-1a to II-1f

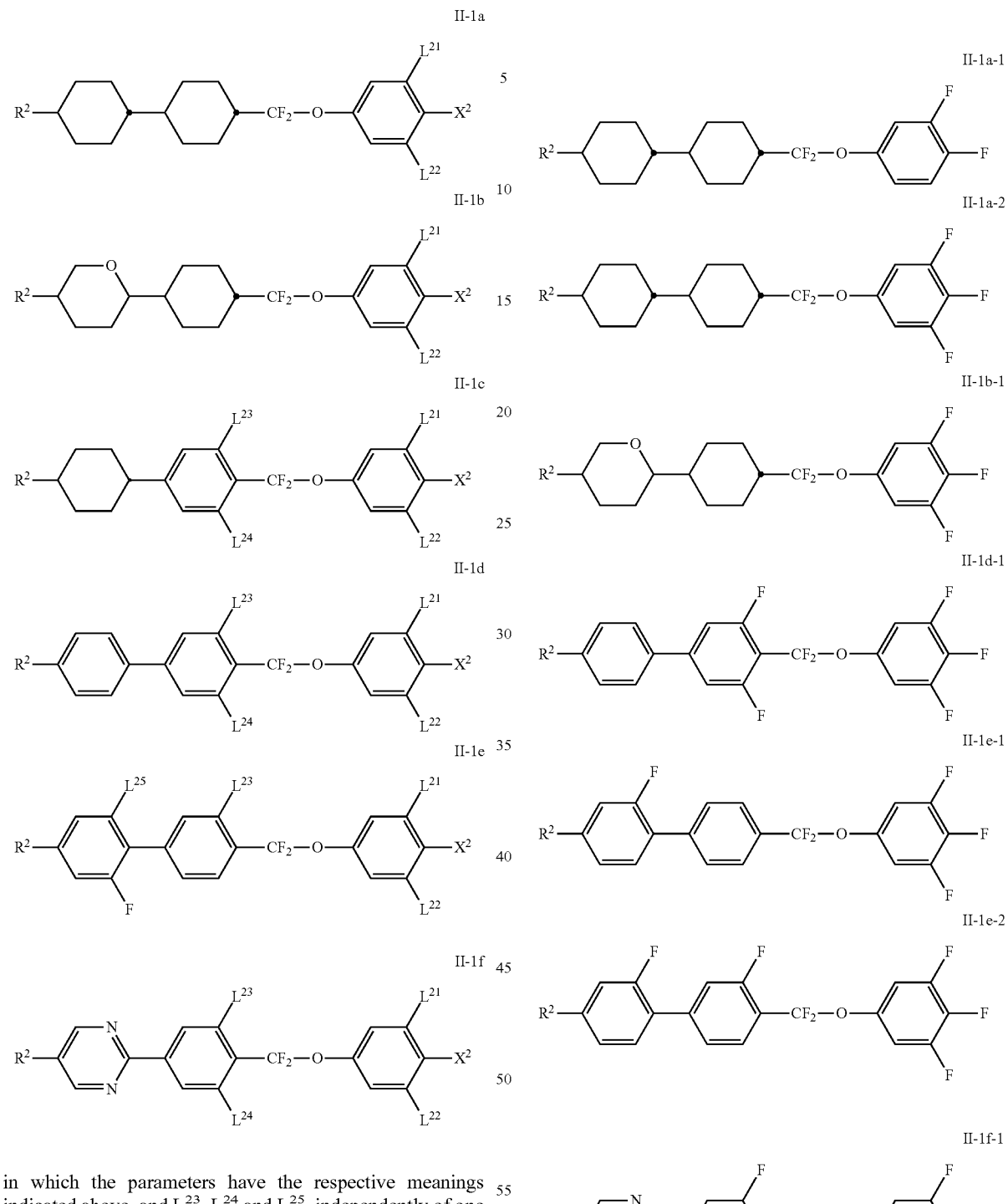

Especially preferred compounds of the formula II-1 are in which the parameters have the respective meanings indicated above, and $L^{23}$, $L^{24}$ and $L^{25}$, independently of one another and of the other parameters, denote H or F, and preferably in the formulae II-1a and II-1b $L^{21}$ and $L^{22}$ both denote F, in the formulae II-1c and II-1d $L^{21}$ and $L^{22}$ both denote F and/or $L^{23}$ and $L^{24}$ both denote F, and in formula II-1e $L^{21}$, $L^{22}$ and $L^{25}$ denote F, and in each case the other parameters have the respective meanings given above.

in which $R^2$ has the meaning indicated above, in particular compounds of the formula II-1a-2.

The media preferably comprise one or more compounds of the formula II-2, which are preferably selected from the group of the compounds of the formulae II-2a to II-2k II-2a
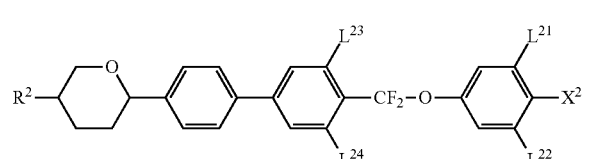

II-2b
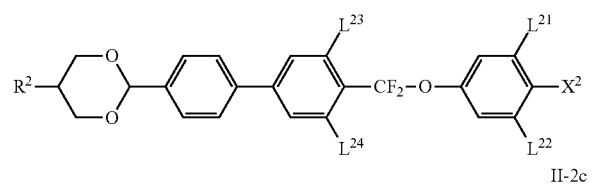

II-2c
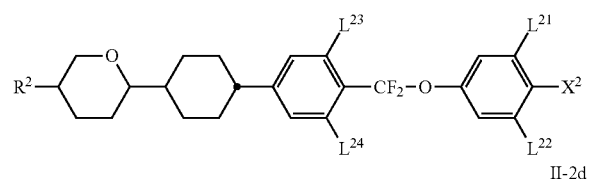

II-2d
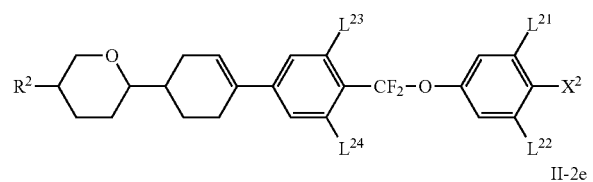

II-2e
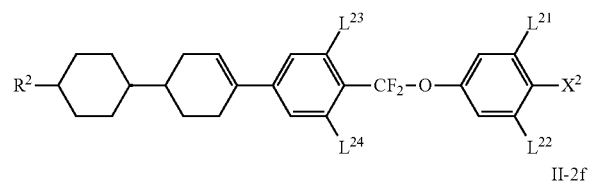

II-2f
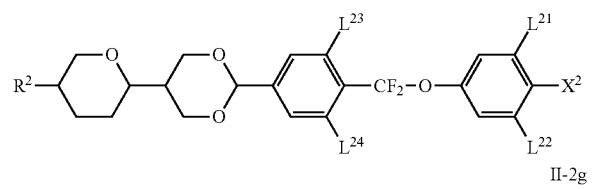

II-2g
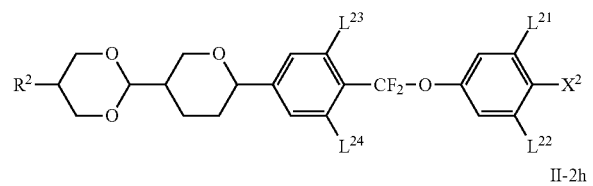

II-2h
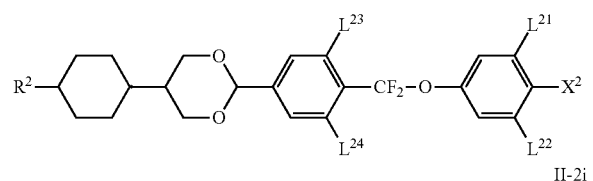

II-2i
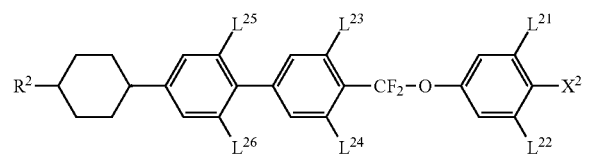

II-2j
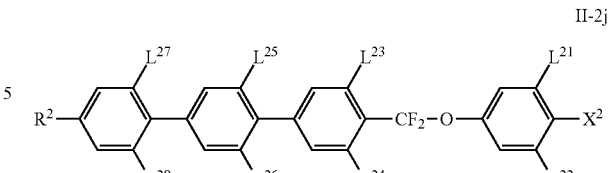

II-2k
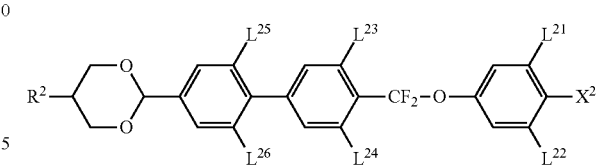

in which the parameters have the respective meanings indicated above, and $L^{25}$, $L^{26}$, $L^{27}$ and $L^{28}$, independently of one another, denote H or F, preferably $L^{27}$ and $L^{28}$ both denote H, particularly preferably $L^{26}$ denotes H, and the other parameters have the respective meanings given above.

The media according to the invention preferably comprise one or more compounds selected from the group of the compounds of the formulae II-2a to II-2k in which $L^{21}$ and $L^{22}$ both denote F and/or $L^{23}$ and $L^{24}$ both denote F, and the other parameters have the respective meanings given above.

In a preferred embodiment, the media according to the invention comprise one or more compounds selected from the group of the compounds of the formulae II-2a to II-2k in which $L^{21}$, $L^{22}$, $L^{23}$ and $L^{24}$ all denote F, and the other parameters have the respective meanings given above.

Especially preferred compounds of the formula II-2 are the compounds of the following formulae:

II-2a-1
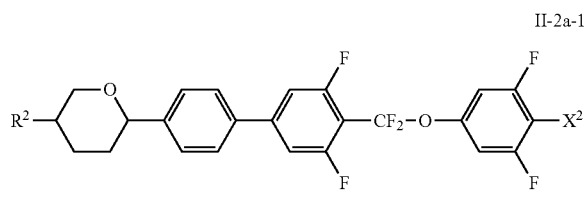

II-2c-1
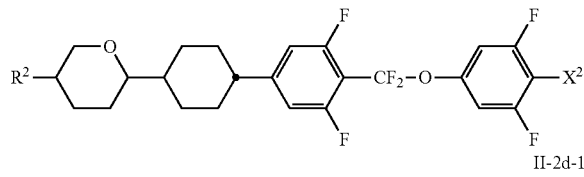

II-2d-1
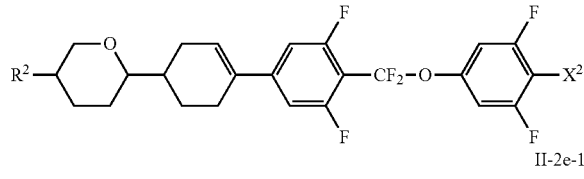

II-2e-1
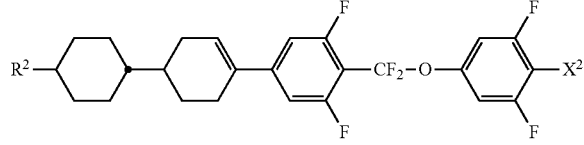

II-2f-1
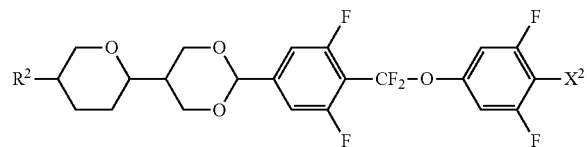

II-2h-1
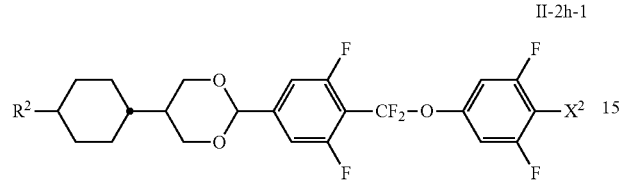

II-2i-1
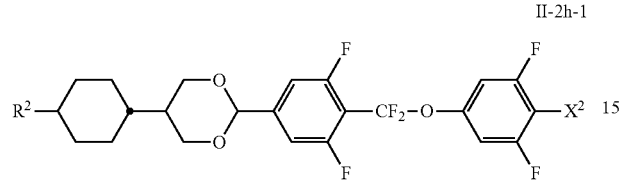

II-2i-2
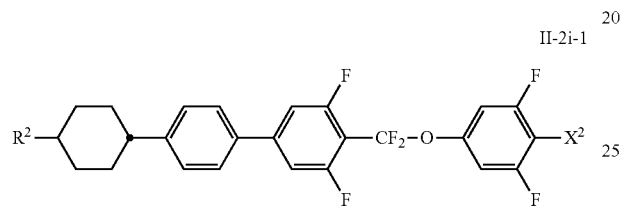

II-2j-1
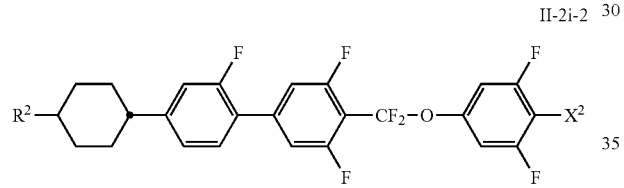

II-2j-2
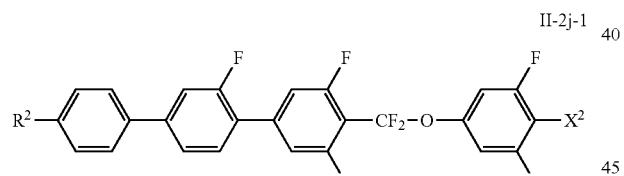

II-2k-1
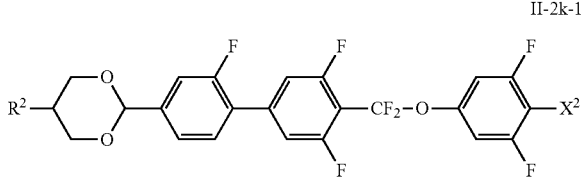

in which $R^2$ and $X^2$ have the meanings indicated above, and $X^2$ preferably denotes F, particularly preferably compounds of the formula II-2a-1 and/or II-2h-1 and/or II-2j-1 and/or II-2k-1.

The media according to the invention preferably comprise one or more compounds of the formula II-3, preferably selected from the group of the compounds of the formulae II-3a to II-3c II-3a
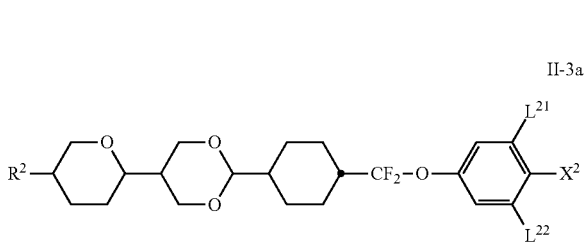

II-3b
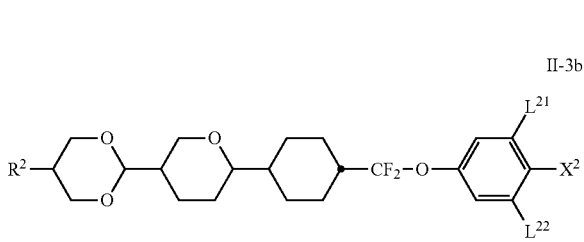

II-3c
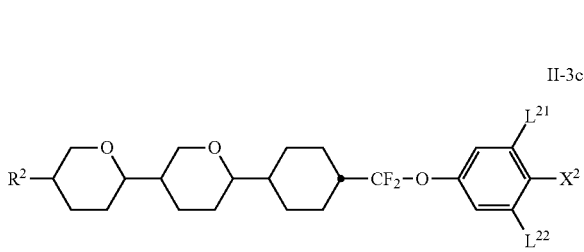

in which the parameters have the respective meanings indicated above, and $L^{21}$ and $L^{22}$ preferably both denote F.

In a preferred embodiment, the media according to the invention comprise one or more compounds of the formula II-4, preferably of the formula II-4a II-4a
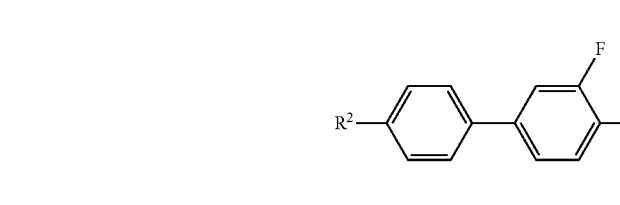

in which the parameters have the meaning given above, and $X^2$ preferably denotes F or $OCF_3$, particularly preferably F.

The media according to the invention preferably comprise one or more compounds of the formula III-1, preferably selected from the group of the compounds of the formulae III-1a and III-1b

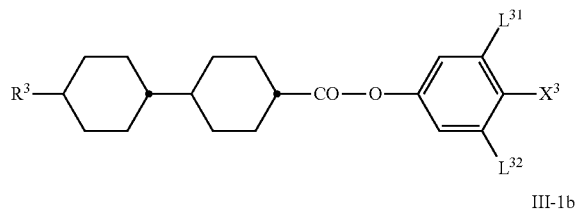

III-1a

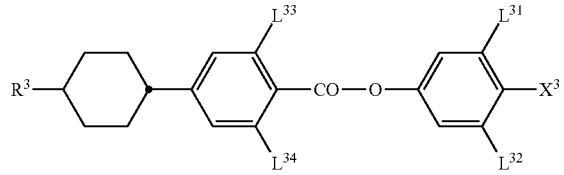

III-1b in which the parameters have the respective meanings indicated above, and the parameters $L^{33}$ and $L^{34}$, independently of one another and of the other parameters, denote H or F.

The media according to the invention preferably comprise one or more compounds of the formula III-1a, preferably selected from the group of the compounds of the formulae III-1a-1 to III-1a-6

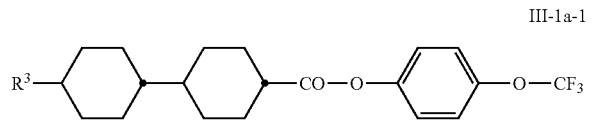

III-1a-1

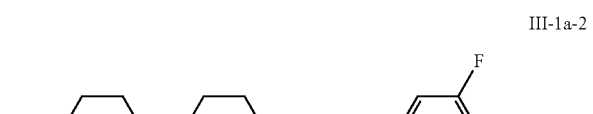

III-1a-2

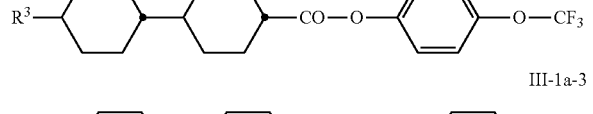

III-1a-3

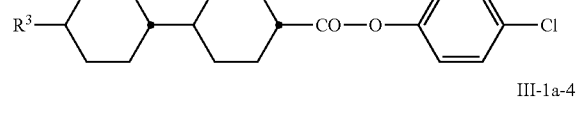

III-1a-4

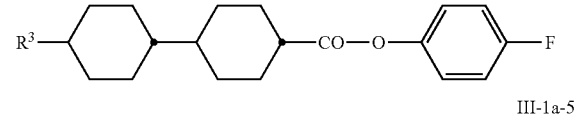

III-1a-5

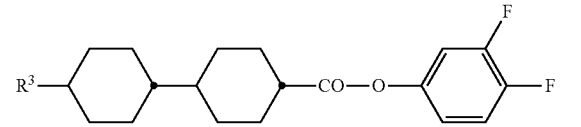

III-1a-6

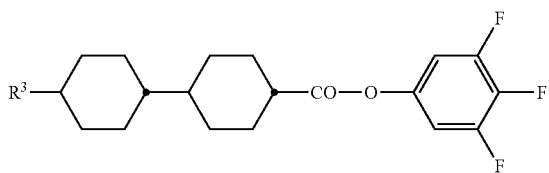

in which $R^3$ has the meaning indicated above.

The media according to the invention preferably comprise one or more compounds of the formula III-1b, preferably selected from the group of the compounds of the formulae III-1b-1 to III-1b-4, preferably of the formula III-1b-4, III-1b-1

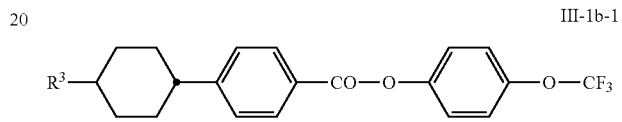

III-1b-2

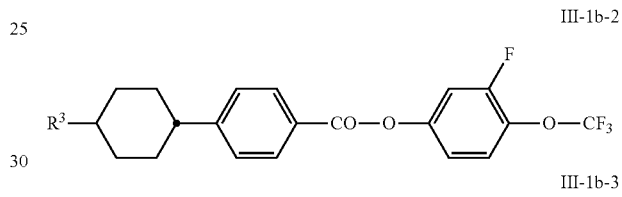

III-1b-3

III-1b-4

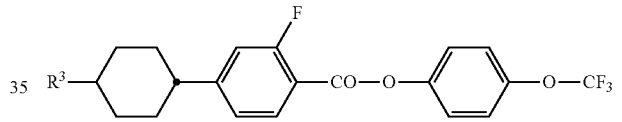

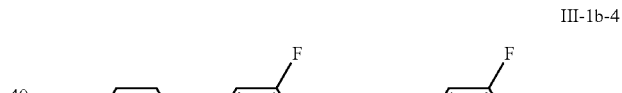

in which $R^3$ has the meaning indicated above.

The media according to the invention preferably comprise one or more compounds of the formula III-2, preferably selected from the group of the compounds of the formulae III-2a to III-2k III-2a

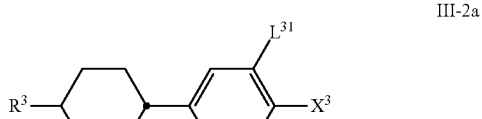

III-2b

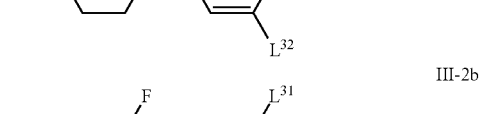

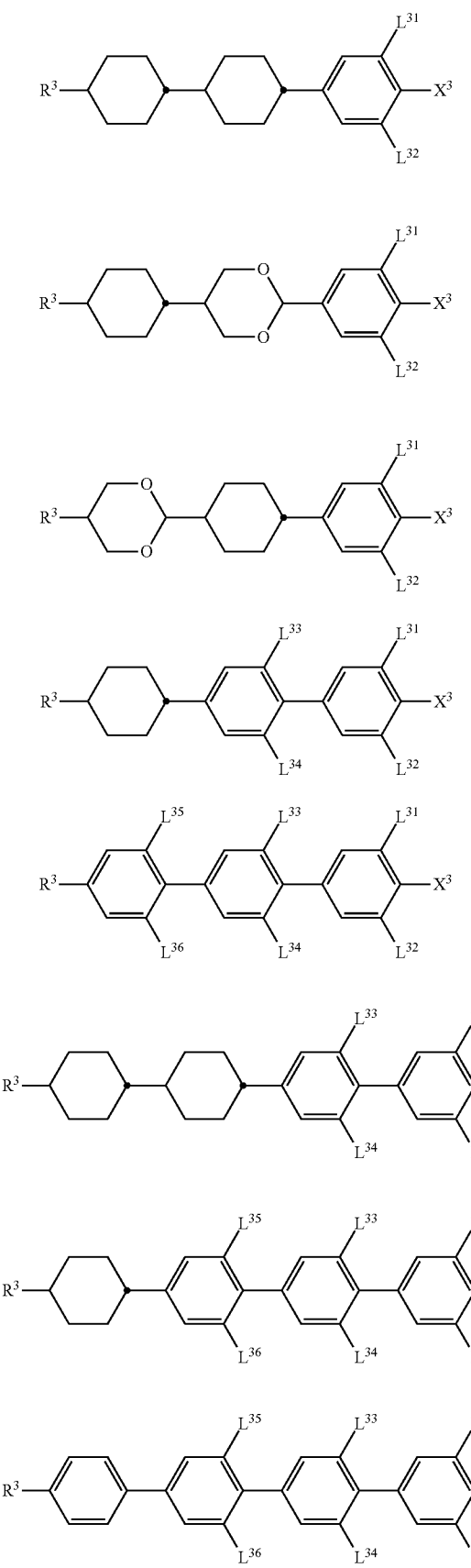

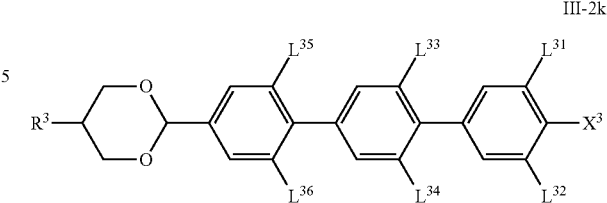

in which the parameters have the meaning given above and preferably in which the parameters have the respective meanings indicated above, and the parameters $L^{33}$, $L^{34}$, $L^{35}$ and $L^{36}$, independently of one another and of the other parameters, denote H or F.

The media according to the invention preferably comprise one or more compounds of the formula III-2a, preferably selected from the group of the compounds of the formulae III-2a-1 to III-2a-5

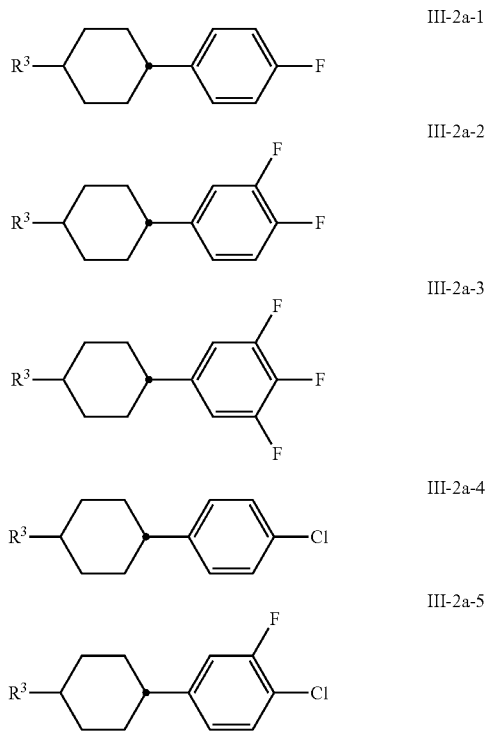

in which $R^3$ has the meaning indicated above.

The media according to the invention preferably comprise one or more compounds of the formula III-2b, preferably selected from the group of the compounds of the formulae III-2b-1 and III-2b-2, preferably of the formula III-2b-2

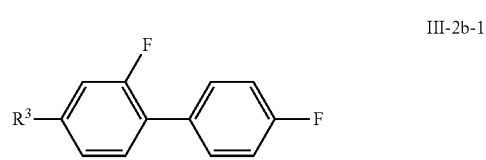

III-2b-2

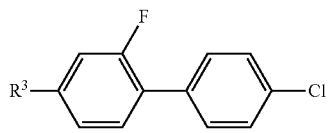

in which R³ has the meaning indicated above.

The media according to the invention preferably comprise one or more compounds of the formula III-2c, preferably selected from the group of the compounds of the formulae III-2c-1 to III-2c-6

III-2c-1
III-2c-2
III-2c-3
III-2c-4
III-2c-5
III-2c-6

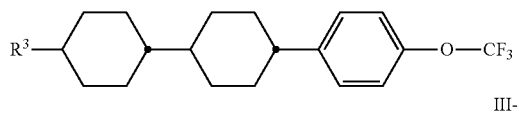
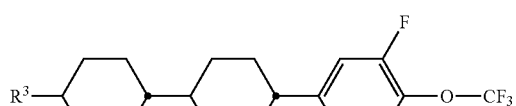
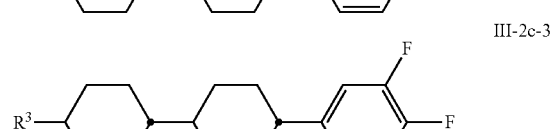
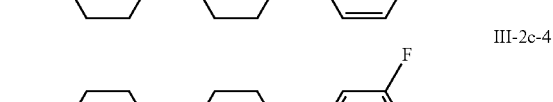
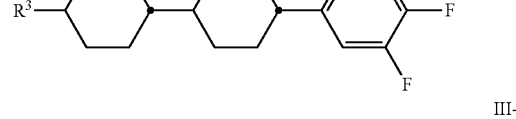
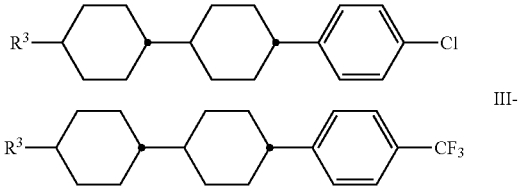

in which R³ has the meaning indicated above, particularly preferably compounds of the formula III-2c-1 and/or III-2c-2 and/or III-2c-4.

The media according to the invention preferably comprise one or more compounds selected from the group of the compounds of the formulae III-2d and III-2e, preferably selected from the group of the compounds of the formulae III-2d-1 and III-2e-1

III-2d-1

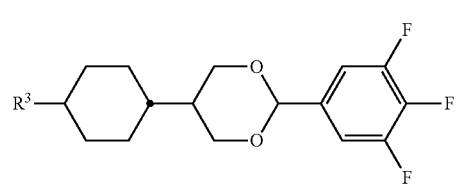

III-2e-1

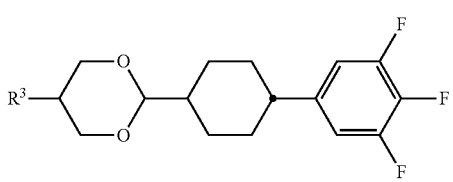

in which R³ has the meaning indicated above.

The media according to the invention preferably comprise one or more compounds of the formula III-2f, preferably selected from the group of the compounds of the formulae III-2f-1 to III-2f-5

III-2f-1
III-2f-2
III-2f-3
III-2f-4
III-2f-5
III-2f-6

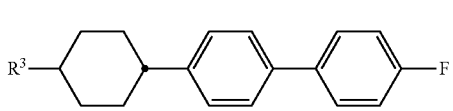
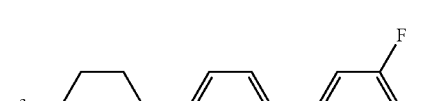
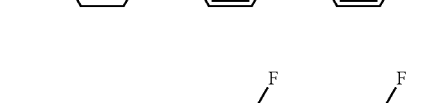
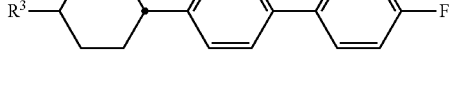
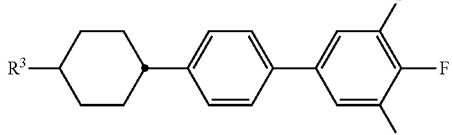
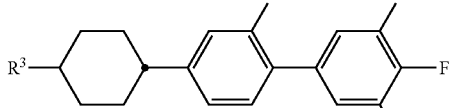

in which R³ has the meaning indicated above.

The media according to the invention preferably comprise one or more compounds of the formula III-2g, preferably selected from the group of the compounds of the formulae III-2g-1 to III-2g-5

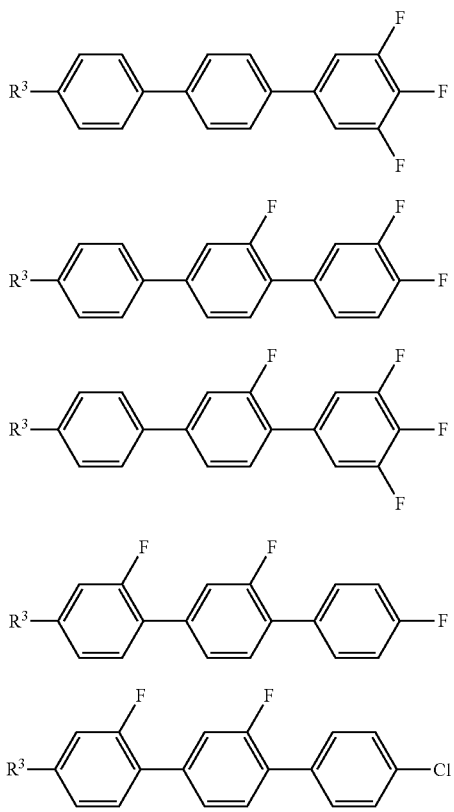

III-2g-1
III-2g-2
III-2g-3
III-2g-4
III-2g-5 in which R³ has the meaning indicated above.

The media according to the invention preferably comprise one or more compounds of the formula III-2h, preferably selected from the group of the compounds of the formulae III-2h-1 to III-2h-3, preferably of the formula III-2h-3

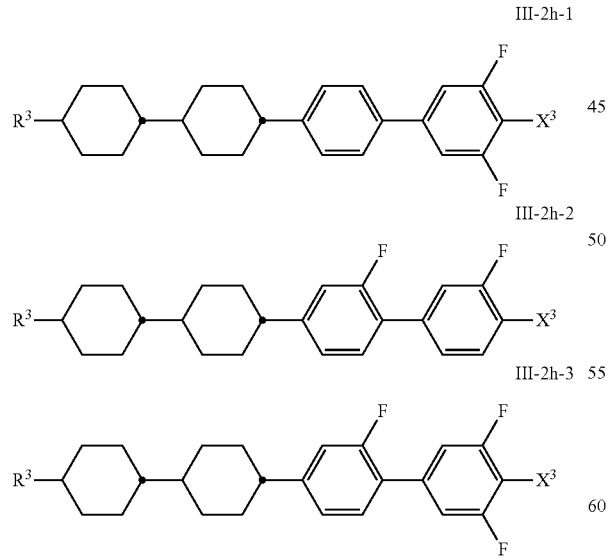

III-2h-1
III-2h-2
III-2h-3 in which the parameters have the meaning given above, and X³ preferably denotes F.

The media according to the invention preferably comprise one or more compounds of the formula III-2i, preferably selected from the group of the compounds of the formulae III-2i-1 and III-2i-2, particularly preferably of the formula III-2i-2

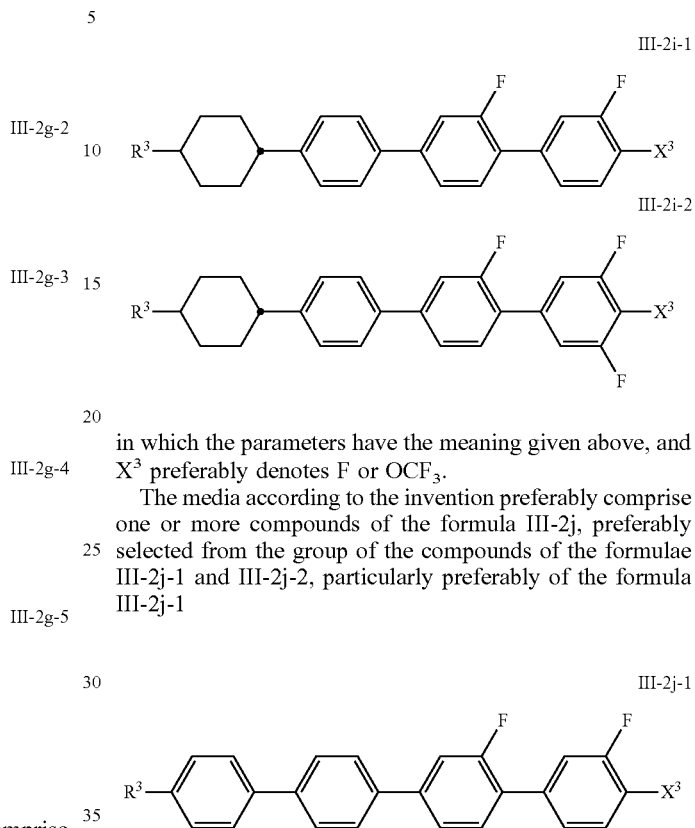

III-2i-1
III-2i-2 in which the parameters have the meaning given above, and X³ preferably denotes F or OCF₃.

The media according to the invention preferably comprise one or more compounds of the formula III-2j, preferably selected from the group of the compounds of the formulae III-2j-1 and III-2j-2, particularly preferably of the formula III-2j-1

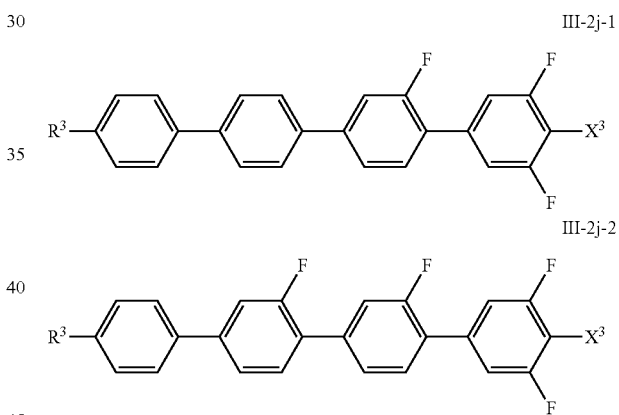

III-2j-1
III-2j-2 in which the parameters have the meaning given above.

The media according to the invention preferably comprise one or more compounds of the formula III-2k, preferably of the formula III-2k-1

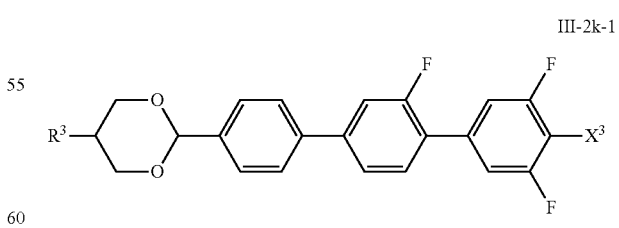

III-2k-1 in which the parameters have the meaning given above and X³ preferably denotes F.

Alternatively or in addition to the compounds of the formulae III-1 and/or III-2, the media according to the present invention may comprise one or more compounds of the formula III-3

III-3

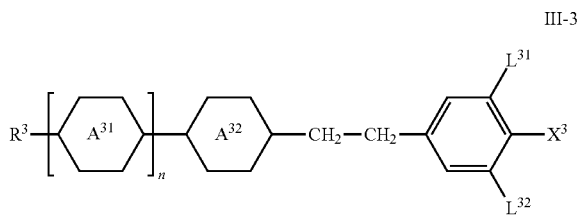

in which the parameters have the respective meanings indicated above under formula III.

These compounds are preferably selected from the group of the formulae III-3a and III-3b III-3a III-3b

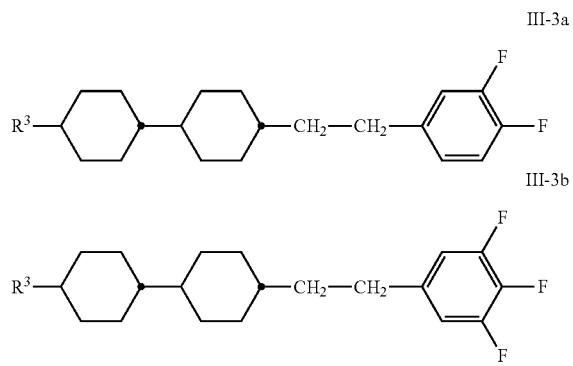

in which $R^3$ has the meaning indicated above.

The liquid-crystalline media according to the present invention preferably comprise a dielectrically neutral component, component C. This component has a dielectric anisotropy in the range from −1.5 to 3. It preferably comprises, more preferably predominantly comprises, even more preferably consists essentially of and especially preferably consists of dielectrically neutral compounds having a dielectric anisotropy in the range from −1.5 to 3. This component preferably comprises one or more dielectrically neutral compounds, more preferably predominantly comprises, even more preferably consists essentially of and very preferably consists of dielectrically neutral compounds of the formula IV having a dielectric anisotropy in the range from −1.5 to 3.

The dielectrically neutral component, component C, preferably comprises one or more compounds selected from the group of the compounds of the formulae IV-1 to IV-8

IV-1

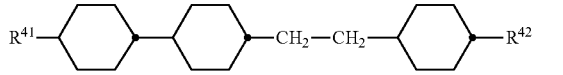

IV-2

IV-3

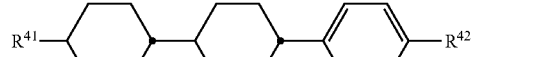

IV-4

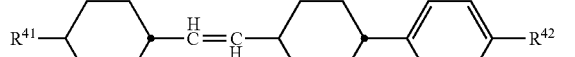

IV-5

IV-6

IV-7

IV-8

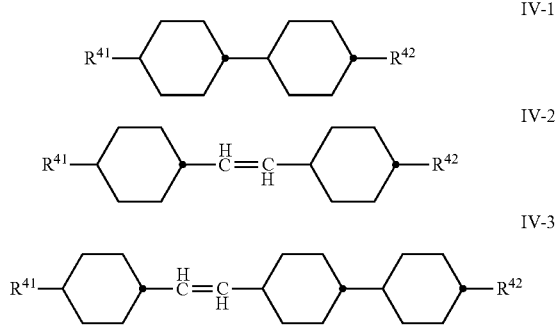

in which $R^{41}$ and $R^{42}$ have the respective meanings indicated above under formula IV, and in formulae IV-1, IV-6 and IV-7 $R^{41}$ preferably denotes alkyl or alkenyl, preferably alkenyl, and $R^{42}$ preferably denotes alkyl or alkenyl, preferably alkyl, and in formula IV-2 $R^{41}$ and $R^{42}$ preferably denote alkyl, and in formula IV-5 $R^{41}$ preferably denotes alkyl or alkenyl, more preferably alkyl, and $R^{42}$ preferably denotes alkyl, alkenyl or alkoxy, more preferably alkenyl or alkoxy, and in formulae IV-4 and IV-8 $R^{41}$ preferably denotes alkyl and $R^{42}$ preferably denotes alkyl or alkoxy, more preferably alkoxy.

The dielectrically neutral component, component C, preferably comprises one or more compounds selected from the group of the compounds of the formulae IV-1, IV-5, IV-6 and IV-7, preferably one or more compounds of the formula IV-1 and one or more compounds selected from the group of the formulae IV-5 and IV-6, more preferably one or more compounds of each of the formulae IV-1, IV-5 and IV-6 and very preferably one or more compounds of each of the formulae IV-1, IV-5, IV-6 and IV-7.

In a preferred embodiment, the media according to the invention comprise one or more compounds of the formula IV-4, more preferably selected from the respective sub-formulae thereof of the formulae CP-V-n and/or CP-nV-m and/or CP-Vn-m, more preferably of the formulae CP-V-n and/or CP-V2-n and very preferably selected from the group of the formulae CP-V-1 and CP-V2-1. The definitions of these abbreviations (acronyms) are indicated below in Table D or are evident from Tables A to C.

In a preferred embodiment, the media according to the invention comprise one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, the media according to the invention comprise one or more compounds of the formula IV-1, more preferably selected from the respective sub-formulae thereof of the formulae CC-n-m, CC-n-V, CC-n-Vm, CC-V-V, CC-V-Vn and/or CC-nV-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1, CC-3-V2 and CC-V-V1. The definitions of these abbreviations (acronyms) are likewise indicated below in Table D or are evident from Tables A to C.

In a further preferred embodiment of the present invention, which may be the same as the previous one or a different one, the liquid-crystal mixtures according to the present invention comprise component C which comprises, preferably predominantly comprises and very preferably consists of compounds of the formula IV selected from the group of the compounds of the formulae IV-1 to IV-8 as shown above and optionally of the formulae IV-9 to IV-15

IV-9
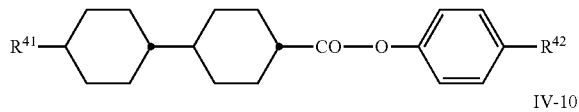

IV-10
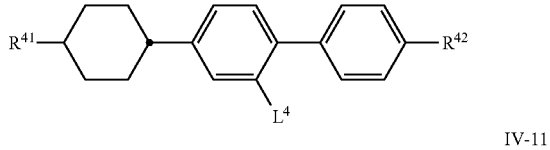

IV-11
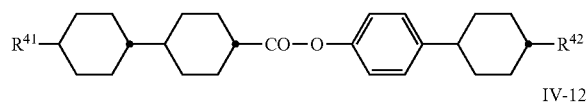

IV-12
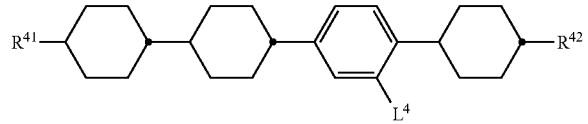

IV-13
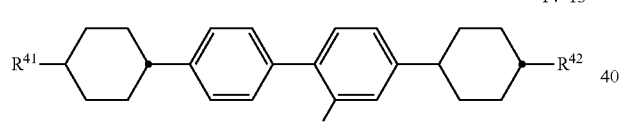

IV-14
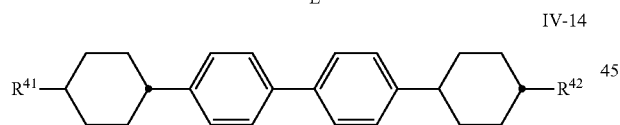

IV-15
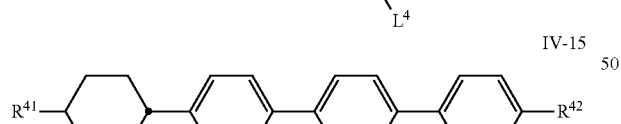

in which
$R^{41}$ and $R^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and
$L^4$ denotes H or F.

In a preferred embodiment, the media according to the invention comprise one or more compounds of the formula IV-10, more preferably selected from the respective subformulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

The liquid-crystalline media according to the present invention preferably comprise one or more compounds of the formula V

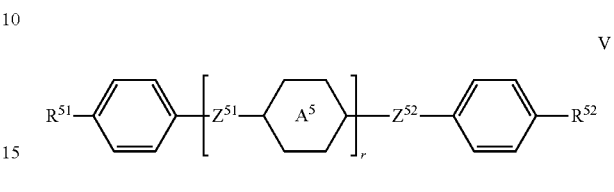

V in which
$R^{51}$ and $R^{52}$, independently of one another, have the meaning indicated for $R^2$ under formula II above, preferably $R^{51}$ denotes alkyl and $R^{52}$ denotes alkyl or alkenyl,

if it occurs twice in each case independently of one another on each occurrence, denotes

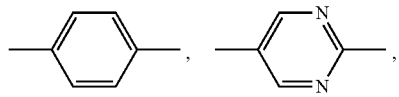

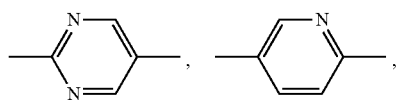

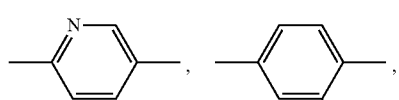

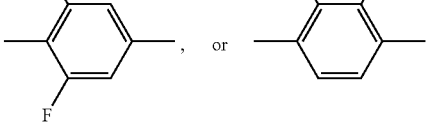

preferably one or more of

denote

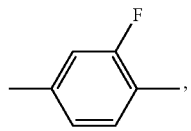

$Z^{51}$ and $Z^{52}$, independently of one another and, if $Z^{51}$ occurs twice, also these independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond, and r denotes 0, 1 or 2, preferably 0 or 1, particularly preferably 1.

The compounds of the formula V are preferably dielectrically neutral compounds having a dielectric anisotropy in the range from −1.5 to 3.

The media according to the invention preferably comprise one or more compounds selected from the group of the compounds of the formulae V-1 and V-2

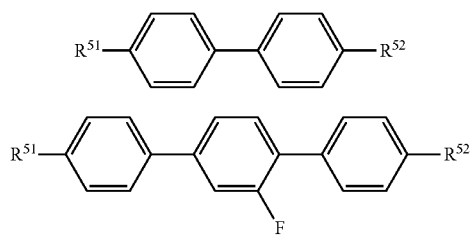

in which $R^{51}$ and $R^{52}$ have the respective meanings indicated above under formula V, and $R^{51}$ preferably denotes alkyl, and in formula V-1 $R^{52}$ preferably denotes alkenyl, preferably —(CH$_2$)$_2$—CH=CH—CH$_3$, and in formula V-2 $R^{52}$ preferably denotes alkyl or alkenyl, preferably —CH=CH$_2$, —(CH$_2$)$_2$—CH=CH$_2$ or —(CH$_2$)$_2$—CH=CH—CH$_3$.

The media according to the invention preferably comprise one or more compounds selected from the group of the compounds of the formulae V-1 and V-2 in which $R^{51}$ preferably denotes n-alkyl, and in formula V-1 $R^{52}$ preferably denotes alkenyl, and in formula V-2 $R^{52}$ preferably denotes n-alkyl.

In a preferred embodiment, the media according to the invention comprise one or more compounds of the formula V-1, more preferably of the subformula PP-n-2Vm thereof, even more preferably of the formula PP-1-2V1. The definitions of these abbreviations (acronyms) are indicated below in Table D or are evident from Tables A to C.

In a preferred embodiment, the media according to the invention comprise one or more compounds of the formula V-2, more preferably of the sub-formulae PGP-n-m, PGP-n-V, PGP-n-2Vm, PGP-n-2V and PGP-n-2Vm thereof, even more preferably of the sub-formulae PGP-3-m, PGP-n-2V and PGP-n-V1 thereof, very preferably selected from the formulae PGP-3-2, PGP-3-3, PGP-3-4, PGP-3-5, PGP-1-2V, PGP-2-2V and PGP-3-2V. The definitions of these abbreviations (acronyms) are likewise indicated below in Table D or are evident from Tables A to C.

Alternatively or in addition to the compounds of the formulae II and/or III, the media according to the present invention may comprise one or more dielectrically positive compounds of the formula VI

VI

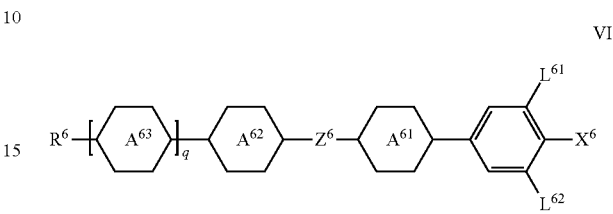

in which $R^6$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

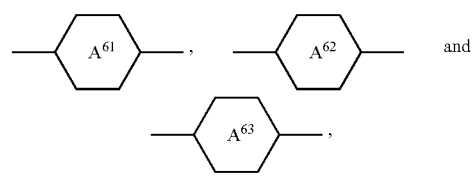

independently of one another, denote

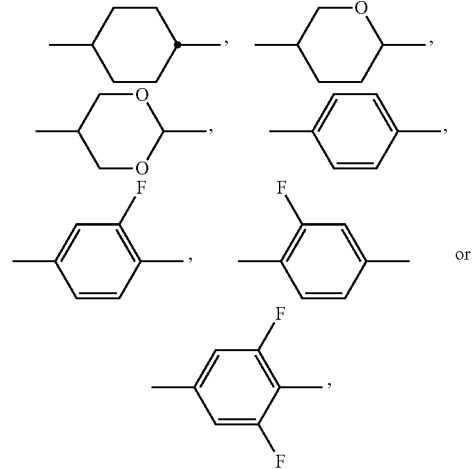

$L^{61}$ and $L^{62}$, independently of one another, denote H or F, preferably $L^{61}$ denotes F, $X^6$ denotes halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$, $Z^6$ denotes —CH$_2$CH$_2$—, —CF$_2$CF$_2$—, —COO—, trans-CH=CH—, trans-CF=CF—, —CH$_2$O— or —CF$_2$O—, preferably —CH$_2$CH$_2$—, —COO— or trans-CH=CH— and very preferably —COO— or trans-CH=CH—, and q denotes 0 or 1.

The media according to the present invention preferably comprise one or more compounds of the formula VI, preferably selected from the group of the compounds of the formulae VI-1 and VI-2

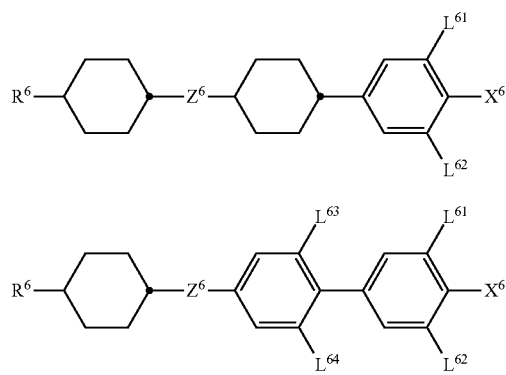

VI-1

VI-2 in which the parameters have the respective meanings indicated above, and the parameters $L^{63}$ and $L^{64}$, independently of one another and of the other parameters, denote H or F, and $Z^6$ preferably denotes —CH$_2$—CH$_2$—.

The compounds of the formula VI-1 are preferably selected from the group of the compounds of the formulae VI-1a and VI-1b

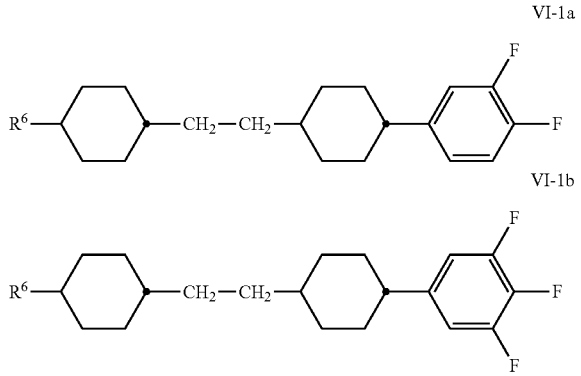

VI-1a

VI-1b in which $R^6$ has the meaning indicated above.

The compounds of the formula VI-2 are preferably selected from the group of the compounds of the formulae VI-2a to VI-2d

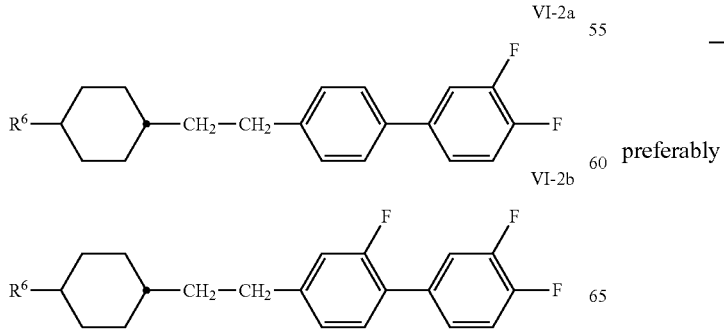

VI-2a

VI-2b

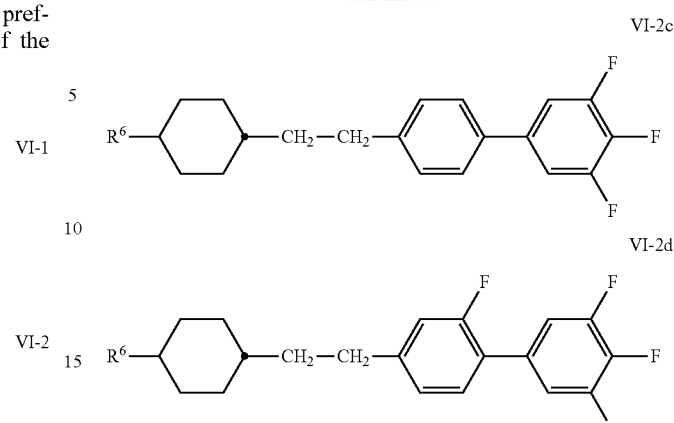

VI-2c

VI-2d in which $R^6$ has the meaning indicated above.

In addition, the liquid-crystal media according to the present invention may comprise one or more compounds of the formula VII

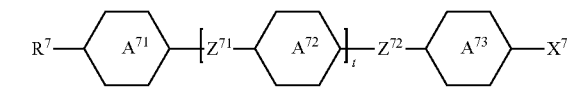

VII in which $R^7$ has the meaning indicated for $R^2$ above under formula II, one of the rings

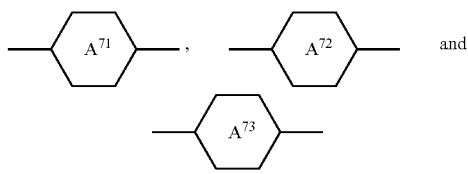

present denotes

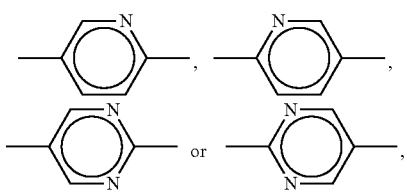

preferably

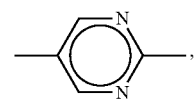

, preferably

denotes

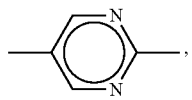

and the others have the same meaning or, independently of one another, denote

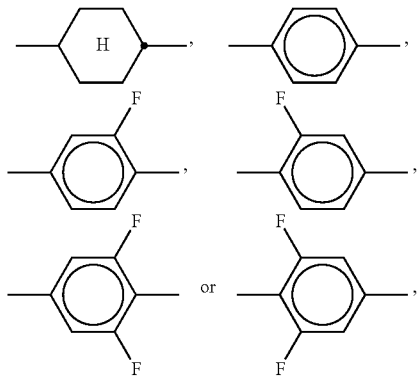

preferably

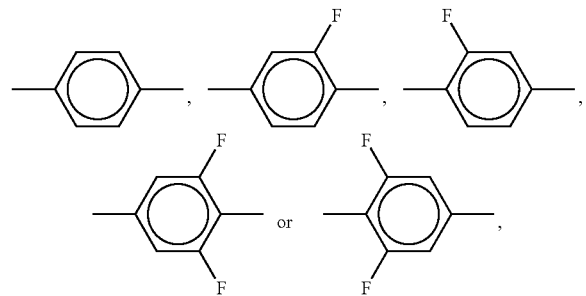

Z$^{71}$ and Z$^{72}$, independently of one another, denote —CH$_2$CH$_2$—, —COO—, trans-CH=CH—, trans-CF=CF—, —CH$_2$O—, —CF$_2$O—0 or a single bond, preferably one or more of them denote(s) a single bond and very preferably both denote a single bond, t denotes 0, 1 or 2, preferably 0 or 1, more preferably 1, and X$^7$ has the meaning indicated for X$^2$ above under formula II or alternatively, independently of R$^7$, may have one of the meanings indicated for R$^7$.

The compounds of the formula VII are preferably dielectrically positive compounds.

In addition, the liquid-crystal media according to the present invention may comprise one or more compounds of the formula VIII

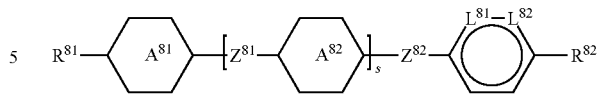

in which

R$^{81}$ and R$^{82}$, independently of one another, have the meaning indicated for R$^2$ above under formula II, and

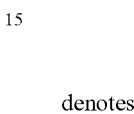

denotes

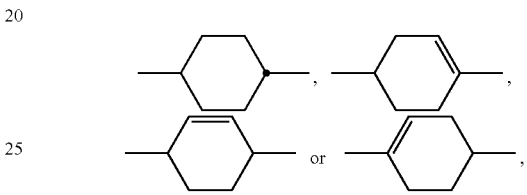

preferably

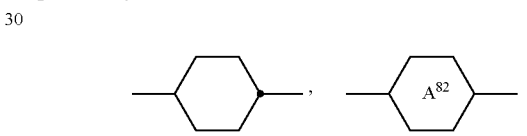

denotes

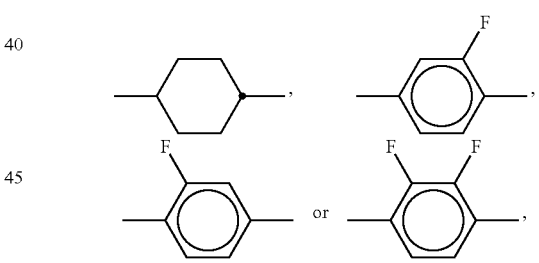

Z$^{81}$ and Z$^{82}$, independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond and very preferably both denote a single bond, L$^{81}$ and L$^{82}$, independently of one another, denote C—F or N, preferably one of L$^{81}$ and L$^{82}$ or both denote(s) C—F and very preferably both denote C—F, and s denotes 0 or 1.

The compounds of the formula VIII are preferably dielectrically negative compounds.

The liquid-crystalline media according to the present invention preferably comprise one or more compounds selected from the group of the compounds of the formulae I to VIII, preferably of the formulae I to VII and more preferably of the formulae I and II and/or III and/or IV and/or VI. They particularly preferably predominantly comprise, even more preferably consist essentially of and very preferably consist of these compounds.

In this application, "comprise" in connection with compositions means that the entity in question, i.e. the medium or the component, comprises the component or components or compound or compounds indicated, preferably in a total concentration of 10% or more and very preferably 20% or more.

In this connection, "predominantly comprises" means that the entity in question comprises 55% or more, preferably 60% or more and very preferably 70% or more of the component or components or compound or compounds indicated.

In this connection, "consist essentially of" means that the entity in question comprises 80% or more, preferably 90% or more and very preferably 95% or more of the component or components or compound or compounds indicated.

In this connection, "virtually completely consist of" or "consist of" means that the entity in question comprises 98% or more, preferably 99% or more and very preferably 100% of the component or components or compound or compounds indicated.

Other mesogenic compounds which are not explicitly mentioned above can optionally and advantageously also be used in the media according to the present invention. Such compounds are known to the person skilled in the art.

The liquid-crystal media according to the present invention preferably have a clearing point of 70° C. or more, more preferably 75° C. or more, particularly preferably 80° C. or more and very particularly preferably 85° C. or more.

The nematic phase of the media according to the invention preferably extends at least from 0° C. or less to 70° C. or more, more preferably at least from −20° C. or less to 75° C. or more, very preferably at least from −30° C. or less to 75° C. or more and in particular at least from −40° C. or less to 80° C. or more.

The Δε of the liquid-crystal medium according to the invention, at 1 kHz and 20° C., is preferably 2 or more, more preferably 3 or more, even more preferably 4 or more and very preferably 6 or more. Δε is preferably 30 or less, Δε is particularly preferably 20 or less.

The Δn of the liquid-crystal media according to the present invention, at 589 nm (Na$^D$) and 20° C., is preferably in the range from 0.060 or more to 0.300 or less, preferably in the range from 0.070 or more to 0.150 or less, more preferably in the range from 0.080 or more to 0.140 or less, even more preferably in the range from 0.090 or more to 0.135 or less and very particularly preferably in the range from 0.100 or more to 0.130 or less.

In a first preferred embodiment of the present application, the Δn of the liquid-crystal media according to the present invention is preferably 0.080 or more to 0.120 or less, more preferably in the range from 0.090 or more to 0.110 or less and very particularly preferably in the range from 0.095 or more to 0.105 or less, while Δε is preferably in the range from 6 or more to 11 or less, preferably in the range from 7 or more to 10 or less and particularly preferably in the range from 8 or more to 9 or less.

In this embodiment, the nematic phase of the media according to the invention preferably extends at least from −20° C. or less to 70° C. or more, more preferably at least from −20° C. or less to 70° C. or more, very preferably at least from −30° C. or less to 70° C. or more and in particular at least from −40° C. or less to 70° C. or more.

In a second preferred embodiment of the present application, the Δn of the liquid-crystal media according to the present invention is preferably 0.060 or more to 0.300 or less, it is preferably in the range from 0.100 or more to 0.140 or less, more preferably in the range from 0.110 or more to 0.130 or less and very particularly preferably in the range from 0.115 or more to 0.125 or less, while Δε is preferably in the range from 7 or more to 20 or less, preferably in the range from 9 or more to 17 or less and particularly preferably in the range from 10 or more to 13 or less.

In this embodiment, the nematic phase of the media according to the invention preferably extends at least from −20° C. or less to 80° C. or more, more preferably at least from −20° C. or less to 85° C. or more, very preferably at least from −30° C. or less to 80° C. or more and in particular at least from −40° C. or less to 85° C. or more.

In accordance with the present invention, the compounds of the formula I together are preferably used in the media in a total concentration of 1% to 50%, more preferably 1% to 30%, more preferably 2% to 30%, more preferably 3% to 30% and very preferably 5% to 25% of the mixture as a whole.

The compounds selected from the group of the formulae II and III are preferably used in a total concentration of 2% to 60%, more preferably 3% to 35%, even more preferably 4% to 20% and very preferably 5% to 15% of the mixture as a whole.

The compounds of the formula IV are preferably used in a total concentration of 5% to 70%, more preferably 20% to 65%, even more preferably 30% to 60% and very preferably 40% to 55% of the mixture as a whole.

The compounds of the formula V are preferably used in a total concentration of 0% to 30%, more preferably 0% to 15% and very preferably 1% to 10% of the mixture as a whole.

The compounds of the formula VI are preferably used in a total concentration of 0% to 50%, more preferably 1% to 40%, even more preferably 5% to 30% and very preferably 10% to 20% of the mixture as a whole.

The media according to the invention may optionally comprise further liquid-crystal compounds in order to adjust the physical properties. Such compounds are known to the person skilled in the art. Their concentration in the media according to the present invention is preferably 0% to 30%, more preferably 0.1% to 20% and very preferably 1% to 15%.

In a preferred embodiment, the concentration of the compound of the formula CC-3-V in the media according to the invention can be 50% to 65%, particularly preferably 55% to 60%.

The liquid-crystal media preferably comprise in total 50% to 100%, more preferably 70% to 100% and very preferably 80% to 100% and in particular 90% to 100% of the compounds of the formulae I to VII, preferably selected from the group of the compounds of the formulae I-1, I-2 and II to VI, particularly preferably of the formulae I to V, in particular of the formulae I-1, I-2, II, III, IV, V and VII and very particularly preferably of the formulae I-1, I-2, II, III, IV and V. They preferably predominantly comprise and very preferably virtually completely consist of these compounds. In a preferred embodiment, the liquid-crystal media in each case comprise one or more compounds of each of these formulae.

In the present application, the expression dielectrically positive describes compounds or components where Δε>3.0, dielectrically neutral describes those where −1.5≤Δε≤3.0 and dielectrically negative describes those where Δε<−1.5. Δε is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta \varepsilon$ is defined as $(\varepsilon_\| - \varepsilon_\perp)$, while $\varepsilon_{av.}$ is $(\varepsilon_\| + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The ranges of the parameters indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are indicated in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta \varepsilon$) is determined at a frequency of 1 kHz. The threshold voltages, as well as all other electro-optical properties, are determined using test cells produced at Merck KGaA, Germany. The test cells for the determination of $\Delta \varepsilon$ have a cell thickness of approximately 20 µm. The electrode is a circular ITO electrode having an area of 1.13 cm² and a guard ring. The orientation layers are SE-1211 from Nissan Chemicals, Japan, for homeotropic orientation ($\varepsilon_\|$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), midgrey ($V_{50}$) and saturation ($V_{90}$) voltages have been determined for 10%, 50% and 90% relative contrast, respectively.

The liquid-crystal media according to the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

By addition of suitable additives, the liquid-crystal media according to the present invention can be modified in such a way that they can be used in all known types of liquid-crystal displays, either using the liquid-crystal media as such, such as TN, TN-AMD, ECB-AMD, VAN-AMD, IPS-AMD, FFS-AMD LCDs, or in composite systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

C 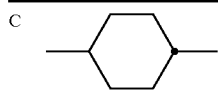

TABLE A-continued
Ring elements
| | | | | |
|---|---|---|---|---|
| P | 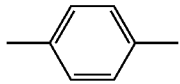 | | | |
| D | 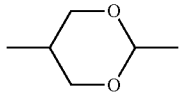 | Dl | 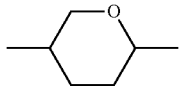 | |
| A | 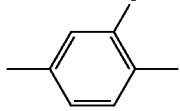 | Al | 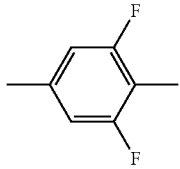 | |
| G | 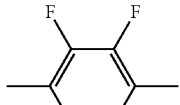 | Gl | 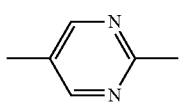 | |
| U | 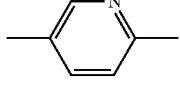 | Ul | 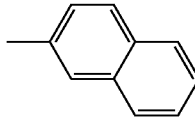 | |
| Y | 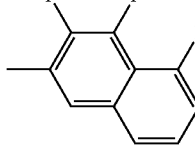 | | | |
| M | 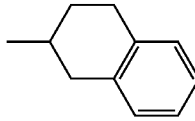 | Ml | 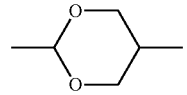 | |
| N | 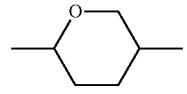 | Nl | 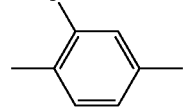 | |
| Np | 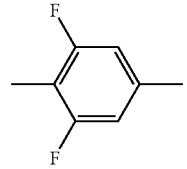 | dH | 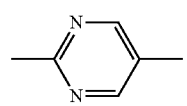 | |
| N3f | 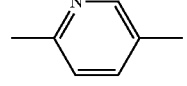 | N3fl | 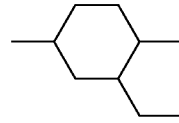 | |
| tH | 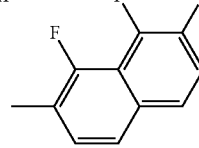 | tHl | 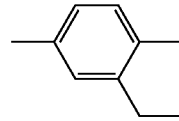 | |
| tH2f | 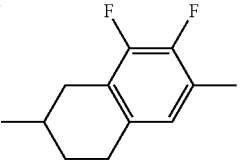 | tH2fl | 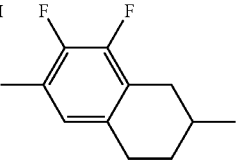 | |
| K | 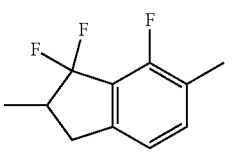 | Kl | 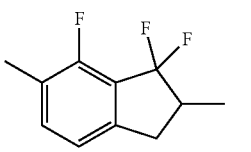 | |
| L | 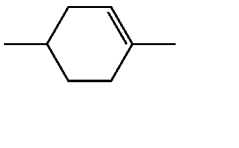 | Ll | 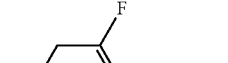 | |
| F | 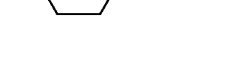 | Fl | 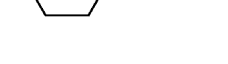 | |
| Nf | 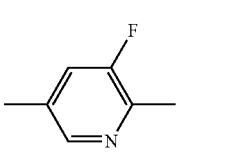 | Nfl | 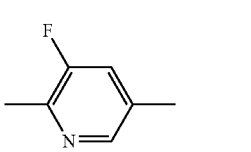 | |
TABLE B
Linking groups
| | | | |
|---|---|---|---|
| E | —CH$_2$CH$_2$— | Z | —CO—O— |
| V | —CH=CH— | Zl | —O—CO— |
| X | —CF=CH— | O | —CH$_2$—O— |
| Xl | —CH=CF— | Ol | —O—CH$_2$— |
| B | —CF=CF— | Q | —CF$_2$—O— |
| T | —C≡C— | Ql | —O—CF$_2$— |
| W | —CF$_2$CF$_2$— | | |

TABLE C

| End groups | | | |
|---|---|---|---|
| Left-hand side | | Right-hand side | |
| Use alone | | | |
| -n- | $C_nH_{2n+1}$— | -n | —$C_nH_{2n+1}$ |
| —nO— | $C_nH_{2n+1}$—O— | —nO | —O—$C_nH_{2n+1}$ |
| —V— | $CH_2$=CH— | —V | —CH=$CH_2$ |
| —nV— | $C_nH_{2n+1}$—CH=CH— | —nV | —$C_nH_{2n}$—CH=$CH_2$ |
| —Vn— | $CH_2$=CH—$C_nH_{2n+1}$— | —Vn | —CH=CH—$C_nH_{2n+1}$ |
| —nVm— | $C_nH_{2n+1}$—CH=CH—$C_mH_{2m}$— | —nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2$O— | —OM | —$OCFH_2$ |
| —DO— | $CF_2$HO— | —OD | —$OCF_2H$ |
| —TO— | $CF_3$O— | —OT | —$OCF_3$ |
| —OXF— | $CF_2$=CH—O— | —OXF | —O—CH=$CF_2$ |
| —A— | H—C≡C— | —A | —C≡C—H |
| —nA— | $C_nH_{2n+1}$—C≡C— | —An | —C≡C—$C_nH_{2n+1}$ |
| —NA— | N≡C—C≡C— | —AN | —C≡C—C≡N |
| Use together with one another and with others | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— |
| -...X...- | —CH=CF— | -...X... | —CH=CF— |
| -...XI...- | —CF=CH— | -...XI... | —CF=CH— | in which n and m each denote integers, and the three dots "..." are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

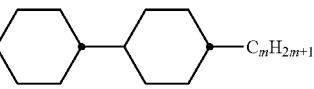

CC-n-m

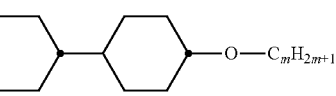

CC-n-Om

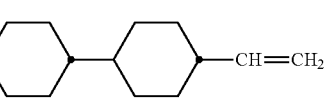

CC-n-V

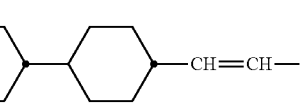

TABLE D-continued
Illustrative structures
CC-n-Vm
CC-n-mV
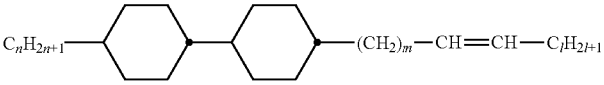
CC-n-mVl
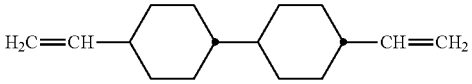
CC-V-V
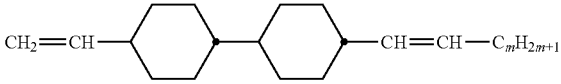
CC-V-mV
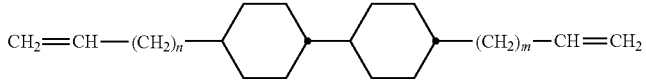
CC-V-Vm
CC-Vn-mV
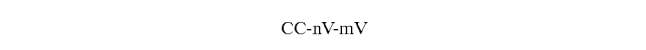
CC-nV-mV
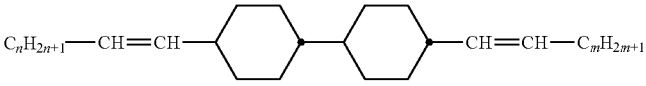
CC-nV-Vm
CP-n-m
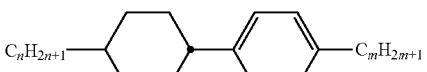
CP-nO-m
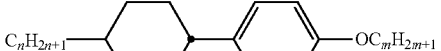
CP-n-Om TABLE D-continued
Illustrative structures
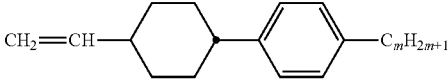
CP-V-m
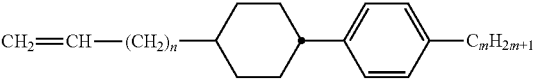
CP-Vn-m
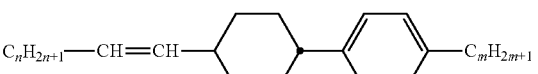
CP-nV-m
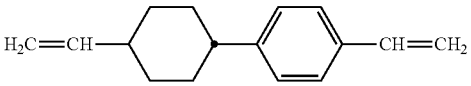
CP-V-V
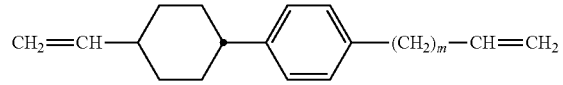
CP-V-mV
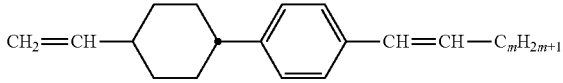
CP-V-Vm
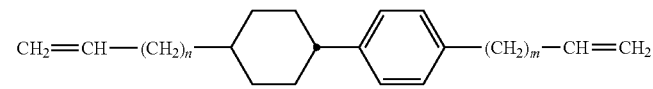
CP-Vn-mV
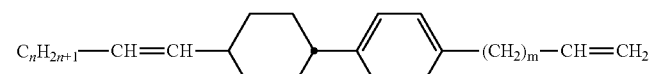
CP-nV-mV
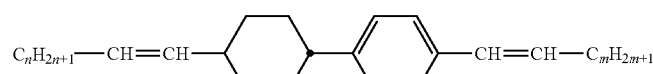
CP-nV-Vm
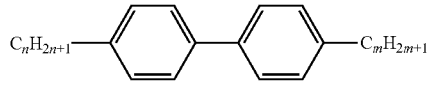
PP-n-m
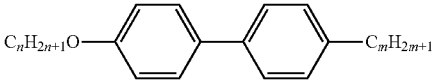
PP-nO-m TABLE D-continued
Illustrative structures
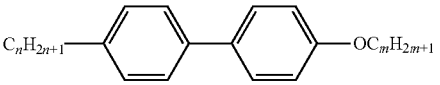
PP-n-Om
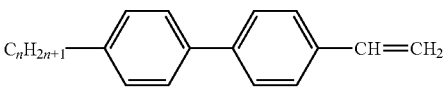
PP-n-V
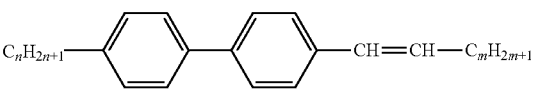
PP-n-Vm
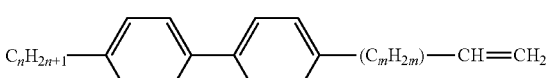
PP-n-mV
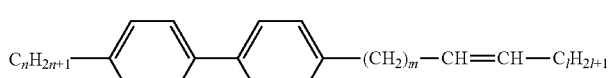
PP-n-mVl
CCP-n-m
CCP-nO-m
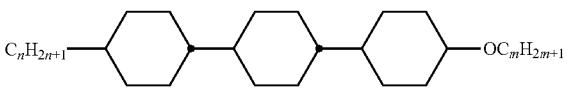
CCP-n-Om
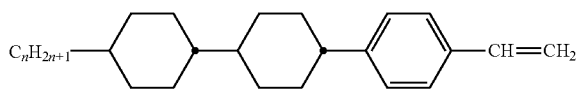
CCP-n-V
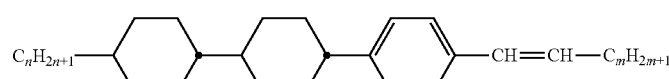
CCP-n-Vm
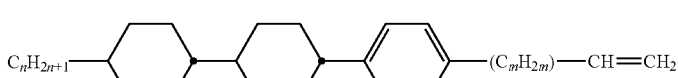
CCP-n-mV TABLE D-continued Illustrative structures $C_nH_{2n+1}$—[Cy]—[Cy]—[Ph]—$(C_mH_{2m})$—CH=CH—$C_lH_{2l+1}$ CCP-n-mVl $H_2C$=CH—[Cy]—[Cy]—[Ph]—$C_mH_{2m+1}$ CCP-V-m $C_nH_{2n+1}$—CH=CH—[Cy]—[Cy]—[Ph]—$C_mH_{2m+1}$ CCP-nV-m $CH_2$=CH—$(CH_2)_n$—[Cy]—[Cy]—[Ph]—$C_mH_{2m+1}$ CCP-Vn-m $C_nH_{2n+1}$—CH=CH—$(CH_2)_m$—[Cy]—[Cy]—[Ph]—$C_lH_{2l+1}$ CCP-n-Vm-l $C_nH_{2n+1}$—[Cy]—[Ph]—[Ph]—$C_mH_{2m+1}$ CPP-n-m $C_nH_{2n+1}$—[Cy]—[Ph]—[Ph(F)]—$C_mH_{2m+1}$ CPG-n-m $C_nH_{2n+1}$—[Cy]—[Ph(F)]—[Ph]—$C_mH_{2m+1}$ CGP-n-m $C_nH_{2n+1}O$—[Cy]—[Ph]—[Ph]—$C_mH_{2m+1}$ CPP-nO-m $C_nH_{2n+1}$—[Cy]—[Ph]—[Ph]—$OC_mH_{2m+1}$ CPP-n-Om $H_2C$=CH—[Cy]—[Ph]—[Ph]—$C_mH_{2m+1}$ TABLE D-continued
Illustrative structures
CPP-V-m
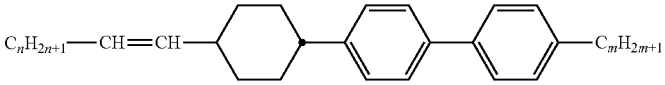
CPP-n-V-m
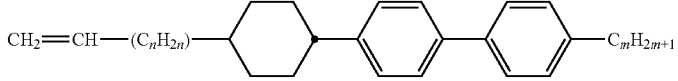
CPP-Vn-m
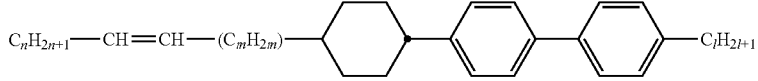
CPP-nVm-I
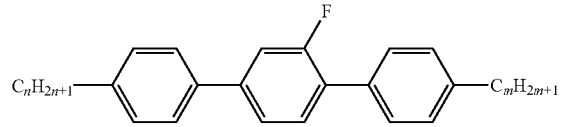
PGP-n-m
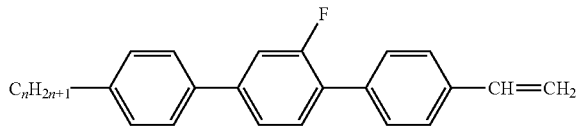
PGP-n-V
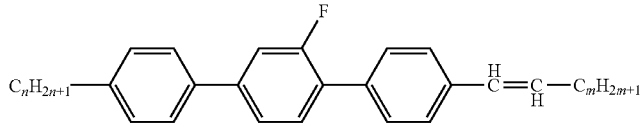
PGP-n-Vm
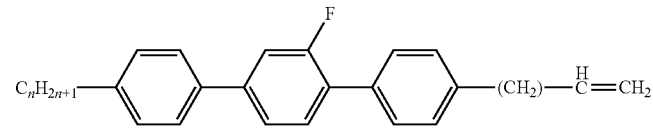
PGP-n-mV
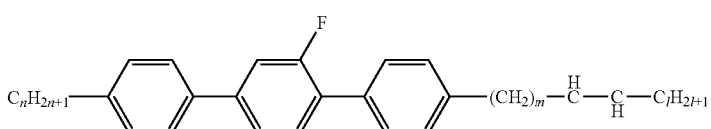
PGP-n-mVl
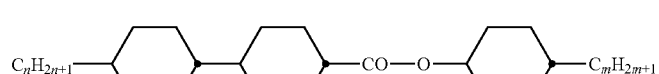
CCZC-n-m
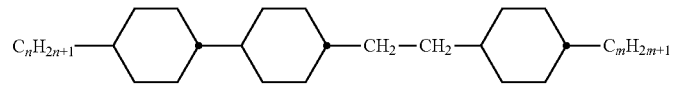

TABLE D-continued
Illustrative structures
CCEC-n-m
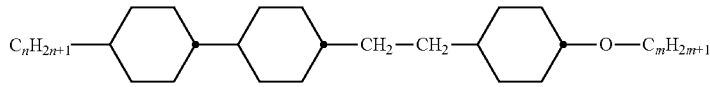
CCEC-n-Om
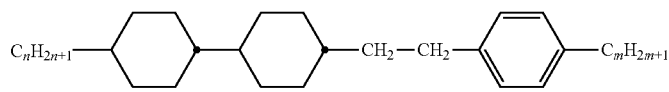
CCEP-n-m
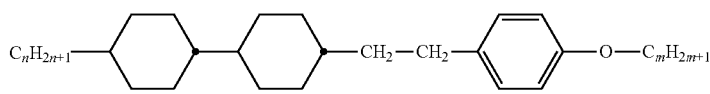
CCEP-n-Om
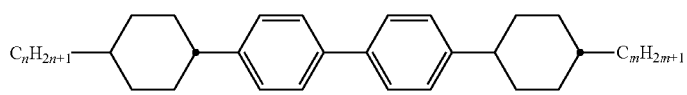
CPPC-n-m
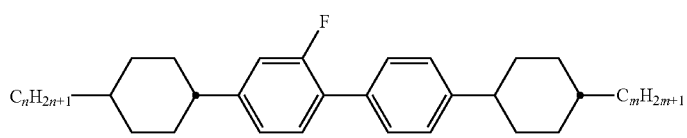
CGPC-n-m
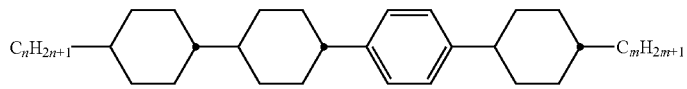
CCPC-n-m
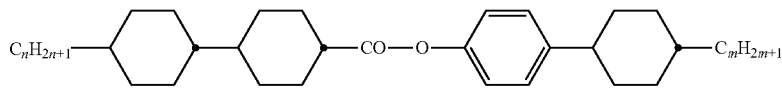
CCZPC-n-m
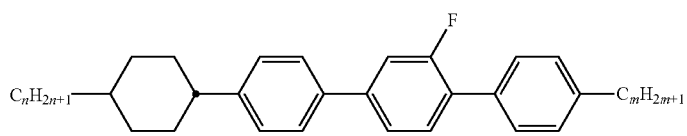
CPGP-n-m
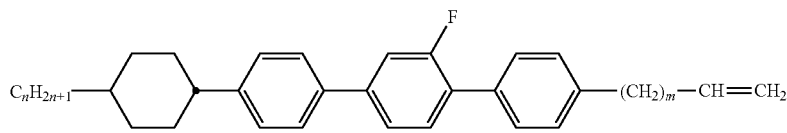
CPGP-n-mV
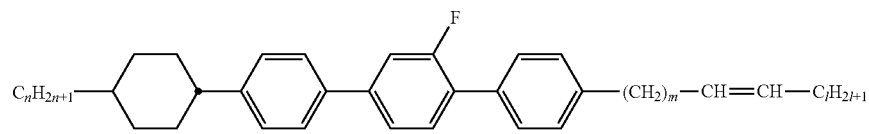

TABLE D-continued
| Illustrative structures |
|---|
CPGP-n-mVI
PGIGP-n-m
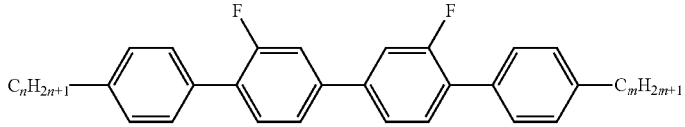
CP-n-F
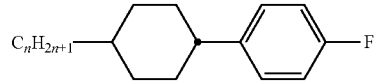
CP-n-CL
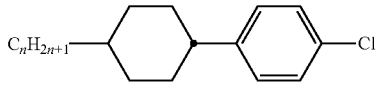
GP-n-F
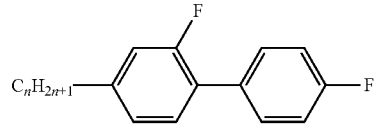
GP-n-CL
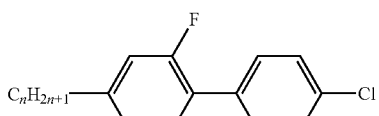
CCP-n-OT
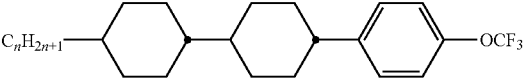
CCG-n-OT
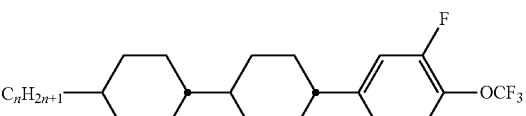
CCP-n-T
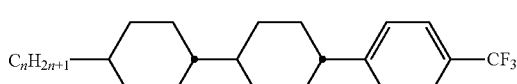
CCG-n-F
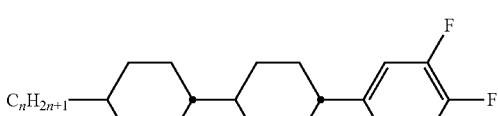

TABLE D-continued
| Illustrative structures |
|---|
| 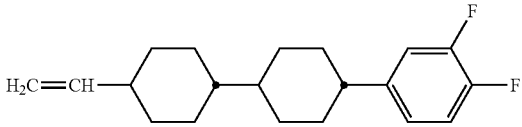 CCG-V-F |
| 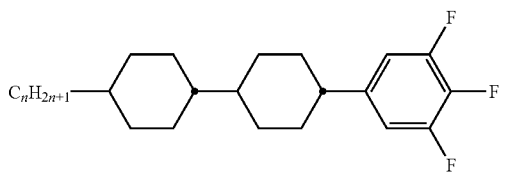 CCU-n-F |
| 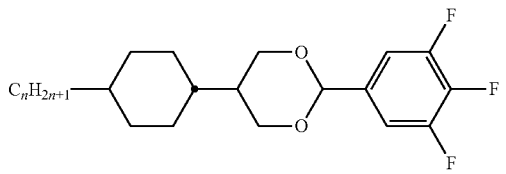 CDU-n-F |
| 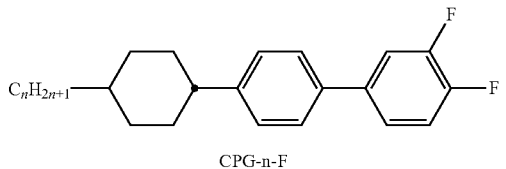 CPG-n-F |
| 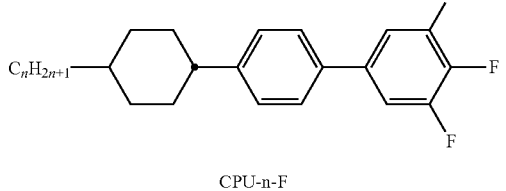 CPU-n-F |
| 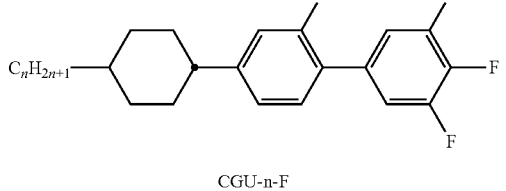 CGU-n-F |
| 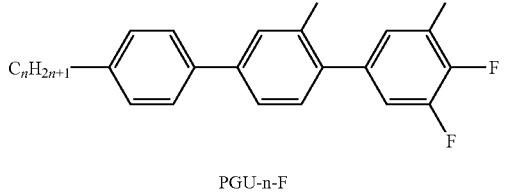 PGU-n-F |

TABLE D-continued
Illustrative structures
GGP-n-F
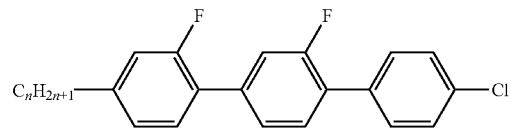
GGP-n-CL
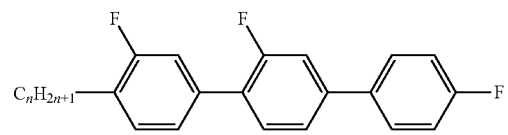
PGIGI-n-F
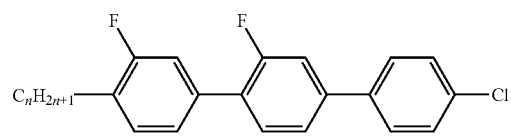
PGIGI-n-CL
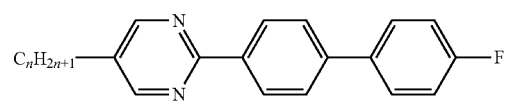
MPP-n-F
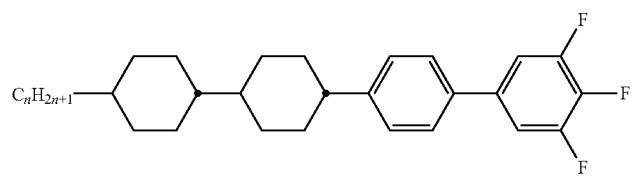
CCPU-n-F
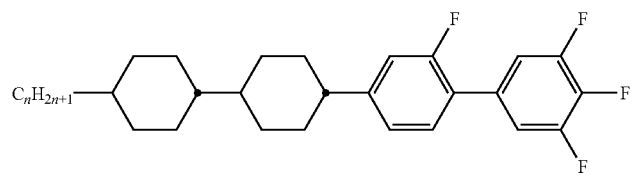
CCGU-n-F
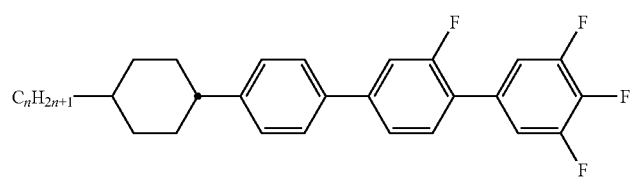
CPGU-n-F
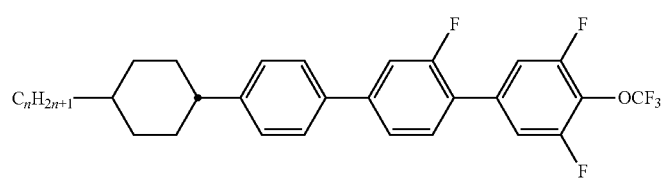

TABLE D-continued
Illustrative structures
CPGU-n-OT
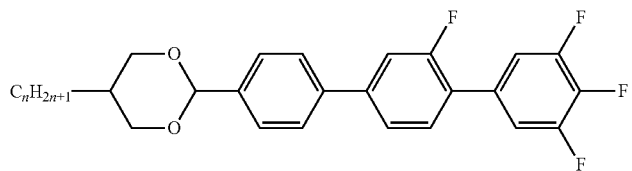
DPGU-n-F
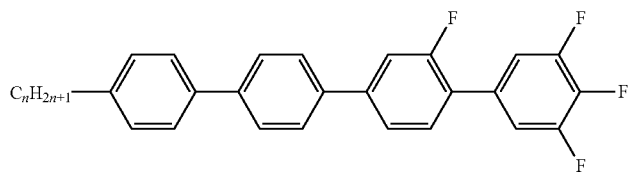
PPGU-n-F
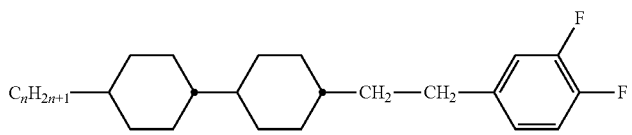
CCEG-n-F
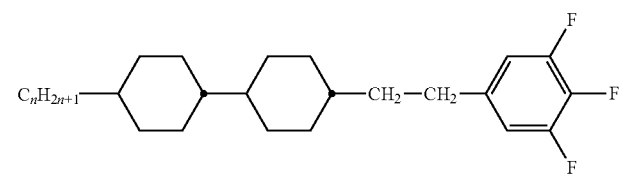
CCEU-n-F
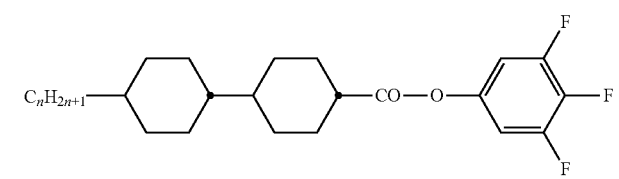
CCZU-n-F
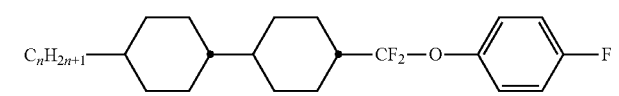
CCQP-n-F
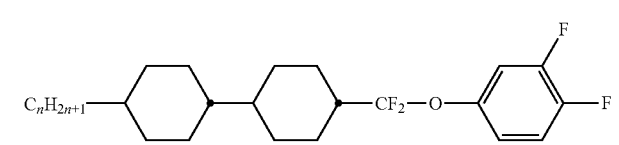
CCQG-n-F TABLE D-continued
Illustrative structures
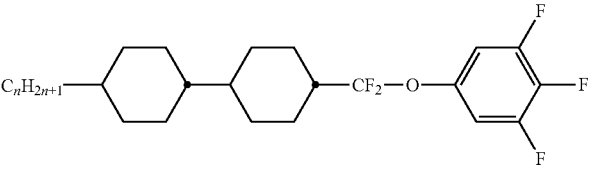
CCQU-n-F
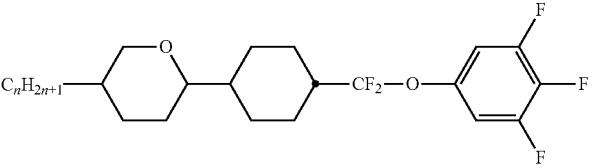
ACQU-n-F
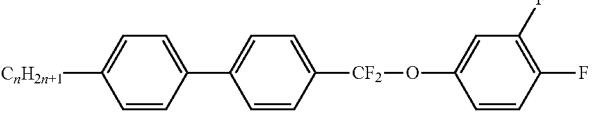
PPQG-n-F
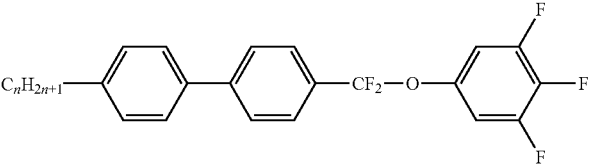
PPQU-n-F
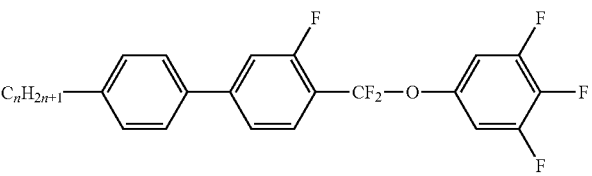
PGQU-n-F
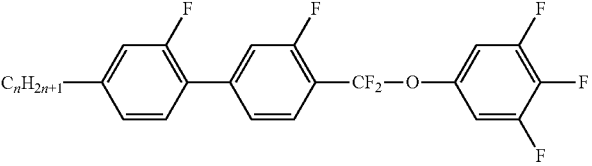
GGQU-n-F
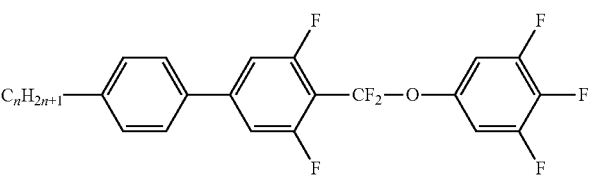
PUQU-n-F TABLE D-continued
Illustrative structures
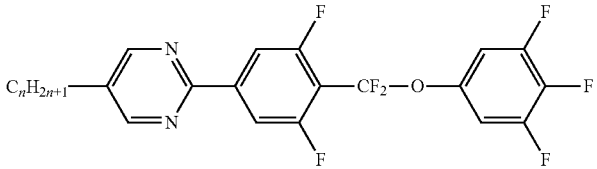
MUQU-n-F
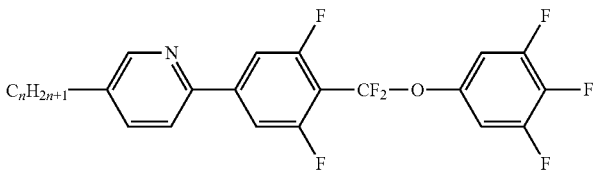
NUQU-n-F
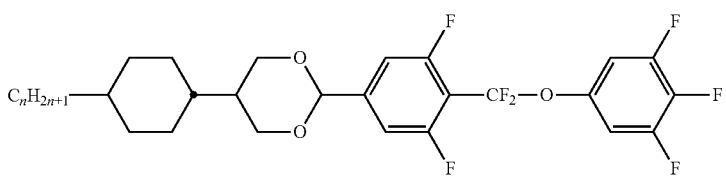
CDUQU-n-F
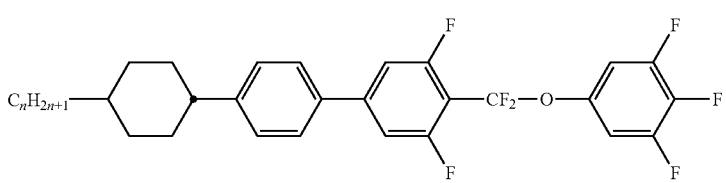
CPUQU-n-F
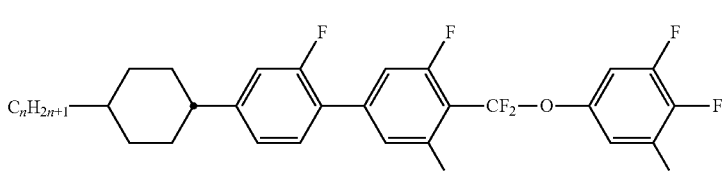
CGUQU-n-F
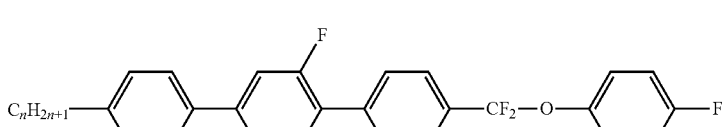
PGPQP-n-F
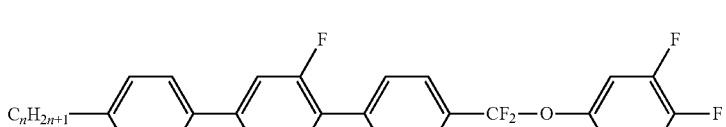
PGPQG-n-F TABLE D-continued Illustrative structures

[Structure: PGPQU-n-F] $C_nH_{2n+1}$—[phenyl]—[phenyl with F]—[phenyl]—$CF_2$—O—[phenyl with 3F]

PGPQU-n-F

[Structure: PGUQU-n-F] $C_nH_{2n+1}$—[phenyl]—[phenyl with F]—[phenyl with 2F]—$CF_2$—O—[phenyl with 3F]

PGUQU-n-F

[Structure: APUQU-n-F] $C_nH_{2n+1}$—[tetrahydropyran]—[phenyl]—[phenyl with 2F]—$CF_2$—O—[phenyl with 3F]

APUQU-n-F

[Structure: DGUQU-n-F] $C_nH_{2n+1}$—[dioxane]—[phenyl with F]—[phenyl with 2F]—$CF_2$—O—[phenyl with 3F]

DGUQU-n-F in which n, m and l preferably, independently of one another, denote 1 to 7.

The following table, Table E, shows illustrative compounds which can be used as additional stabilisers in the mesogenic media according to the present invention.

TABLE E

[Structure: bis-phenol with CH₂ bridge, methyl and t-butyl substituents, two OH groups]

[Structure: bis-phenol with CH(iPr) bridge, methyl and t-butyl substituents, two OH groups]

TABLE E-continued

[Structure: $C_nH_{2n+1}$—[phenyl with two t-butyl groups]—OH]

[Structure: $C_nH_{2n+1}$—[cyclohexyl]—H—[phenyl with two t-butyl groups]—OH]

TABLE E-continued
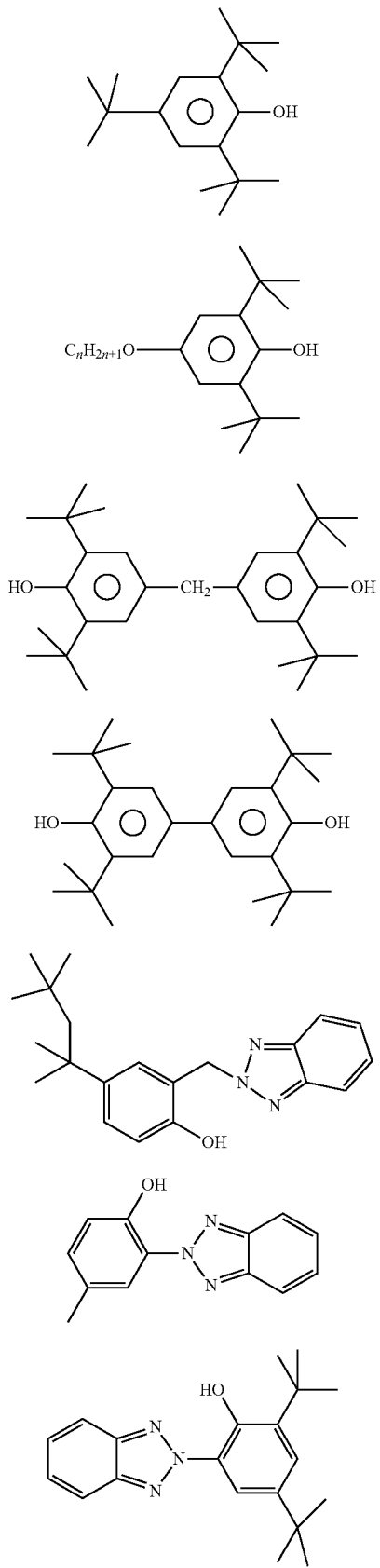
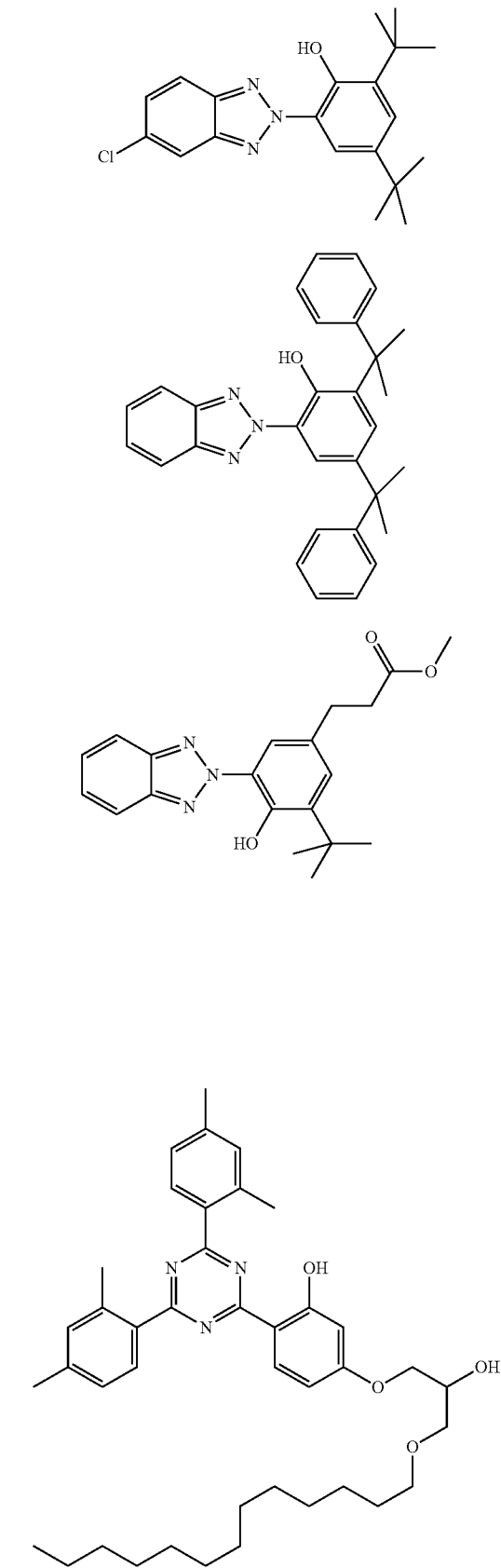

TABLE E-continued
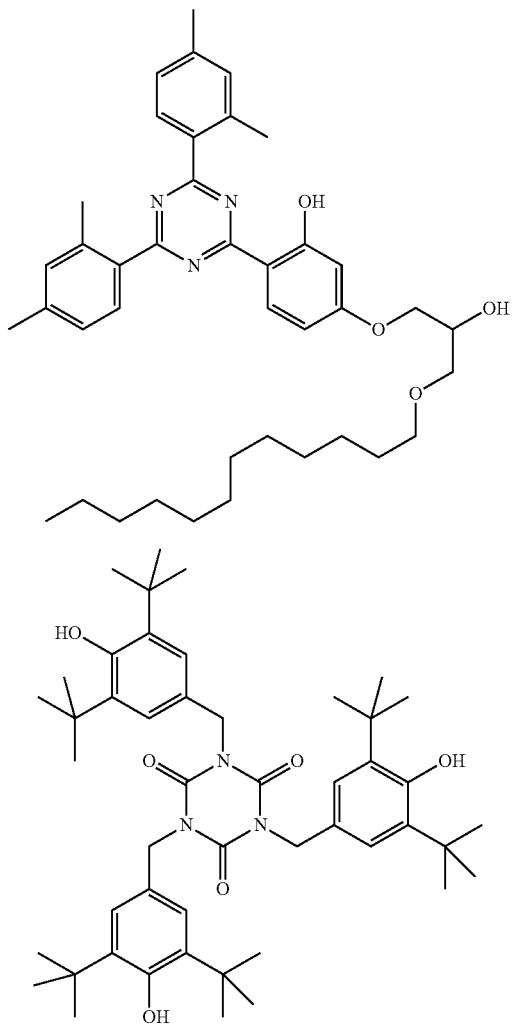
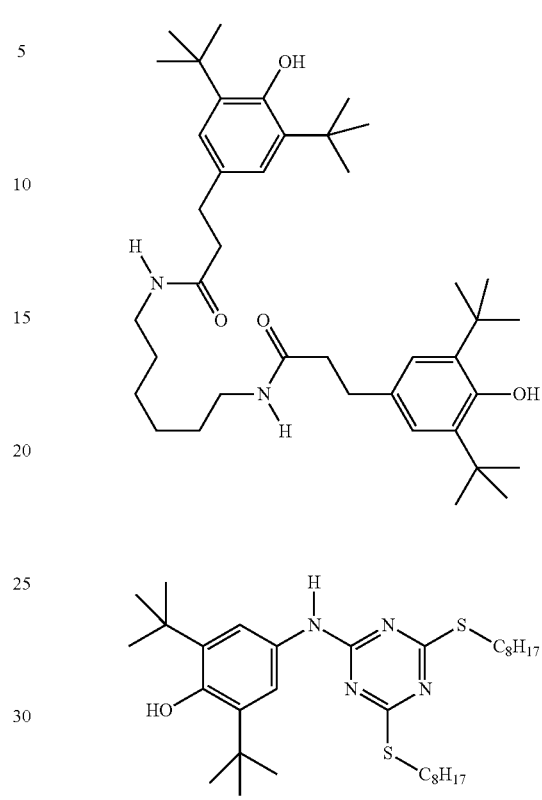
In a preferred embodiment of the present invention, the mesogenic media comprise one or more compounds selected from the group of the compounds from Table E.
Table F below shows illustrative compounds which can preferably be used as chiral dopants in the mesogenic media according to the present invention.
TABLE F
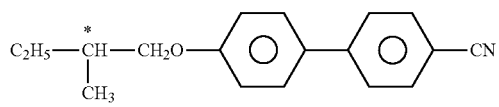
C 15
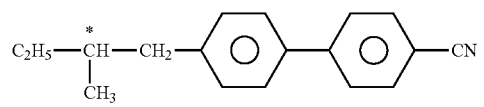
CB 15
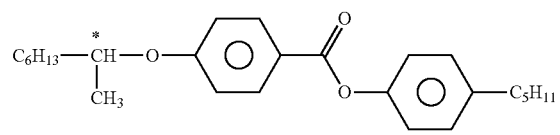
CM 21

TABLE F-continued
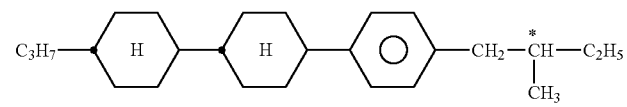
CM 44
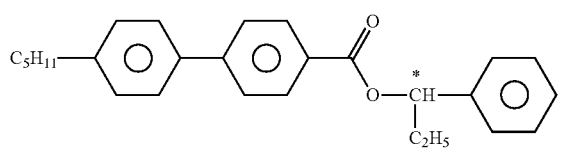
CM 45
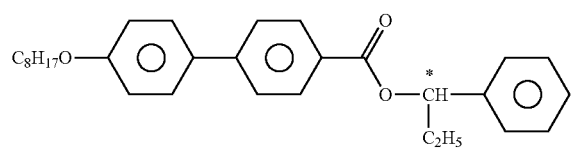
CM 47
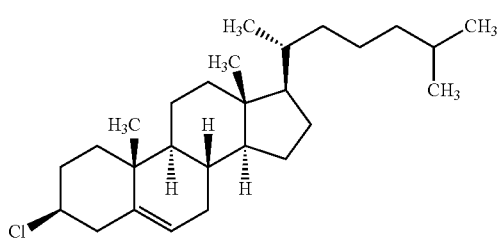
CC
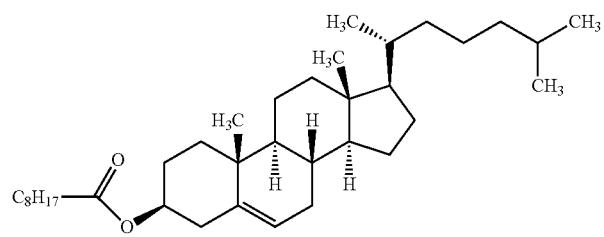
CN
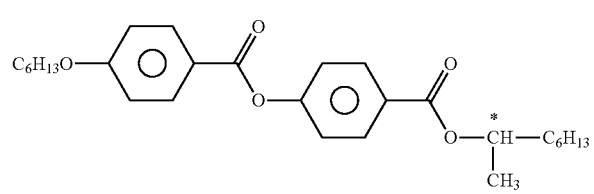
R/S-811
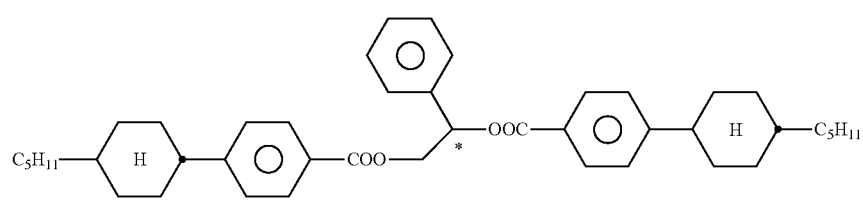
R/S-1011

TABLE F-continued

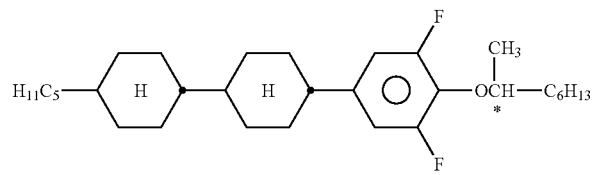

R/S-2011

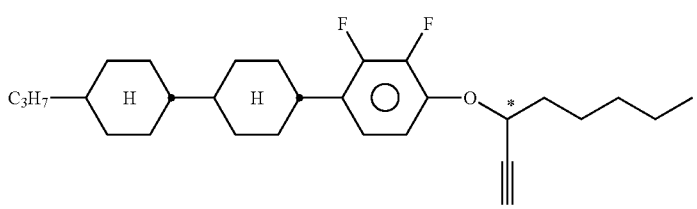

R/S-3011

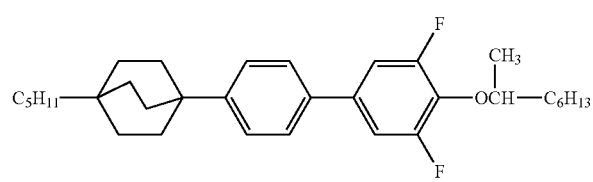

R/S-4011

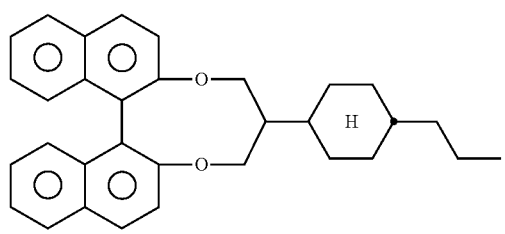

R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise
- seven or more, preferably eight or more, individual compounds, preferably of three or more, particularly preferably of four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Liquid-crystal mixtures having the composition and properties as indicated in the following tables are prepared and investigated.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 10 2015 008 508.5, filed Jul. 3, 2015, and German application No. 10 2016 002 502.6 are incorporated by reference herein.

Example 1: Comparative Examples 1.0 to 1.4 and Examples 1.1 and 1.2
Mixture M-1:

| Composition Compound | | | |
|---|---|---|---|
| No. | Abbreviation | c/% | Physical properties |
| 1 | CCG-3-OT | 10.0 | T (N, I) = 73.5° C. |
| 2 | CCG-5-OT | 10.0 | $n_e$ (20° C., 589.3 nm) = 1.5484 |
| 3 | CCU-2-F | 12.0 | Δn (20° C., 589.3 nm) = 0.0731 |

Example 1: Comparative Examples 1.0 to 1.4 and Examples 1.1 and 1.2 Mixture M-1:

| No. | Composition Compound Abbreviation | c/% | Physical properties |
|---|---|---|---|
| 4 | CCU-3-F | 10.0 | $\varepsilon_{\|}$ (20° C., 1 kHz) = 8.6 |
| 5 | CCU-5-F | 8.0 | $\varepsilon_\perp$ (20° C., 1 kHz) = 5.4 |
| 6 | CCEG-3-F | 10.0 | $\varepsilon_{av.}$ (20° C., 1 kHz) = 5.0 |
| 7 | CCEG-5-F | 10.0 | $k_1$ (20° C.) = 13 pN |
| 8 | CC-3-5 | 10.0 | $k_3$ (20° C.) = 16 pN |
| 9 | CP-5-3 | 20.0 | $\gamma_1$ (20° C.) = 114 mPa · s |
| Σ |  | 100.0 | $V_{10}$ (20° C.) = 1.87 V |
|  |  |  | $V_{90}/V_{10}$ (20° C.) = 1.49 |

This mixture (mixture M-1) is prepared and divided into five parts. The first part is investigated without addition of a further compound. 1,000 ppm of one of the four compounds to be investigated, here, for comparison, the known compound of the formula "Cyasorb UV 2908", "Cya" for short, likewise for comparison the likewise known compound of the formula "Stab.", in each case a compound of the formula I, more precisely of the formula I-1-1a or of the formula I-2-1a, as compiled in the following table, are in each case added to the further four parts of the mixture.

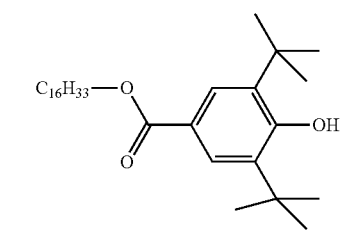

Cya

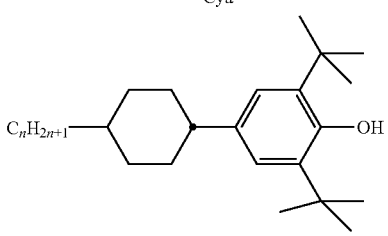

Stab.

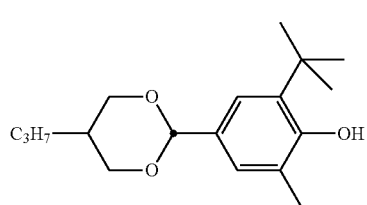

I-1-1a

Phase sequence: $T_g$ 8 C 110 I,

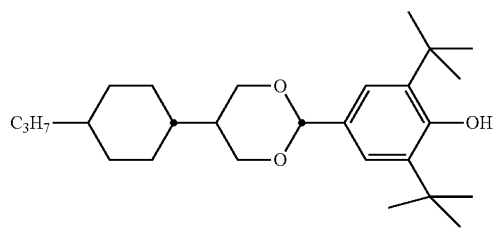

I-2-1a

Phase sequence: C 144 I.

The four parts of the mixture are investigated as follows.

As an alternative to the compounds of the formulae I-1-1a and I-2-1a, the compounds of the formulae I-1-2, I-1-3 and I-3-1a are also suitable.

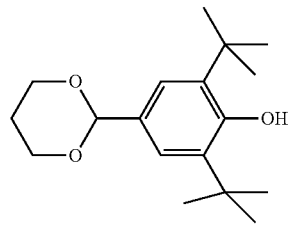

I-1-2

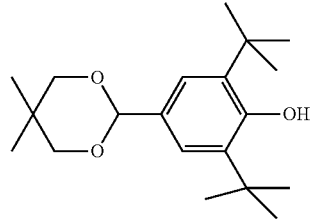

I-1-3

Phase sequence: C 129 I,

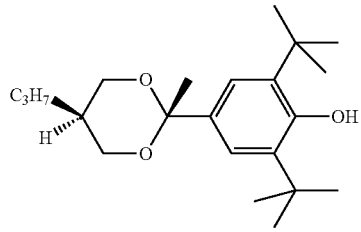

I-3-1a

Phase sequence: $T_g$ 6 C 147 I.

In each case, six test cells having the alignment layer AL-3046 (Japan Synthetic Rubber (JSR), Japan) and a layer thickness of 3.2 μm and transversal electrodes as for TN cells are filled and investigated with respect to their voltage holding ratio (VHR or HR for short). The initial value and the value after heating for four hours at a temperature of 150° C. in "bulk" are determined. The HR is in each case measured at a temperature of 100° C., after 5 minutes in the oven. The voltage is 1 V at 50 Hz (signal voltage ("source"): rectangular voltage with 1 V, 25 Hz, pulse voltage ("gate") 10 V, 50 Hz, 60 μs, refresh rate 50 Hz). The results are compiled in the following table.

| Example | Formula | c(X)/ppm | $HR_0$/% | $HR_{temp}$/% |
|---------|---------|----------|----------|---------------|
| V1.0a   | None    | 0        | 99.6     | 90.6          |
| V1.1a   | Cya     | 1,000    | 98.4     | 98.4          |
| V1.2a   | Stab.   | 1,000    | 99.6     | 99.5          |
| 1.1a.1  | I-1-1a  | 1,000    | 99.5     | 99.6          |
| 1.2a.1  | 1-2-1a  | 1,000    | 99.7     | 99.6          |
| 1.1a.2  | I-1-1a  | 10,000   | 99.6     | 99.4          |
| 1.2a.2  | I-2-1a  | 10,000   | 99.7     | 99.6          |

Notes:
. . . X: compound of the corresponding formula,
HR at 100° C.,
$HR_{temp}$ after 4 h at 150° C. in bulk.

The mixtures of Examples 1.1 and 1.2, which each comprise a compound of the formula I (I-1-1a or I-2-1a), are distinguished, in particular, by excellent heat stability.

The absence of additives results in a significant drop in the HR of the mixture by 9% after heating. Although the compound Cya does not exhibit a further drop after heating, it is, however, distinguished by a very unfavourable lower starting value. No significant difference is evident between Stab. and I-1-1a and I-2-1a on pure heating. The materials meet all three necessary prerequisites for very good thermal stabilisation. The improvements in the compounds of the formulae I-1-1a and I-1-2a compared with Cya are evident in the further investigations, for example, through higher HR values and their smaller decrease on UV exposure.

The previous table additionally includes corresponding results for mixtures which comprise 10,000 ppm of in each case one of the compounds of the formula I-1-1a or I-1-2a (Examples 1.1a.2 and 1.2a.2).

The substances according to the invention can thus also be employed, as shown, in concentrations which are greater than those typically used in the case of conventional stabilisers without the properties of the mixtures suffering or the stabilising action decreasing.

Corresponding investigations of the four different mixtures described in sealed test cells with exposure to light were subsequently carried out. The stability to light is investigated by means of a test in a corresponding instrument, "Suntest CPS+" from Atlas MTS. To this end, the HR is determined before and after exposure to light. To this end, the cells are exposed to illumination for certain times in the "Suntest" at 20° C. for 1 hour or for 4 hours. The HR is then determined as described above. In addition, the compounds (1) 2,6-di-tert-butyl-4-methylphenol (also called BHT) and (2) 2,6-di-tert-butyl-4-heptylphenol (also called αHBHT), as shown in the following table, were investigated as further comparative compounds in two further parts of mixture M-1, likewise in a concentration of 1,000 ppm.

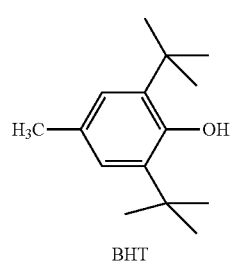

BHT

-continued

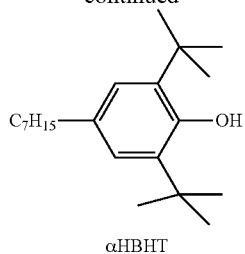

αHBHT

The results are summarised in the following table.

| Example | Formula | c(X)/ppm | $t_{UV}$/h 1 $HR_{UV}(t)$/% | 4 $HR_{UV}(t)$/% |
|---------|---------|----------|------------------------------|-------------------|
| V1.0b   | None    | 0        | 98.7                         | 98.0              |
| V1.1b   | Cya     | 1,000    | 97.0                         | 91.1              |
| V1.2b   | Stab.   | 1,000    | 98.9                         | t.b.d.            |
| V1.3b   | (1)     | 1,000    | 99.2                         | t.b.d.            |
| V1.4b   | (2)     | 1,000    | 99.1                         | t.b.d.            |
| 1.1b    | I-1-1a  | 1,000    | 98.4                         | 95.1              |
| 1.2b    | I-2-1a  | 1,000    | 99.4                         | 95.9              |

Notes:
. . . X: compound of the corresponding formula,
t.b.d.: to be determined,
HR at 100° C.,
$HR_{UV}$ after exposure with 765 W/m² in the cell over the stated time span of 1 hour or 4 hours.

The compounds of the formulae I-1-1a and I-2-1a are at least similarly suitable for the stabilisation of this mixture (M-1) as the comparative compounds. Their superiority in other mixtures, for example having higher polarity, is shown in the following examples.

Example 2

Comparative Examples 2.0 to 2.4 and Examples 2.1 and 2.2

10% of the compound MPP-5-F are added to mixture M-1 of Example 1.

The resultant mixture (M-2) is investigated as described under Example 1.

The results are compiled in the following table.

| Example | Formula | c(X)/ppm | $HR_0$/% | $HR_{temp}$/% |
|---------|---------|----------|----------|---------------|
| V2.0a   | None    | 0        | 98.9     | 49.2          |
| V2.1a1  | Cya     | 1,000    | 95.1     | 83.8          |
| V2.1a2  | Cya     | 2,500    | 98.2     | 78.8          |
| V2.1a3  | Cya     | 10,000   | 96.2     | 39            |
| V2.2a   | Stab.   | 1,000    | 99.8     | 99.9          |
| 2.1a    | I-1-1a  | 1,000    | t.b.d.   | t.b.d.        |
| 2.2a1   | I-2-1a  | 1,000    | 99.2     | 99.3          |
| 2.2a.2  | I-2-1a  | 10,000   | 99.2     | 99.0          |

Notes:
. . . X: compound of the corresponding formula,
t.b.d.: to be determined,
HR at 100° C.,
$HR_{temp}$ after 4 h at 150° C. in bulk.

The above table additionally includes corresponding results for mixtures which comprise 2,500 ppm or 10,000 ppm of the compound Cya or 10,000 ppm of the compound of the formula I-2-1a.

The substances to be employed in accordance with the invention can thus also be employed, as shown, in concentrations which are greater than those typically used in the case of conventional stabilisers without the properties of the mixtures suffering or the stabilising action decreasing.

In contrast to the compounds used in accordance with the present application, the comparative compound Cya does not achieve adequate heat stabilisation at 1,000 ppm. An increase in the concentration of the compound Cya to 2,500 ppm or 10,000 ppm even results in a decrease in the heat stabilisation action. This clearly demonstrates the poor suitability of Cya.

The stability of the mixtures to exposure to light was subsequently determined as described in Example 1. The results are summarised in the following table.

| Example | Formula | $t_{UV}$/h c(X)/ppm | 1 $HR_{UV}(t)$/% | 4 $HR_{UV}(t)$/% |
|---|---|---|---|---|
| V2.0b | None | 0 | 61.8 | 98.0 |
| V2.1b | Cya | 1,000 | 46 | 26 |
| V2.2b | Stab. | 1,000 | 395 | t.b.d. |
| V2.3b | (1) | 1,000 | 33 | t.b.d. |
| V2.4b | (2) | 1,000 | 378 | t.b.d. |
| 2.1b | I-1-1a | 1,000 | 48 | 38 |
| 2.2b | I-2-1a | 1,000 | 46 | 37 |

Notes:
... X: compound of the corresponding formula,
t.b.d.: to be determined,
HR at 100° C.,
$HR_{UV}$ after exposure with 765 W/m² in the cell over the stated time span of 1 hour or 4 hours.

The above table shows that Cya, which, as shown above, does not thermally stabilise adequately, initially exhibits equivalent behaviour on UV exposure of only 1 hour. On longer UV exposure, however, the two compounds I-1-1a and I-2-1a to be employed in accordance with the invention exhibit clear advantages over Cya after exposure to light.

The two compounds I-1-1a and I-2-1a to be employed in accordance with the invention already exhibit clear advantages over all three further comparative compounds Stab., (1) and (2) after exposure for 1 hour. The difference is particularly clear in comparison with the structurally similar compound Stab.

Example 3

Comparative Examples 3.0 to 3.4 and Examples 3.1 and 3.2

10% of the compound PGUQU-5-F are added to mixture M-1 of Example 1. The resultant mixture (M-3) is investigated as described under Example 1. The results are compiled in the following table.

| Example | Formula | c(X)/ppm | $HR_0$/% | $HR_{temp}$/% |
|---|---|---|---|---|
| V3.0 | None | 0 | 99.0 | 77.0 |
| V3.1.1 | Cya | 1,000 | 96.6 | 88.8 |
| V3.2 | Stab. | 1,000 | 99.1 | 98.4 |
| 3.1 | I-1-1a | 1,000 | 98.0 | 98.2 |
| 3.2 | I-2-1a | 1,000 | 99.1 | 98.9 |
| V3.1.2 | Cya | 10,000 | 96.9 | 55.4 |
| 3.2.2 | I-2-1a | 10,000 | 99.1 | 98.8 |

Notes:
... X: compound of the corresponding formula,
HR at 100° C.,
$HR_{temp}$ after 4 h at 150° C. in bulk.

Here too, it was possible to show that the substances to be employed in accordance with the invention can also be employed in concentrations which are greater than those typically used in the case of conventional stabilisers without the properties of the mixtures suffering or the stabilising action decreasing.

By contrast, for example, the comparative compound Cya does not achieve adequate thermal stabilisation at a concentration of 1,000 ppm, and an increase in the concentration of Cya to 10,000 ppm even results in a decrease in thermal stabilisation. Consequently, compound Cya is not suitable for stabilising the corresponding mixtures.

The stability of the mixtures to exposure to light was subsequently determined as described in Example 1. The results are summarised in the following table.

| Example | Formula | $t_{UV}$/h c(X)/ppm | 1 $HR_{UV}(t)$/% | 4 $HR_{UV}(t)$/% |
|---|---|---|---|---|
| V3.0b | None | 0 | 75.3 | 77.6 |
| V3.1b | Cya | 1,000 | t.b.d. | t.b.d. |
| V3.2b | Stab. | 1,000 | 42 | 20 |
| V3.3b | (1) | 1,000 | 51 | t.b.d. |
| V3.4b | (2) | 1,000 | 50 | t.b.d. |
| 3.1b | I-1-1a | 1,000 | 77.8 | 63.3 |
| 3.2b | I-2-1a | 1,000 | 76.7 | 64.7 |

Notes:
... X: compound of the corresponding formula,
t.b.d.: to be determined,
HR at 100° C.,
$HR_{UV}$ after exposure with 765 W/m² in the cell over the stated time span of 1 hour or 4 hours.

In this example, the influence of the added compounds on the electrooptical properties and on the switching behaviour of the resultant mixtures was additionally investigated. To this end, TN test cells having a cell thickness which results in an optical retardation (d·Δn) of 0.5 μm, corresponding to the $1^{st}$ transmission minimum according to Gooch and Tarry, were used. The investigations are carried out using a DMS-301 instrument from Autronic Melchers, Karlsruhe. To this end, a rectangular voltage of 6 V (PP: "peak to peak") with a frequency of 80 Hz is used at a temperature of 20° C. The following table shows by way of example the threshold voltage for the characteristic voltages and the switching-off response time for the response times.

| Example | Formula | c(X)/ppm | $\tau_{off}(0)$/ms | $\tau_{off}(1\ h)$/msV |
|---|---|---|---|---|
| V3.0b | None | 0 | 75.3 | 77.6 |
| V3.1b | Cya | 1,000 | 82.3 | 73.4 |
| V3.2b | Stab. | 1,000 | 41.7 | 19.6 |
| V3.3b | (1) | 1,000 | 50.8 | 36.2 |
| V3.4b | (2) | 1,000 | 50.0 | 38.4 |
| 3.1b | I-1-1a | 1,000 | 77.8 | 63.3 |
| 3.2b | I-2-1a | 1,000 | 76.7 | 64.7 |

Notes:
... X: compound of the corresponding formula,
$\tau_{off}(t = 0)$ before exposure,
$\tau_{off}(t = 1)$ after exposure with 765 W/m² for 1 h in the cell over the stated time span of 1 hour or 4 hours.

| Example | Formula | $t_{UV}$/h c(X)/ppm | 0 $V_{10}$/V | 1 $V_{10}$/V | 0 $\tau_{off}$/ms | 1 $\tau_{off}$/ms |
|---|---|---|---|---|---|---|
| V3.0b | None | 0 | 1.51 | 1.51 | 24.7 | 24.8 |
| V3.1b | Cya | 1,000 | t.b.d. | t.b.d. | t.b.d. | t.b.d. |
| V3.2b | Stab. | 1,000 | 1.51 | 1.54 | 24.8 | 23.2 |
| V3.3b | (1) | 1,000 | 1.51 | 1.55 | 24.8 | 23.6 |
| V3.4b | (2) | 1,000 | t.b.d. | t.b.d. | t.b.d. | t.b.d. |

-continued

| Example | Formula | $t_{UV}$/h c(X)/ppm | 0 $V_{10}$/V | 1 $V_{10}$/V | 0 $\tau_{off}$/ms | 1 $\tau_{off}$/ms |
|---|---|---|---|---|---|---|
| 3.1b | I-1-1a | 1,000 | 1.50 | 1.51 | 25.3 | 24.4 |
| 3.2b | I-2-1a | 1,000 | 1.51 | 1.51 | 25.0 | 24.6 |

Notes:
t.b.d.: to be determined

It can be seen from the results in the above table that the compounds of the formulae I-1-1a and I-1-1b to be employed in accordance with the invention result in a smaller increase in the threshold after exposure to light than, for example, the two comparative compounds "Stab." and (1).

In this example too, it can again be seen that heat stabilisation of the mixture is generally necessary. The three compounds Stab., I-1-1a and I-2-1a, and in particular the latter two, clearly have superior efficacy to compound Cya.

Example 4

Comparative Examples 4.0 to 4.4 and Examples 4.1 and 4.2

20% of the compound CC-3-V are added to mixture M-1 of Example 1. The resultant mixture (M-4) is investigated as described under Example 1. However, three different concentrations (to be precise 50 ppm, 100 ppm and 1,000 ppm) of the compounds to be investigated are alternatively added to the starting mixtures here. The results are compiled in the following table.

| Example | Formula | c(X)/ppm | $HR_0$/% | $HR_{temp}$/% |
|---|---|---|---|---|
| V4.0 | None | 0 | 99.8 | 90.2 |
| V4.1-1 | Cya | 1,000 | 99.1 | 98.4 |
| V4.1-2 | Cya | 100 | t.b.d. | t.b.d. |
| V4.1-3 | Cya | 50 | t.b.d. | t.b.d. |
| V4.2-1 | Stab. | 1,000 | 99.5 | 99.4 |
| V4.2-2 | Stab. | 100 | 99.2 | 99.4 |
| V4.2-3 | Stab. | 50 | 99.5 | 99.4 |
| 4.1-1 | I-1-1a | 1,000 | 99.6 | 99.7 |
| 4.1-2a | I-1-1a | 100 | 99.7 | 99.7 |
| 4.1-2b | I-1-1a | 200 | 99.7 | 99.7 |
| 4.1-2c | I-1-1a | 300 | 99.7 | 99.7 |
| 4.1-3 | I-1-1a | 50 | 99.8 | 99.6 |
| 4.2-1a | I-2-1a | 1,000 | 99.7 | 99.8 |
| 4.2-1b | I-2-1a | 10,000 | 99.9 | 99.8 |
| 4.2-2 | I-2-1a | 100 | t.b.d. | t.b.d. |
| 4.2-3 | I-2-1a | 50 | t.b.d. | t.b.d. |

Notes:
... X: compound of the corresponding formula,
t.b.d.: to be determined,
HR at 100° C.,
$HR_{temp}$ after 4 h at 150° C. in bulk.

The excellent heat stabilisation action of the compounds to be employed in accordance with the invention over a greater concentration range from 50 ppm to 10,000 ppm is clearly evident from these results.

It is clearly evident that the compound Cya also has a weaker heat stabilisation action in this mixture, which is significantly less polar compared with the mixture of the preceding example.

The stability of the mixtures to exposure to light was subsequently determined as described in Example 1. The results are summarised in the following table.

| Example | Formula | $t_{UV}$/h c(X)/ppm | 1 $HR_{UV}(t)$/% | 4 $HR_{UV}(t)$/% |
|---|---|---|---|---|
| V4.0b | None | 0 | 98.7 | 95.9 |
| V4.1b | Cya | 1,000 | 98.8 | 96.4 |
| V4.2b | Stab. | 1,000 | t.b.d. | t.b.d. |
| V4.3b | (1) | 1,000 | t.b.d. | t.b.d. |
| V4.4b | (2) | 1,000 | t.b.d. | t.b.d. |
| 4.1b | I-1-1a | 1,000 | 99.4 | 94.6 |
| 4.2b | I-2-1a | 1,000 | 99.6 | 95.9 |

Notes:
... X: compound of the corresponding formula,
t.b.d.: to be determined,
HR at 100° C.,
$HR_{UV}$ after exposure with 765 W/m² in the cell over the stated time span of 1 hour or 4 hours.

The compounds to be employed in accordance with the invention are again the most suitable here. In order to achieve good heat stabilisation, they can be employed in a very broad concentration range, and the resultant mixtures exhibit at best only a small drop in the HR on exposure to light or UV radiation. The comparative compound Cya is less suitable here owing to its significantly less pronounced heat stabilisation action.

Examples 5 to 12

The corresponding mixtures M-6 to M-12 are prepared and investigated as in Example 1. In all tables, "t.b.d." means to be determined.

Example 5

| Mixture M-5: | | | |
|---|---|---|---|
| Composition Compound | | | |
| No. | Abbreviation | c/% | Physical properties |
| 1 | CP-3-CL | 3.0 | T(N, I) = 76.0° C. |
| 2 | CCP-3-OT | 8.0 | $n_e$ (20° C., 589.3 nm) = 1.5949 |
| 3 | CCP-5-OT | 7.0 | Δn (20° C., 589.3 nm) = 0.1142 |
| 4 | CPU-3-F | 10.0 | $\varepsilon_\parallel$ (20° C., 1 kHz) = 17.6 |
| 5 | CCQU-3-F | 15.0 | Δε (20° C., 1 kHz) = 11.7 |
| 6 | PUQU-3-F | 8.5 | $\varepsilon_{av.}$ (20° C., 1 kHz) = 9.8 |
| 7 | CPGU-3-OT | 4.0 | $k_1$ (20° C.) = t.b.d. pN |
| 8 | APUQU-3-F | 7.0 | $k_3$ (20° C.) = t.b.d. pN |
| 9 | PGUQU-3-F | 7.0 | $\gamma_1$ (20° C.) = t.b.d. mPa · s |
| 10 | CC-3-V | 16.0 | $V_{10}$ (20° C.) = t.b.d. V |
| 11 | CP-3-O1 | 9.0 | $V_{90}/V_{10}$ (20° C.) = t.b.d. |
| 12 | PGP-2-5 | 5.5 | |
| Σ | | 100.0 | |

Notes:
t.b.d. = to be determined (this abbreviation applies throughout the application).

Example 6

| Mixture M-6: | | | |
|---|---|---|---|
| Composition Compound | | | |
| No. | Abbreviation | c/% | Physical properties |
| 1 | PGU-3-F | 7.0 | T(N, I) = 75.5° C. |
| 2 | CCQU-3-F | 4.0 | $n_e$ (20° C., 589.3 nm) = 1.5935 |
| 3 | PUQU-3-F | 15.0 | Δn (20° C., 589.3 nm) = 0.1114 |
| 4 | CPGU-3-OT | 3.0 | $\varepsilon_\parallel$ (20° C., 1 kHz) = 17.6 |

-continued

Mixture M-6:

| No. | Abbreviation | c/% | Physical properties |
|---|---|---|---|
| 5 | APUQU-2-F | 7.0 | $\Delta\varepsilon$ (20° C., 1 kHz) = 13.8 |
| 6 | APUQU-3-F | 7.0 | $\varepsilon_{av.}$ (20° C., 1 kHz) = 8.4 |
| 7 | PGUQU-3-F | 7.0 | $k_1$ (20° C.) = t.b.d. pN |
| 8 | CC-3-V | 32.0 | $k_3$ (20° C.) = t.b.d. pN |
| 9 | CC-3-V1 | 6.0 | $\gamma_1$ (20° C.) = t.b.d. mPa · s |
| 10 | CCP-3-1 | 12.0 | $V_{10}$ (20° C.) = t.b.d. V |
| Σ | | 100.0 | $V_{90}/V_{10}$ (20° C.) = t.b.d. |

Example 7

Mixture M-7:

| No. | Abbreviation | c/% | Physical properties |
|---|---|---|---|
| 1 | PGU-3-F | 10.0 | T(N, I) = 76.0° C. |
| 2 | DPGU-3-F | 2.0 | $n_e$ (20° C., 589.3 nm) = 1.6316 |
| 3 | DPGU-4-F | 3.0 | $\Delta n$ (20° C., 589.3 nm) = 0.1385 |
| 4 | PGUQU-3-F | 8.0 | $\varepsilon_{\parallel}$ (20° C., 1 kHz) = 8.6 |
| 5 | CC-3-V | 42.0 | $\Delta\varepsilon$ (20° C., 1 kHz) = 5.6 |
| 6 | CC-3-V1 | 8.0 | $\varepsilon_{av.}$ (20° C., 1 kHz) = 4.9 |
| 7 | PGP-2-3 | 9.0 | $k_1$ (20° C.) = t.b.d. pN |
| 8 | PGP-2-4 | 8.0 | $k_3$ (20° C.) = t.b.d. pN |
| 9 | PGP-2-5 | 10.0 | $\gamma_1$ (20° C.) = t.b.d. mPa · s |
| Σ | | 100.0 | $V_{10}$ (20° C.) = t.b.d. V |
| | | | $V_{90}/V_{10}$ (20° C.) = t.b.d. |

Example 8

Mixture M-8:

| No. | Abbreviation | c/% | Physical properties |
|---|---|---|---|
| 1 | PUQU-3-F | 7.5 | T(N, I) = 70.0° C. |
| 2 | CPGU-3-OT | 2.5 | $n_e$ (20° C., 589.3 nm) = 1.5956 |
| 3 | APUQU-3-F | 8.0 | $\Delta n$ (20° C., 589.3 nm) = 0.1114 |
| 4 | PGUQU-3-F | 8.0 | $\varepsilon_{\parallel}$ (20° C., 1 kHz) = 9.5 |
| 5 | CC-3-V | 48.0 | $\Delta\varepsilon$ (20° C., 1 kHz) = 6.3 |
| 6 | CC-3-V1 | 9.0 | $\varepsilon_{av.}$ (20° C., 1 kHz) = 5.3 |
| 7 | PGP-2-4 | 7.0 | $k_1$ (20° C.) = t.b.d. pN |
| 8 | PGP-2-5 | 10.0 | $k_3$ (20° C.) = t.b.d. pN |
| Σ | | 100.0 | $\gamma_1$ (20° C.) = t.b.d. mPa · s |
| | | | $V_{10}$ (20° C.) = t.b.d. V |
| | | | $V_{90}/V_{10}$ (20° C.) = t.b.d. |

Example 9

Mixture M-9:

| No. | Abbreviation | c/% | Physical properties |
|---|---|---|---|
| 1 | PGU-3-F | 3.0 | T(N, I) = 75.5° C. |
| 2 | CCQU-2-F | 8.0 | $n_e$ (20° C., 589.3 nm) = 1.5903 |

-continued

Mixture M-9:

| No. | Abbreviation | c/% | Physical properties |
|---|---|---|---|
| 3 | ACQU-3-F | 10.0 | $\Delta n$ (20° C., 589.3 nm) = 0.1113 |
| 4 | PUQU-3-F | 15.0 | $\varepsilon_{\parallel}$ (20° C., 1 kHz) = 24.4 |
| 5 | DPGU-4-F | 8.0 | $\Delta\varepsilon$ (20° C., 1 kHz) = 20.0 |
| 6 | APUQU-2-F | 6.0 | $\varepsilon_{av.}$ (20° C., 1 kHz) = 11.1 |
| 7 | APUQU-3-F | 7.0 | $k_1$ (20° C.) = t.b.d. pN |
| 8 | PGUQU-3-F | 7.0 | $k_3$ (20° C.) = t.b.d. pN |
| 9 | CC-3-V | 22.0 | $\gamma_1$ (20° C.) = t.b.d. mPa · s |
| 10 | CC-3-V1 | 8.0 | $V_{10}$ (20° C.) = t.b.d. V |
| 11 | CCP-3-1 | 6.0 | $V_{90}/V_{10}$ (20° C.) = t.b.d. |
| Σ | | 100.0 | |

Example 10

Mixture M-10:

| No. | Abbreviation | c/% | Physical properties |
|---|---|---|---|
| 1 | ACQU-2-F | 10.0 | T(N, I) = 81.0° C. |
| 2 | ACQU-3-F | 12.0 | $n_e$ (20° C., 589.3 nm) = 1.5786 |
| 3 | PUQU-3-F | 11.0 | $\Delta n$ (20° C., 589.3 nm) = 0.1030 |
| 4 | CPGU-3-OT | 4.0 | $\varepsilon_{\parallel}$ (20° C., 1 kHz) = 20.9 |
| 5 | APUQU-2-F | 6.0 | $\Delta\varepsilon$ (20° C., 1 kHz) = 16.7 |
| 6 | APUQU-3-F | 7.0 | $\varepsilon_{av.}$ (20° C., 1 kHz) = 9.8 |
| 7 | PGUQU-3-F | 8.0 | $k_1$ (20° C.) = t.b.d. pN |
| 8 | CC-3-V | 24.0 | $k_3$ (20° C.) = t.b.d. pN |
| 9 | CC-3-V1 | 6.0 | $\gamma_1$ (20° C.) = t.b.d. mPa · s |
| 10 | CCP-3-1 | 12.0 | $V_{10}$ (20° C.) = t.b.d. V |
| Σ | | 100.0 | $V_{90}/V_{10}$ (20° C.) = t.b.d. |

Example 11

Mixture M-11:

| No. | Abbreviation | c/% | Physical properties |
|---|---|---|---|
| 1 | PUQU-3-F | 8.0 | T(N, I) = 75.5° C. |
| 2 | APUQU-2-F | 9.0 | $n_e$ (20° C., 589.3 nm) = 1.5831 |
| 3 | APUQU-3-F | 9.0 | $\Delta n$ (20° C., 589.3 nm) = 0.1001 |
| 4 | PGUQU-3-F | 9.0 | $\varepsilon_{\parallel}$ (20° C., 1 kHz) = 13.0 |
| 5 | CC-3-V | 48.0 | $\Delta\varepsilon$ (20° C., 1 kHz) = 9.6 |
| 6 | CCP-V-1 | 15.0 | $\varepsilon_{av.}$ (20° C., 1 kHz) = 6.6 |
| 7 | PGP-2-3 | 2.0 | $k_1$ (20° C.) = t.b.d. pN |
| Σ | | 100.0 | $k_3$ (20° C.) = t.b.d. pN |
| | | | $\gamma_1$ (20° C.) = t.b.d. mPa · s |
| | | | $V_{10}$ (20° C.) = t.b.d. V |
| | | | $V_{90}/V_{10}$ (20° C.) = t.b.d. |

Example 12

Mixture M-12:

Composition Compound

| No. | Abbreviation | c/% | Physical properties |
|---|---|---|---|
| 1 | PGU-3-F | 7.0 | $T(N, I) = 75.5°$ C. |
| 2 | CCQU-3-F | 4.0 | $n_e$ (20° C., 589.3 nm) = t.b.d. |
| 3 | PUQU-3-F | 7.0 | $\Delta n$ (20° C., 589.3 nm) = 0.1114 |
| 4 | CPGU-3-OT | 3.0 | $\varepsilon_\parallel$ (20° C., 1 kHz) = 17.6 |
| 5 | APUQU-2-F | 7.0 | $\Delta\varepsilon$ (20° C., 1 kHz) = 13.8 |
| 6 | APUQU-3-F | 7.0 | $\varepsilon_{av.}$ (20° C., 1 kHz) = 8.4 |
| 7 | PGUQU-3-F | 7.0 | $k_1$ (20° C.) = t.b.d. pN |
| 8 | CC-3-V | 32.0 | $k_3$ (20° C.) = t.b.d. pN |
| 9 | CC-3-V1 | 6.0 | $\gamma_1$ (20° C.) = t.b.d. mPa·s |
| 10 | CCP-3-1 | 12.0 | $V_{10}$ (20° C.) = t.b.d. V |
| Σ | | 100.0 | $V_{90}/V_{10}$ (20° C.) = t.b.d. |

The mixtures of Examples 5 to 12 are each divided into four parts. Either 50 ppm or 100 ppm of the compound of the formula I-1-1a or I-2-1a are added to one of the four parts of each of the mixtures. The resultant mixtures are investigated as described above.

The resultant mixtures of Examples 5 to 12, which comprise a compound of the formula I (in particular of the formula I-1-1a or I-2-1a), are distinguished, in particular, by excellent heat stability.

Example 13

Mixture M-13:

Composition Compound

| No. | Abbreviation | c/% | Physical properties |
|---|---|---|---|
| 1 | CCG-V-F | 18.0 | $T(N, I) = 106°$ C. |
| 2 | CCP-3-OT | 5.0 | $n_e$ (20° C., 589.3 nm) = 1.5800 |
| 3 | CCP-5-OT | 3.0 | $\Delta n$ (20° C., 589.3 nm) = 0.0945 |
| 4 | APUQU-2-F | 1.5 | $\varepsilon_\parallel$ (20° C., 1 kHz) = 7.5 |
| 5 | APUQU-3-F | 4.0 | $\Delta\varepsilon$ (20° C., 1 kHz) = 4.6 |
| 6 | CDUQU-3-F | 3.0 | $\varepsilon_{av.}$ (20° C., 1 kHz) = 4.4 |
| 7 | DGUQU-4-F | 3.0 | $k_1$ (20° C.) = 15.4 pN |
| 8 | CC-3-V | 25.0 | $k_3$ (20° C.) = 20.2 pN |
| 9 | CC-3-V1 | 5.5 | $\gamma_1$ (20° C.) = 83 mPa·s |
| 10 | CC-3-2V1 | 2.0 | $V_0$ (20° C.) = 1.93 V |
| 11 | CCP-V-1 | 10.0 | $V_{90}/V_{10}$ (20° C.) = t.b.d. |
| 12 | CCP-V2-1 | 8.0 | |
| 13 | CCVC-3-V | 5.0 | |
| 14 | PP-1-2V1 | 4.0 | |
| 15 | PGP-2-2V | 3.0 | |
| Σ | | 100.0 | |

40 ppm of the compound of the formula I-1-1a are added to the mixture. The resultant mixtures are investigated as described above. They are distinguished, in particular, by excellent heat stability.

Example 14

Mixture M-14:

Composition Compound

| No. | Abbreviation | c/% | Physical properties |
|---|---|---|---|
| 1 | CCG-V-F | 17.0 | $T(N, I) = 104°$ C. |
| 2 | CCP-3-OT | 4.0 | $n_e$ (20° C., 589.3 nm) = 1.5794 |
| 3 | CCP-5-OT | 3.0 | $\Delta n$ (20° C., 589.3 nm) = 0.0949 |
| 4 | CLP-3-T | 3.0 | $\varepsilon_\parallel$ (20° C., 1 kHz) = 7.4 |
| 5 | CCQU-3-F | 5.5 | $\Delta\varepsilon$ (20° C., 1 kHz) = 4.5 |
| 6 | APUQU-2-F | 2.0 | $\varepsilon_{av.}$ (20° C., 1 kHz) = 4.4 |
| 7 | DGUQU-4-F | 4.0 | $k_1$ (20° C.) = 16.0 pN |
| 8 | DPGU-4-F | 2.0 | $k_3$ (20° C.) = 20.2 pN |
| 9 | CC-3-V | 23.5 | $\gamma_1$ (20° C.) = 84 mPa·s |
| 10 | CC-3-V1 | 5.5 | $V_0$ (20° C.) = 1.98 V |
| 11 | CC-3-2V1 | 4.0 | $V_{90}/V_{10}$ (20° C.) = t.b.d. |
| 12 | CCP-V-1 | 10.0 | |
| 13 | CCP-V2-1 | 4.0 | |
| 14 | CCVC-3-V | 5.0 | |
| 15 | PP-1-2V1 | 4.5 | |
| 16 | PGP-2-2V | 3.0 | |
| Σ | | 100.0 | |

40 ppm of the compound of the formula I-1-1a are added to the mixture. The resultant mixtures are investigated as described above. They are distinguished, in particular, by excellent heat stability.

Example 15

Mixture M-15:

Composition Compound

| No. | Abbreviation | c/% | Physical properties |
|---|---|---|---|
| 1 | PGU-3-F | 4.0 | $T(N, I) = 69.5°$ C. |
| 2 | PUQU-3-F | 9.50 | $n_e$ (20° C., 589.3 nm) = 1.6300 |
| 3 | PGUQU-3-F | 5.0 | $\Delta n$ (20° C., 589.3 nm) = 0.1337 |
| 4 | DGUQU-4-F | 2.0 | $\varepsilon_\parallel$ (20° C., 1 kHz) = 8.2 |
| 5 | PPGU-3-F | 0.50 | $\Delta\varepsilon$ (20° C., 1 kHz) = 5.1 |
| 6 | CC-3-V | 35.0 | $\varepsilon_{av.}$ (20° C., 1 kHz) = 4.8 |
| 7 | CC-3-V1 | 7.0 | $k_1$ (20° C.) = 13.5 pN |
| 8 | CCP-V-1 | 7.0 | $k_3$ (20° C.) = 12.0 pN |
| 9 | PP-1-2V1 | 7.0 | $\gamma_1$ (20° C.) = 59 mPa·s |
| 10 | PGP-2-3 | 8.0 | $V_0$ (20° C.) = t.b.d. V |
| 11 | PGP-2-4 | 8.0 | $V_{90}/V_{10}$ (20° C.) = t.b.d. |
| 12 | PGP-2-5 | 7.0 | |
| Σ | | 100.0 | |

50 ppm of the compound of the formula I-1-1a are added to the mixture. The resultant mixtures are investigated as described above. They are distinguished, in particular, by excellent heat stability.

Example 16

Mixture M-16:

Composition Compound

| No. | Abbreviation | c/% | Physical properties |
|---|---|---|---|
| 1 | CCU-3-F | 2.50 | $T(N, I) = 77°$ C. |
| 2 | CCQU-3-F | 4.0 | $n_e$ (20° C., 589.3 nm) = 1.6052 |

Mixture M-16:

Composition Compound

| No. | Abbreviation | c/% | Physical properties |
|---|---|---|---|
| 3 | PUQU-3-F | 14.0 | $\Delta n$ (20° C., 589.3 nm) = 0.1206 |
| 4 | CPGU-3-OT | 4.5 | $\varepsilon_{\parallel}$ (20° C., 1 kHz) = 15.8 |
| 5 | APUQU-2-F | 4.0 | $\Delta\varepsilon$ (20° C., 1 kHz) = 12.2 |
| 6 | APUQU-3-F | 5.0 | $\varepsilon_{av.}$ (20° C., 1 kHz) = 7.7 |
| 7 | PGUQU-3-F | 4.0 | $k_1$ (20° C.) = 12.0 pN |
| 8 | PGUQU-4-F | 6.0 | $k_3$ (20° C.) = 12.4 pN |
| 9 | PGUQU-5-F | 1.50 | $\gamma_1$ (20° C.) = 78 mPa · s |
| 10 | PPGU-3-F | 0.50 | $V_0$ (20° C.) = 1.05 V |
| 11 | CC-3-V | 35.0 | $V_{90}/V_{10}$ (20° C.) = t.b.d. |
| 12 | CC-3-V1 | 5.0 | |
| 13 | CCP-V-1 | 5.0 | |
| 14 | PGP-2-2V | 9.0 | |
| Σ | | 100.0 | |

50 ppm of the compound of the formula I-1-1a are added to the mixture. The resultant mixtures are investigated as described above. They are distinguished, in particular, by excellent heat stability.

Example 17

Mixture M-17:

Composition Compound

| No. | Abbreviation | c/% | Physical properties |
|---|---|---|---|
| 1 | PUQU-2-F | 3.0 | T(N, I) = 74.7° C. |
| 2 | PUQU-3-F | 13.5 | $n_e$ (20° C., 589.3 nm) = 1.6284 |
| 3 | PGUQU-3-F | 4.0 | $\Delta n$ (20° C., 589.3 nm) = 0.1338 |
| 4 | PGUQU-4-F | 4.0 | $\varepsilon_{\parallel}$ (20° C., 1 kHz) = 10.6 |
| 5 | DPGU-4-F | 3.0 | $\Delta\varepsilon$ (20° C., 1 kHz) = 7.2 |
| 6 | PPGU-3-F | 1.0 | $\varepsilon_{av.}$ (20° C., 1 kHz) = 5.8 |
| 7 | CC-3-V | 38.5 | $k_1$ (20° C.) = 11.7 pN |
| 8 | CCP-V-1 | 9.0 | $k_3$ (20° C.) = 12.7 pN |
| 9 | PP-1-2V1 | 4.0 | $\gamma_1$ (20° C.) = 53 mPa · s |
| 10 | PGP-1-2V | 10.0 | $V_0$ (20° C.) = 1.34 V |
| 11 | PGP-2-2V | 10.0 | $V_{90}/V_{10}$ (20° C.) = t.b.d. |
| Σ | | 100.0 | |

40 ppm of the compound of the formula I-1-1a are added to the mixture. The resultant mixtures are investigated as described above. They are distinguished, in particular, by excellent heat stability.

Example 18

Mixture M-18:

Composition Compound

| No. | Abbreviation | c/% | Physical properties |
|---|---|---|---|
| 1 | PGU-3-F | 3.50 | T(N, I) = 61° C. |
| 2 | PUQU-3-F | 11.0 | $n_e$ (20° C., 589.3 nm) = 1.5989 |
| 3 | PGUQU-3-F | 5.0 | $\Delta n$ (20° C., 589.3 nm) = 0.1095 |
| 4 | DGUQU-4-F | 2.0 | $\varepsilon_{\parallel}$ (20° C., 1 kHz) = 8.0 |
| 5 | PPGU-3-F | 0.50 | $\Delta\varepsilon$ (20° C., 1 kHz) = 4.9 |
| 6 | CC-3-V | 52.0 | $\varepsilon_{av.}$ (20° C., 1 kHz) = 4.7 |
| 7 | CC-3-V1 | 3.0 | $k_1$ (20° C.) = 10.9 pN |
| 8 | CCP-V-1 | 4.0 | $k_3$ (20° C.) = 10.4 pN |
| 9 | PP-1-2V1 | 2.0 | $\gamma_1$ (20° C.) = 45 mPa · s |
| 10 | PGP-2-3 | 7.0 | $V_0$ (20° C.) = t.b.d. V |
| 11 | PGP-2-4 | 8.0 | $V_{90}/V_{10}$ (20° C.) = t.b.d. |
| 12 | PGP-2-5 | 2.0 | |
| Σ | | 100.0 | |

50 ppm of the compound of the formula I-1-1a are added to the mixture. The resultant mixtures are investigated as described above. They are distinguished, in particular, by excellent heat stability.

Example 19

Mixture M-19:

Composition Compound

| No. | Abbreviation | c/% | Physical properties |
|---|---|---|---|
| 1 | PUQU-3-F | 8.0 | T(N, I) = 99.9° C. |
| 2 | DGUQU-4-F | 2.0 | $n_e$ (20° C., 589.3 nm) = 1.5700 |
| 3 | APUQU-3-F | 8.0 | $\Delta n$ (20° C., 589.3 nm) = 0.0889 |
| 4 | CDUQU-3-F | 8.0 | $\varepsilon_{\parallel}$ (20° C., 1 kHz) = 10.4 |
| 5 | CDU-3-F | 2.0 | $\Delta\varepsilon$ (20° C., 1 kHz) = 7.3 |
| 6 | CC-3-V | 32.0 | $\varepsilon_{av.}$ (20° C., 1 kHz) = 5.5 |
| 7 | CC-3-V1 | 8.0 | $k_1$ (20° C.) = 15.7 pN |
| 8 | CC-3-2V1 | 5.0 | $k_3$ (20° C.) = 18.9 pN |
| 9 | CCP-V-1 | 8.0 | $\gamma_1$ (20° C.) = 83 mPa · s |
| 10 | CCP-V2-1 | 10.0 | $V_0$ (20° C.) = 1.55 V |
| 11 | CPP-3-2 | 2.0 | $V_{90}/V_{10}$ (20° C.) = t.b.d. |
| 12 | CCVC-3-V | 5.0 | |
| 13 | CCPC-3-3 | 2.0 | |
| Σ | | 100.0 | |

50 ppm of the compound of the formula I-1-1a are added to the mixture. The resultant mixtures are investigated as described above. They are distinguished, in particular, by excellent heat stability.

Example 20

Mixture M-20:

Composition Compound

| No. | Abbreviation | c/% | Physical properties |
|---|---|---|---|
| 1 | PGU-3-F | 2.0 | T(N, I) = 74.5° C. |
| 2 | PUQU-3-F | 11.0 | $n_e$ (20° C., 589.3 nm) = 1.6118 |
| 3 | PGUQU-3-F | 5.0 | $\Delta n$ (20° C., 589.3 nm) = 0.1197 |
| 4 | DGUQU-4-F | 2.0 | $\varepsilon_{\parallel}$ (20° C., 1 kHz) = 8.0 |
| 5 | PPGU-3-F | 0.5 | $\Delta\varepsilon$ (20° C., 1 kHz) = 5.0 |
| 6 | CC-3-V | 38.5 | $\varepsilon_{av.}$ (20° C., 1 kHz) = 4.7 |
| 7 | CC-3-V1 | 8.0 | $k_1$ (20° C.) = 12.8 pN |
| 8 | CCP-V-1 | 13.0 | $k_3$ (20° C.) = 13.2 pN |
| 9 | PP-1-2V1 | 3.0 | $\gamma_1$ (20° C.) = 58 mPa · s |
| 10 | PGP-2-2V | 5.5 | $V_0$ (20° C.) = t.b.d. V |
| 11 | PGP-2-2V | 4.5 | $V_{90}/V_{10}$ (20° C.) = t.b.d. |
| 12 | PGP-2-4 | 7.0 | |
| Σ | | 100.0 | |

40 ppm of the compound of the formula I-1-1a are added to the mixture. The resultant mixtures are investigated as described above. They are distinguished, in particular, by excellent heat stability.

Example 21

Mixture M-21:

| Composition Compound | | | |
|---|---|---|---|
| No. | Abbreviation | c/% | Physical properties |
| 1 | PGU-3-F | 2.0 | T(N, I) = 74° C. |
| 2 | PUQU-3-F | 9.5 | $n_e$ (20° C., 589.3 nm) = 1.6413 |
| 3 | PGUQU-3-F | 5.0 | Δn (20° C., 589.3 nm) = 0.1428 |
| 4 | DGUQU-4-F | 2.0 | $\varepsilon_\parallel$ (20° C., 1 kHz) = 8.0 |
| 5 | PPGU-3-F | 0.5 | Δε (20° C., 1 kHz) = 4.9 |
| 6 | CC-3-V | 33.0 | $\varepsilon_{av.}$ (20° C., 1 kHz) = 4.7 |
| 7 | CC-3-V1 | 7.0 | $k_1$ (20° C.) = 14.2 pN |
| 8 | CCP-V-1 | 7.0 | $k_3$ (20° C.) = 13.2 pN |
| 9 | PP-1-2V1 | 9.0 | $\gamma_1$ (20° C.) = 63 mPa · s |
| 10 | PGP-2-3 | 8.0 | $V_0$ (20° C.) = t.b.d. V |
| 11 | PGP-1-2V | 8.0 | $V_{90}/V_{10}$ (20° C.) = t.b.d. |
| 12 | PGP-2-2V | 9.0 | |
| Σ | | 100.0 | |

50 ppm of the compound of the formula I-1-1a are added to the mixture. The resultant mixtures are investigated as described above. They are distinguished, in particular, by excellent heat stability.

Example 22

Mixture M-22:

| Composition Compound | | | |
|---|---|---|---|
| No. | Abbreviation | c/% | Physical properties |
| 1 | CCU-5-F | 4.0 | T(N, I) = 78° C. |
| 2 | CPU-3-F | 10.0 | $n_e$ (20° C., 589.3 nm) = 1.6090 |
| 3 | CPU-3-F | 6.0 | Δn (20° C., 589.3 nm) = 0.1230 |
| 4 | CCQU-3-F | 6.0 | $\varepsilon_\parallel$ (20° C., 1 kHz) = 14.4 |
| 5 | PUQU-3-F | 5.0 | Δε (20° C., 1 kHz) = 10.9 |
| 6 | APUQU-3-F | 3.50 | $\varepsilon_{av.}$ (20° C., 1 kHz) = 7.1 |
| 7 | PGUQU-3-F | 3.0 | $k_1$ (20° C.) = 12.8 pN |
| 8 | PGUQU-4-F | 7.0 | $k_3$ (20° C.) = 12.1 pN |
| 9 | PGUQU-5-F | 7.0 | $\gamma_1$ (20° C.) = 82 mPa · s |
| 10 | CC-3-V | 28.0 | $V_0$ (20° C.) = 1.13 V |
| 11 | CC-3-V1 | 8.0 | $V_{90}/V_{10}$ (20° C.) = t.b.d. |
| 12 | PGP-2-2V | 3.0 | |
| 13 | PGP-2-3 | 5.0 | |
| 14 | PGP-2-4 | 4.5 | |
| Σ | | 100.0 | |

50 ppm of the compound of the formula I-1-1a are added to the mixture. The resultant mixtures are investigated as described above. They are distinguished, in particular, by excellent heat stability.

Example 23

Mixture M-23:

| Composition Compound | | | |
|---|---|---|---|
| No. | Abbreviation | c/% | Physical properties |
| 1 | CCG-V-F | 4.0 | T(N, I) = 104.5° C. |
| 2 | CCP-3-OT | 6.5 | $n_e$ (20° C., 589.3 nm) = 1.6041 |
| 3 | CDUQU-3-F | 4.0 | Δn (20° C., 589.3 nm) = 0.1148 |
| 4 | PGUQU-3-F | 3.0 | $\varepsilon_\parallel$ (20° C., 1 kHz) = 7.6 |
| 5 | PGUQU-4-F | 1.5 | Δε (20° C., 1 kHz) = 4.7 |
| 6 | DGUQU-4-F | 3.5 | $\varepsilon_{av.}$ (20° C., 1 kHz) = 4.5 |
| 7 | DPGU-4-F | 2.0 | $k_1$ (20° C.) = 16.9 pN |
| 8 | CC-3-V | 27.5 | $k_3$ (20° C.) = 19.2 pN |
| 9 | CC-3-V1 | 8.5 | $\gamma_1$ (20° C.) = 80 mPa · s |
| 10 | CP-3-O2 | 1.5 | $V_0$ (20° C.) = 2.01 V |
| 11 | CCP-V-1 | 14.5 | $V_{90}/V_{10}$ (20° C.) = t.b.d. |
| 12 | CCP-V2-1 | 2.5 | |
| 13 | CCVC-3-V | 5.0 | |
| 14 | PP-1-2V1 | 4.0 | |
| 15 | PGP-1-2V | 3.5 | |
| 16 | PGP-2-2V | 6.0 | |
| 17 | PGP-3-2V | 2.5 | |
| Σ | | 100.0 | |

50 ppm of the compound of the formula I-1-1a are added to the mixture. The resultant mixtures are investigated as described above. They are distinguished, in particular, by excellent heat stability.

Example 24

Mixture M-24:

| Composition Compound | | | |
|---|---|---|---|
| No. | Abbreviation | c/% | Physical properties |
| 1 | CCP-3-OT | 5.0 | T(N, I) = 100.4° C. |
| 2 | CPG-3-F | 4.0 | Δn (20° C., 589.3 nm) = 0.1173 |
| 3 | PUQU-3-F | 3.0 | Δn (25° C., 589.3 nm) = 0.1159 |
| 4 | CCGU-3-F | 7.5 | Δε (20° C., 1 kHz) = 3.6 |
| 5 | APUQU-2-F | 4.0 | Δε(25° C., 1 kHz) = 3.4 |
| 6 | PPGU-3-F | 0.5 | $\varepsilon_{av.}$ (20° C., 1 kHz) = t.b.d. |
| 7 | CC-3-V | 36.5 | $k_1$ (20° C.) = 16.0 pN |
| 8 | CCP-V-1 | 14.0 | $k_3$ (20° C.) = 18.3 pN |
| 9 | CCP-V2-1 | 5.0 | $\gamma_1$ (20° C.) = 90 mPa · s |
| 10 | CCP-3-1 | 1.5 | $V_0$ (20° C.) = 2.23 V |
| 11 | PP-1-2V1 | 6.5 | $V_{90}/V_{10}$ (20° C.) = t.b.d. |
| 12 | PGP-2-2V | 9.5 | |
| 13 | CPGP-5-2 | 1.5 | |
| 14 | CPGP-5-3 | 1.5 | |
| Σ | | 100.0 | |

50 ppm of the compound of the formula I-1-1a are added to the mixture. The resultant mixtures are investigated as described above. They are distinguished, in particular, by excellent heat stability.

Example 25

| | Mixture M-25: | | |
|---|---|---|---|
| | Composition Compound | | |
| No. | Abbreviation | c/% | Physical properties |
| 1 | CCU-3-F | 2.5 | T(N, I) = 74.5° C. |
| 2 | CCQU-3-F | 4.0 | $n_e$ (20° C., 589.3 nm) = 1.6066 |
| 3 | PUQU-3-F | 13.0 | $\Delta n$ (20° C., 589.3 nm) = 0.1200 |
| 4 | CPGU-3-OT | 1.5 | $\varepsilon_\parallel$ (20° C., 1 kHz) = 14.1 |
| 5 | APUQU-2-F | 3.0 | $\Delta\varepsilon$ (20° C., 1 kHz) = 10.6 |
| 6 | APUQU-3-F | 4.0 | $\varepsilon_{av.}$ (20° C., 1 kHz) = 7.0 |
| 7 | PGUQU-3-F | 3.0 | $k_1$ (20° C.) = 11.9 pN |
| 8 | PGUQU-4-F | 7.0 | $k_3$ (20° C.) = 12.6 pN |
| 9 | PGUQU-5-F | 3.0 | $\gamma_1$ (20° C.) = 70 mPa · s |
| 10 | CC-3-V | 40.5 | $V_0$ (20° C.) = 1.11 V |
| 11 | CCP-V-1 | 6.5 | $V_{90}/V_{10}$ (20° C.) = t.b.d. |
| 12 | PGP-1-2V | 2.0 | |
| 13 | PGP-2-2V | 8.0 | |
| 14 | PGP-3-2V | 2.0 | |
| Σ | | 100.0 | |

50 ppm of the compound of the formula I-1-1a are added to the mixture. The resultant mixtures are investigated as described above. They are distinguished, in particular, by excellent heat stability.

Example 26

| | Mixture M-26: | | |
|---|---|---|---|
| | Composition Compound | | |
| No. | Abbreviation | c/% | Physical properties |
| 1 | CCP-3-OT | 5.0 | T(N, I) = 76.5° C. |
| 2 | CCP-5-OT | 4.5 | $n_e$ (20° C., 589.3 nm) = 1.6085 |
| 3 | CCU-3-F | 4.0 | $\Delta n$ (20° C., 589.3 nm) = 0.1230 |
| 4 | CPU-3-F | 10.0 | $\varepsilon_\parallel$ (20° C., 1 kHz) = 13.6 |
| 5 | PUQU-3-F | 8.0 | $\Delta\varepsilon$ (20° C., 1 kHz) = 10.1 |
| 6 | PGUQU-3-F | 4.0 | $\varepsilon_{av.}$ (20° C., 1 kHz) = 6.9 |
| 7 | PGUQU-4-F | 8.0 | $k_1$ (20° C.) = 12.7 pN |
| 8 | PGUQU-5-F | 7.0 | $k_3$ (20° C.) = 12.2 pN |
| 9 | CC-3-V | 32.5 | $\gamma_1$ (20° C.) = 73 mPa · s |
| 10 | CC-3-V1 | 5.5 | $V_0$ (20° C.) = t.b.d. V |
| 11 | PGP-2-3 | 5.0 | $V_{90}/V_{10}$ (20° C.) = t.b.d. |
| 12 | PGP-2-5 | 4.0 | |
| 13 | PGP-2-2V | 2.5 | |
| Σ | | 100.0 | |

50 ppm of the compound of the formula I-1-1a are added to the mixture. The resultant mixtures are investigated as described above. They are distinguished, in particular, by excellent heat stability.

Example 27

| | Mixture M-27: | | |
|---|---|---|---|
| | Composition Compound | | |
| No. | Abbreviation | c/% | Physical properties |
| 1 | PUQU-3-F | 5.0 | T(N, I) = 99.6° C. |
| 2 | APUQU-2-F | 4.5 | $\Delta n$ (20° C., 589.3 nm) = 0.1230 |
| 3 | APUQU-3-F | 4.5 | $\Delta n$ (25° C., 589.3 nm) = 0.1224 |
| 4 | CDUQU-3-F | 5.0 | $\Delta\varepsilon$ (20° C., 1 kHz) = 5.4 |
| 5 | PPGU-3-F | 1.0 | $\Delta\varepsilon$ (25° C., 1 kHz) = 5.2 |
| 6 | CC-3-V | 36.0 | $\varepsilon_{av.}$ (20° C., 1 kHz) = 4.6 |
| 7 | CC-3-2V1 | 3.0 | $k_1$ (20° C.) = 16.7 pN |
| 8 | CCP-V-1 | 13.0 | $k_3$ (20° C.) = 18.1 pN |
| 9 | CCP-V2-1 | 5.0 | $\gamma_1$ (20° C.) = 95 mPa · s |
| 10 | CPP-3-2 | 3.0 | $V_0$ (20° C.) = t.b.d. V |
| 11 | PP-1-2V1 | 2.0 | $V_{90}/V_{10}$ (20° C.) = t.b.d. |
| 12 | PGP-1-2V | 5.0 | |
| 13 | PGP-2-2V | 5.0 | |
| 14 | PGP-2-3 | 4.0 | |
| 15 | CPGP-5-2 | 2.0 | |
| 16 | CPGP-5-3 | 2.0 | |
| Σ | | 100.0 | |

50 ppm of the compound of the formula I-1-1a are added to the mixture. The resultant mixtures are investigated as described above. They are distinguished, in particular, by excellent heat stability.

Example 28

| | Mixture M-28: | | |
|---|---|---|---|
| | Composition Compound | | |
| No. | Abbreviation | c/% | Physical properties |
| 1 | PUQU-3-F | 7.5 | T(N, I) = 98.8° C. |
| 2 | PGUQU-3-F | 6.0 | $n_e$ (20° C., 589.3 nm) = 1.7025 |
| 3 | PGUQU-4-F | 7.0 | $\Delta n$ (20° C., 589.3 nm) = 0.1957 |
| 4 | DGUQU-4-F | 4.0 | $\varepsilon_\parallel$ (20° C., 1 kHz) = 12.2 |
| 5 | CC-3-V | 15.0 | $\Delta\varepsilon$ (20° C., 1 kHz) = 8.6 |
| 6 | CP-3-O1 | 10.0 | $\varepsilon_{av.}$ (20° C., 1 kHz) = 6.5 |
| 7 | PP-1-2V1 | 5.0 | $k_1$ (20° C.) = 16.7 pN |
| 8 | PGP-1-2V | 13.0 | $k_3$ (20° C.) = 17.6 pN |
| 9 | PGP-2-2V | 16.0 | $\gamma_1$ (20° C.) = 138 mPa · s |
| 10 | PGP-3-2V | 12.0 | $V_0$ (20° C.) = 1.47 V |
| 11 | CPGP-5-2 | 4.5 | $V_{90}/V_{10}$ (20° C.) = t.b.d. |
| Σ | | 100.0 | |

40 ppm of the compound of the formula I-1-1a are added to the mixture. The resultant mixtures are investigated as described above. They are distinguished, in particular, by excellent heat stability.

Example 29

| | Mixture M-29: | | |
|---|---|---|---|
| | Composition Compound | | |
| No. | Abbreviation | c/% | Physical properties |
| 1 | PUQU-3-F | 11.5 | T(N, I) = 74.7° C. |
| 2 | CPGU-3-OT | 7.0 | $n_e$ (20° C., 589.3 nm) = 1.6156 |
| 3 | PPGU-3-F | 0.5 | $\Delta n$ (20° C., 589.3 nm) = 0.1245 |
| 4 | CC-3-V | 51.5 | $\varepsilon_\parallel$ (20° C., 1 kHz) = 6.8 |
| 5 | CCP-V-1 | 2.0 | $\Delta\varepsilon$ (20° C., 1 kHz) = 3.8 |

Mixture M-29:

| No. | Abbreviation | c/% | Physical properties |
|---|---|---|---|
| 6 | PGP-2-3 | 12.0 | $\varepsilon_{av.}$ (20° C., 1 kHz) = 4.3 |
| 7 | PGP-2-2V | 15.5 | $k_1$ (20° C.) = 12.1 pN |
| Σ |  | 100.0 | $k_3$ (20° C.) = 12.0 pN |
|  |  |  | $\gamma_1$ (20° C.) = 47 mPa · s |
|  |  |  | $V_0$ (20° C.) = 1.88 V |
|  |  |  | $V_{90}/V_{10}$ (20° C.) = t.b.d. |

40 ppm of the compound of the formula I-1-1a are added to the mixture. The resultant mixtures are investigated as described above. They are distinguished, in particular, by excellent heat stability.

Example 30

Mixture M-30:

| No. | Abbreviation | c/% | Physical properties |
|---|---|---|---|
| 1 | CCG-V-F | 4.0 | T(N, I) = 102.9° C. |
| 2 | CCGU-3-F | 3.0 | $n_e$ (20° C., 589.3 nm) = 1.5950 |
| 3 | CCQU-3-F | 14.0 | Δn (20° C., 589.3 nm) = 0.1091 |
| 4 | PUQU-3-F | 9.5 | $\varepsilon_\parallel$ (20° C., 1 kHz) = 9.0 |
| 5 | CPGU-3-OT | 3.0 | Δε (20° C., 1 kHz) = 6.0 |
| 6 | PGUQU-4-F | 3.0 | $\varepsilon_{av.}$ (20° C., 1 kHz) = 5.0 |
| 7 | CC-3-V | 23.5 | $k_1$ (20° C.) = 15.8 pN |
| 8 | CC-3-V1 | 8.0 | $k_3$ (20° C.) = 18.2 pN |
| 9 | CC-3-2V1 | 3.0 | $\gamma_1$ (20° C.) = 94 mPa · s |
| 10 | CCP-V-1 | 10.5 | $V_0$ (20° C.) = 1.70 V |
| 11 | CCP-V2-1 | 8.0 | $V_{90}/V_{10}$ (20° C.) = t.b.d. |
| 12 | PGP-2-2V | 4.5 |  |
| 13 | PGP-2-3 | 3.0 |  |
| 14 | CGPC-3-3 | 1.5 |  |
| 15 | CPGP-5-2 | 1.5 |  |
| Σ |  | 100.0 |  |

50 ppm of the compound of the formula I-1-1a are added to the mixture. The resultant mixtures are investigated as described above. They are distinguished, in particular, by excellent heat stability.

Example 31

Mixture M-31:

| No. | Abbreviation | c/% | Physical properties |
|---|---|---|---|
| 1 | CCP-3-OT | 5.5 | T(N, I) = 80.2° C. |
| 2 | CCU-3-F | 2.5 | $n_e$ (20° C., 589.3 nm) = 1.5823 |
| 3 | PUQU-3-F | 13.5 | Δn (20° C., 589.3 nm) = 0.1021 |
| 4 | CPGU-3-OT | 4.0 | $\varepsilon_\parallel$ (20° C., 1 kHz) = 15.7 |
| 5 | DPGU-4-F | 4.0 | Δε (20° C., 1 kHz) = 12.0 |
| 6 | APUQU-2-F | 4.5 | $\varepsilon_{av.}$ (20° C., 1 kHz) = 7.7 |
| 7 | APUQU-3-F | 8.0 | $k_1$ (20° C.) = 12.3 pN |
| 8 | CDUQU-3-F | 3.0 | $k_3$ (20° C.) = 14.0 pN |
| 9 | PGUQU-3-F | 4.0 | $\gamma_1$ (20° C.) = 79 mPa · s |

Mixture M-31:

| No. | Abbreviation | c/% | Physical properties |
|---|---|---|---|
| 10 | CC-3-V | 36.0 | $V_0$ (20° C.) = 1.06 V |
| 11 | CC-3-V1 | 6.5 | $V_{90}/V_{10}$ (20° C.) = t.b.d. |
| 12 | CCP-V-1 | 8.5 |  |
| Σ |  | 100.0 |  |

50 ppm of the compound of the formula I-1-1a are added to the mixture. The resultant mixtures are investigated as described above. They are distinguished, in particular, by excellent heat stability.

Example 32

Mixture M-32:

| No. | Abbreviation | c/% | Physical properties |
|---|---|---|---|
| 1 | CCP-3-OT | 4.5 | T(N, I) = 94.5° C. |
| 2 | CCGU-3-F | 2.5 | $n_e$ (20° C., 589.3 nm) = 1.5909 |
| 3 | PUQU-3-F | 6.0 | Δn (20° C., 589.3 nm) = 0.1088 |
| 4 | APUQU-2-F | 5.0 | $\varepsilon_\parallel$ (20° C., 1 kHz) = 14.4 |
| 5 | APUQU-3-F | 9.0 | Δε (20° C., 1 kHz) = 11.0 |
| 6 | PGUQU-4-F | 8.0 | $\varepsilon_{av.}$ (20° C., 1 kHz) = 7.1 |
| 7 | PGUQU-5-F | 7.0 | $k_1$ (20° C.) = 14.4 pN |
| 8 | CC-3-V | 28.0 | $k_3$ (20° C.) = 16.2 pN |
| 9 | CC-3-V1 | 13.0 | $\gamma_1$ (20° C.) = 91 mPa · s |
| 10 | CCP-V-1 | 10.0 | $V_0$ (20° C.) = 1.20 V |
| 11 | CCP-V2-1 | 7.0 | $V_{90}/V_{10}$ (20° C.) = t.b.d. |
| Σ |  | 100.0 |  |

50 ppm of the compound of the formula I-1-1a are added to the mixture. The resultant mixtures are investigated as described above. They are distinguished, in particular, by excellent heat stability.

Example 33

Mixture M-33:

| No. | Abbreviation | c/% | Physical properties |
|---|---|---|---|
| 1 | CCP-3-OT | 8.0 | T(N, I) = 89.0° C. |
| 2 | APUQU-2-F | 8.0 | $n_e$ (20° C., 589.3 nm) = 1.5888 |
| 3 | APUQU-3-F | 7.0 | Δn (20° C., 589.3 nm) = 0.1092 |
| 4 | PGUQU-3-F | 3.0 | $\varepsilon_\parallel$ (20° C., 1 kHz) = 18.8 |
| 5 | PGUQU-4-F | 9.0 | Δε (20° C., 1 kHz) = 15.1 |
| 6 | DPGU-4-F | 6.0 | $\varepsilon_{av.}$ (20° C., 1 kHz) = 8.7 |
| 7 | DGUQU-4-F | 8.0 | $k_1$ (20° C.) = 14.3 pN |
| 8 | CC-3-V | 33.5 | $k_3$ (20° C.) = 15.0 pN |
| 9 | CC-3-V1 | 12.0 | $\gamma_1$ (20° C.) = 91 mPa · s |
| 10 | CCP-V-1 | 4.0 | $V_0$ (20° C.) = 1.02 V |
| 11 | PP-1-2V1 | 1.5 | $V_{90}/V_{10}$ (20° C.) = t.b.d. |
| Σ |  | 100.0 |  |

50 ppm of the compound of the formula I-1-1a are added to the mixture. The resultant mixtures are investigated as described above. They are distinguished, in particular, by excellent heat stability.

Example 34

Mixture M-34:

| No. | Abbreviation | c/% | Physical properties |
|---|---|---|---|
| 1 | CPGU-3-OT | 3.5 | $T(N, I)$ = 75.5° C. |
| 2 | PPGU-3-F | 0.5 | $n_e$ (20° C., 589.3 nm) = 1.5857 |
| 3 | APUQU-2-F | 8.0 | $\Delta n$ (20° C., 589.3 nm) = 0.1028 |
| 4 | APUQU-3-F | 8.0 | $\varepsilon_\parallel$ (20° C., 1 kHz) = 9.3 |
| 5 | CDUQU-3-F | 1.5 | $\Delta\varepsilon$ (20° C., 1 kHz) = 6.2 |
| 6 | PGUQU-3-F | 4.0 | $\varepsilon_{av.}$ (20° C., 1 kHz) = 5.2 |
| 7 | CC-3-V | 52.0 | $k_1$ (20° C.) = 12.8 pN |
| 8 | CC-3-V1 | 10.0 | $k_3$ (20° C.) = 13.3 pN |
| 9 | PGP-2-3 | 3.5 | $\gamma_1$ (20° C.) = 53 mPa·s |
| 10 | PGP-2-4 | 9.0 | $V_0$ (20° C.) = 1.52 V |
| Σ | | 100.0 | $V_{90}/V_{10}$ (20° C.) = t.b.d. |

50 ppm of the compound of the formula I-1-1a are added to the mixture. The resultant mixtures are investigated as described above. They are distinguished, in particular, by excellent heat stability.

Example 35

Mixture M-35:

| No. | Abbreviation | c/% | Physical properties | | |
|---|---|---|---|---|---|
| 1 | APUQU-2-F | 5.5 | $T(N, I)$ = | 75.0 | ° C. |
| 2 | APUQU-3-F | 8.0 | $n_e$ (20° C., 589.3 nm) = | 1.5871 | |
| 3 | CDUQU-3-F | 1.0 | $\Delta n$ (20° C., 589.3 nm) = | 0.1025 | |
| 4 | CPGU-3-OT | 1.0 | $\varepsilon_\parallel$ (20° C., 1 kHz) = | 8.1 | |
| 5 | PGUQU-3-F | 5.0 | $\Delta\varepsilon$ (20° C., 1 kHz) = | 5.1 | |
| 6 | PPGU-3-F | 0.5 | $\varepsilon_{av.}$ (20° C., 1 kHz) = | 4.7 | |
| 7 | CC-3-V | 52.0 | $k_1$ (20° C.) = | 12.8 | pN |
| 8 | CC-3-V1 | 10.0 | $k_3$ (20° C.) = | 13.5 | pN |
| 9 | CCP-V-1 | 3.0 | $\gamma_1$ (20° C.) = | 51 | mPa·s |
| 10 | PGP-2-3 | 6.0 | $V_0$ (20° C.) = | 1.67 | V |
| 11 | PGP-2-4 | 8.0 | $V_{90}/V_{10}$ (20° C.) = | t.b.d. | |
| Σ | | 100.0 | | | |

50 ppm of the compound of the formula I-1-1a are added to the mixture. The resultant mixtures are investigated as described above. They are distinguished, in particular, by excellent heat stability.

Example 36

Mixture M-36:

| No. | Abbreviation | c/% | Physical properties | | |
|---|---|---|---|---|---|
| 1 | CPU-3-F | 5.0 | $T(N, I)$ = | 99.6 | ° C. |
| 2 | PUQU-3-F | 9.5 | $\Delta n$ (20° C., 589.3 nm) = | 0.1278 | |
| 3 | APUQU-3-F | 4.0 | $\Delta\varepsilon$ (20° C., 1 kHz) = | 5.2 | |
| 4 | PGUQU-3-F | 3.5 | $k_1$ (20° C.) = | 15.8 | pN |
| 5 | PPGU-3-F | 0.5 | $k_3$ (20° C.) = | 17.4 | pN |
| 6 | CC-3-V | 30.5 | $\gamma_1$ (20° C.) = | 96 | mPa·s |
| 7 | CC-3-V1 | 1.5 | $V_0$ (20° C.) = | 1.85 | V |
| 8 | CC-3-2V1 | 3.0 | | | |
| 9 | CCP-V-1 | 12.0 | | | |
| 10 | CCP-V2-1 | 7.0 | | | |
| 11 | CCP-3-3 | 1.5 | | | |
| 12 | PP-1-2V1 | 4.0 | | | |
| 13 | PGP-2-3 | 5.0 | | | |
| 14 | PGP-2-4 | 5.0 | | | |
| 15 | CPGP-4-3 | 2.0 | | | |
| 16 | CPGP-5-2 | 3.0 | | | |
| 17 | CPGP-5-3 | 3.0 | | | |
| Σ | | 100.0 | | | |

40 ppm of the compound of the formula I-1-1a are added to the mixture. The resultant mixtures are investigated as described above. They are distinguished, in particular, by excellent heat stability.

Example 37

Mixture M-37:

| No. | Abbreviation | c/% | Physical properties | | |
|---|---|---|---|---|---|
| 1 | PUQU-3-F | 10.0 | $T(N, I)$ = | 100.7 | ° C. |
| 2 | CPGU-3-OT | 5.5 | $\Delta n$ (20° C., 589.3 nm) = | 0.1193 | |
| 3 | CDUQU-3-F | 5.0 | $\Delta\varepsilon$ (20° C., 1 kHz) = | 5.3 | |
| 4 | PGUQU-3-F | 1.0 | $k_1$(20° C.) = | 15.9 | pN |
| 5 | PPGU-3-F | 0.5 | $k_3$(20° C.) = | 18.4 | pN |
| 6 | CC-3-V | 31.0 | $\gamma_1$ (20° C.) = | 83 | mPa·s |
| 7 | CC-3-V1 | 3.5 | $V_0$ (20° C.) = | 1.84 | V |
| 8 | CC-3-2V1 | 4.0 | | | |
| 9 | CCP-V-1 | 13.0 | | | |
| 10 | CCP-V2-1 | 12.5 | | | |
| 11 | PGP-1-2V | 7.0 | | | |
| 12 | PGP-2-2V | 7.0 | | | |
| Σ | | 100.0 | | | |

40 ppm of the compound of the formula I-1-1a are added to the mixture. The resultant mixtures are investigated as described above. They are distinguished, in particular, by excellent heat stability.

Example 38

Mixture M-38:

| No. | Abbreviation | c/% | Physical properties | | |
|---|---|---|---|---|---|
| 1 | PUQU-3-F | 12.0 | $T(N, I)$ = | 90.7 | ° C. |
| 2 | APUQU-2-F | 6.0 | $\Delta n$ (20° C., 589.3 nm) = | 0.1188 | |
| 3 | APUQU-3-F | 7.0 | $\Delta\varepsilon$ (20° C., 1 kHz) = | 9.8 | |
| 4 | CDUQU-3-F | 8.0 | $k_1$(20° C.) = | 14.3 | pN |
| 5 | PPGU-3-F | 1.0 | $k_3$(20° C.) = | 16.4 | pN |
| 6 | CC-3-V | 31.0 | $\gamma_1$ (20° C.) = | 78 | mPa·s |

-continued

Mixture M-38:

| No. | Abbreviation | c/% | Physical properties | | |
|---|---|---|---|---|---|
| 7 | CC-3-V1 | 3.0 | $V_0$ (20° C.) = | 1.28 | V |
| 8 | CC-3-2V1 | 3.0 | | | |
| 9 | CCP-3-1 | 2.0 | | | |
| 10 | CCP-V-1 | 12.0 | | | |
| 11 | PGP-2-3 | 4.5 | | | |
| 12 | PGP-1-2V | 4.5 | | | |
| 13 | PGP-2-2V | 4.5 | | | |
| 14 | CCPC-3-3 | 1.5 | | | |
| Σ | | 100.0 | | | |

40 ppm of the compound of the formula I-1-1a are added to the mixture. The resultant mixtures are investigated as described above. They are distinguished, in particular, by excellent heat stability.

Example 39

Mixture M-39:

| No. | Abbreviation | c/% | Physical properties | | |
|---|---|---|---|---|---|
| 1 | CCP-3-OT | 8.0 | T(N, I) = | 89.6 | ° C. |
| 2 | PUQU-2-F | 5.0 | Δn (20° C., 589.3 nm) = | 0.1192 | |
| 3 | PUQU-3-F | 1.5 | Δε (20° C., 1 kHz) = | 9.9 | |
| 4 | CPGU-3-OT | 6.0 | $k_1$(20° C.) = | 14.0 | pN |
| 5 | APUQU-2-F | 5.5 | $k_3$(20° C.) = | 14.7 | pN |
| 6 | APUQU-3-F | 5.0 | $γ_1$ (20° C.) = | 77 | mPa·s |
| 7 | CDUQU-3-F | 3.0 | $V_0$ (20° C.) = | 1.26 | V |
| 8 | PGUQU-3-F | 7.5 | | | |
| 9 | PPGU-3-F | 1.0 | | | |
| 10 | CC-3-V | 40.0 | | | |
| 11 | CC-3-V1 | 2.5 | | | |
| 12 | CCP-3-1 | 5.0 | | | |
| 13 | PGP-2-2V | 10.0 | | | |
| Σ | | 100.0 | | | |

40 ppm of the compound of the formula I-1-1a are added to the mixture. The resultant mixtures are investigated as described above. They are distinguished, in particular, by excellent heat stability.

Example 40

Mixture M-40:

| No. | Abbreviation | c/% | Physical properties | | |
|---|---|---|---|---|---|
| 1 | PGU-2-F | 3.0 | T(N, I) = | 94.8 | ° C. |
| 2 | PGU-3-F | 3.0 | Δn (20° C., 589.3 nm) = | 0.1965 | |
| 3 | PGIGI-3-F | 6.0 | Δε (20° C., 1 kHz) = | 9.9 | |
| 4 | PUQU-3-F | 13.0 | $k_1$(20° C.) = | 17.1 | pN |
| 5 | PGUQU-3-F | 4.0 | $k_3$(20° C.) = | 17.2 | pN |
| 6 | PGUQU-4-F | 4.0 | $γ_1$ (20° C.) = | 148 | mPa·s |
| 7 | PGUQU-5-F | 3.0 | $V_0$ (20° C.) = | 1.39 | V |
| 8 | PPGU-3-F | 1.0 | | | |

-continued

Mixture M-40:

| No. | Abbreviation | c/% | Physical properties |
|---|---|---|---|
| 9 | CC-3-V | 13.0 | |
| 10 | CP-3-O1 | 6.0 | |
| 11 | PP-1-2V1 | 10.0 | |
| 12 | PGP-1-2V | 10.0 | |
| 13 | PGP-2-2V | 13.0 | |
| 14 | CPGP-4-3 | 3.0 | |
| 15 | CPGP-5-2 | 4.0 | |
| 16 | CPGP-5-3 | 4.0 | |
| Σ | | 100.0 | |

40 ppm of the compound of the formula I-1-1a are added to the mixture. The resultant mixtures are investigated as described above. They are distinguished, in particular, by excellent heat stability.

Example 41

Mixture M-41:

| No. | Abbreviation | c/% | Physical properties | | |
|---|---|---|---|---|---|
| 1 | CCU-1-F | 9.0 | T(N, I) = | 91.2 | ° C. |
| 2 | CCU-2-F | 10.0 | Δn (20° C., 589.3 nm) = | 0.0709 | |
| 3 | CCU-3-F | 12.0 | Δε (20° C., 1 kHz) = | 9.5 | |
| 4 | CCU-5-F | 5.0 | $k_1$(20° C.) = | 10.3 | pN |
| 5 | CGU-2-F | 8.0 | $k_3$(20° C.) = | 13.2 | pN |
| 6 | CCQU-2-F | 12.0 | $γ_1$ (20° C.) = | 161 | mPa·s |
| 7 | CCQU-3-F | 12.0 | $V_0$ (20° C.) = | 1.10 | V |
| 8 | CCQU-5-F | 12.0 | | | |
| 9 | CC-3-4 | 9.0 | | | |
| 10 | CCZC-3-3 | 3.0 | | | |
| 11 | CCZC-3-5 | 3.0 | | | |
| 12 | CCZC-4-3 | 2.0 | | | |
| 13 | CCPC-3-4 | 3.0 | | | |
| Σ | | 100.0 | | | |

40 ppm of the compound of the formula I-1-1a are added to the mixture. The resultant mixtures are investigated as described above. They are distinguished, in particular, by excellent heat stability.

Example 42

Mixture M-42:

| No. | Abbreviation | c/% | Physical properties | | |
|---|---|---|---|---|---|
| 1 | CCP-3-OT | 5.0 | T(N, I) = | 95.1 | ° C. |
| 2 | CCP-5-OT | 2.5 | $n_e$ (20° C., 589.3 nm) = | 1.5900 | |
| 3 | APUQU-2-F | 2.0 | Δn (20° C., 589.3 nm) = | 0.1049 | |
| 4 | APUQU-3-F | 4.0 | $ε_∥$ (20° C., 1 kHz) = | 7.8 | |
| 5 | CDUQU-3-F | 8.0 | Δε (20° C., 1 kHz) = | 4.9 | |
| 6 | PGUQU-3-F | 3.0 | $ε_{av.}$(20° C., 1 kHz) = | 4.5 | |
| 7 | CC-3-V | 40.0 | $k_1$(20° C.) = | 15.6 | pN |
| 8 | CC-3-V1 | 7.0 | $k_3$(20° C.) = | 17.5 | pN |

-continued

Mixture M-42:

Composition Compound

| No. | Abbreviation | c/% | Physical properties | | |
|---|---|---|---|---|---|
| 9 | CCP-V-1 | 10.5 | $\gamma_1$ (20° C.) = | 67 | mPa·s |
| 10 | CCP-V2-1 | 5.0 | $V_0$ (20° C.) = | 1.87 | V |
| 11 | PGP-2-2V | 13.0 | | | |
| Σ | | 100.0 | | | |

50 ppm of the compound of the formula I-1-1a are added to the mixture. The resultant mixtures are investigated as described above. They are distinguished, in particular, by excellent heat stability.

Example 43

Mixture M-43:

Composition Compound

| No. | Abbreviation | c/% | Physical properties | | |
|---|---|---|---|---|---|
| 1 | CCG-V-F | 3.0 | T(N, I) = | 103 | ° C. |
| 2 | CCP-3-OT | 6.5 | $n_e$ (20° C., 589.3 nm) = | 1.6039 | |
| 3 | APUQU-3-F | 2.0 | $\Delta n$ (20° C., 589.3 nm) = | 0.1144 | |
| 4 | DGUQU-4-F | 3.5 | $\varepsilon_\parallel$ (20° C., 1 kHz) = | 7.6 | |
| 5 | PGUQU-3-F | 4.0 | $\Delta\varepsilon$ (20° C., 1 kHz) = | 4.7 | |
| 6 | PGUQU-4-F | 5.0 | $\varepsilon_{av.}$ (20° C., 1 kHz) = | 4.5 | |
| 7 | CC-3-V | 25.5 | $k_1$(20° C.) = | 16.5 | pN |
| 8 | CC-3-V1 | 8.5 | $k_3$(20° C.) = | 19.5 | pN |
| 9 | CP-3-O2 | 4.0 | $\gamma_1$ (20° C.) = | 82 | mPa·s |
| 10 | CPP-3-2 | 1.5 | $V_0$ (20° C.) = | 1.97 | V |
| 11 | CCP-V-1 | 14.5 | | | |
| 12 | CCP-V2-1 | 5.0 | | | |
| 13 | CCVC-3-V | 5.0 | | | |
| 14 | PP-1-2V1 | 4.0 | | | |
| 15 | PGP-1-2V | 6.0 | | | |
| 16 | PGP-2-2V | 2.0 | | | |
| Σ | | 100.0 | | | |

50 ppm of the compound of the formula I-1-1a are added to the mixture. The resultant mixtures are investigated as described above. They are distinguished, in particular, by excellent heat stability.

Example 44

Mixture M-44:

Composition Compound

| No. | Abbreviation | c/% | Physical properties | | |
|---|---|---|---|---|---|
| 1 | CCG-V-F | 1.0 | T(N, I) = | 105 | ° C. |
| 2 | CCP-3-OT | 6.5 | $n_e$ (20° C., 589.3 nm) = | t.b.d. | |
| 3 | APUQU-2-F | 3.0 | $\Delta n$ (20° C., 589.3 nm) = | t.b.d. | |
| 4 | APUQU-3-F | 3.0 | $\varepsilon_\parallel$ (20° C., 1 kHz) = | 7.6 | |
| 5 | PGUQU-3-F | 3.0 | $\Delta\varepsilon$ (20° C., 1 kHz) = | 4.7 | |
| 6 | PGUQU-4-F | 4.0 | $\varepsilon_{av.}$ (20° C., 1 kHz) = | 4.5 | |
| 7 | PGUQU-5-F | 3.0 | $k_1$(20° C.) = | 16.8 | pN |
| 8 | CC-3-V | 24.0 | $k_3$(20° C.) = | 19.5 | pN |
| 9 | CC-3-V1 | 8.5 | $\gamma_1$ (20° C.) = | t.b.d. | mPa·s |
| 10 | CP-3-O2 | 6.0 | $V_0$ (20° C.) = | 1.98 | V |
| 11 | CCP-V-1 | 15.0 | | | |
| 12 | CCP-V2-1 | 7.0 | | | |
| 13 | CCVC-3-V | 5.0 | | | |
| 14 | PP-1-2V1 | 2.5 | | | |
| 15 | PGP-1-2V | 3.5 | | | |
| 16 | PGP-2-2V | 5.0 | | | |
| Σ | | 100.0 | | | |

50 ppm of the compound of the formula I-1-1a are added to the mixture. The resultant mixtures are investigated as described above. They are distinguished, in particular, by excellent heat stability.

Example 45

Mixture M-45:

Composition Compound

| No. | Abbreviation | c/% | Physical properties | | |
|---|---|---|---|---|---|
| 1 | CCP-3-OT | 6.5 | T(N, I) = | 105 | ° C. |
| 2 | APUQU-2-F | 2.0 | $n_e$ (20° C., 589.3 nm) = | t.b.d. | |
| 3 | APUQU-3-F | 3.0 | $\Delta n$ (20° C., 589.3 nm) = | t.b.d. | |
| 4 | CDUQU-3-F | 4.0 | $\varepsilon_\parallel$ (20° C., 1 kHz) = | 7.6 | |
| 5 | PGUQU-3-F | 3.0 | $\Delta\varepsilon$ (20° C., 1 kHz) = | 4.7 | |
| 6 | PGUQU-4-F | 4.0 | $\varepsilon_{av.}$ (20° C., 1 kHz) = | 4.5 | |
| 7 | CC-3-V | 25.0 | $k_1$(20° C.) = | 17.0 | pN |
| 8 | CC-3-V1 | 8.5 | $k_3$(20° C.) = | 19.7 | pN |
| 9 | CP-3-O2 | 6.0 | $\gamma_1$ (20° C.) = | t.b.d. | mPa·s |
| 10 | CCP-V-1 | 15.0 | $V_0$ (20° C.) = | 1.99 | V |
| 11 | CCP-V2-1 | 4.5 | | | |
| 12 | CCVC-3-V | 5.0 | | | |
| 13 | PP-1-2V1 | 2.0 | | | |
| 14 | PGP-1-2V | 3.5 | | | |
| 15 | PGP-2-2V | 5.0 | | | |
| 16 | PGP-3-2V | 3.0 | | | |
| Σ | | 100.0 | | | |

50 ppm of the compound of the formula I-1-1a are added to the mixture. The resultant mixtures are investigated as described above. They are distinguished, in particular, by excellent heat stability.

Example 46

Mixture M-46:

Composition Compound

| No. | Abbreviation | c/% | Physical properties | | |
|---|---|---|---|---|---|
| 1 | CCQU-3-F | 5.0 | T(N, I) = | 74 | ° C. |
| 2 | PUQU-3-F | 12.5 | $n_e$ (20° C., 589.3 nm) = | 1.6056 | |
| 3 | CPGU-3-OT | 3.0 | $\Delta n$ (20° C., 589.3 nm) = | 0.1199 | |
| 4 | APUQU-2-F | 3.0 | $\varepsilon_\parallel$ (20° C., 1 kHz) = | 14.0 | |
| 5 | APUQU-3-F | 4.5 | $\Delta\varepsilon$ (20° C., 1 kHz) = | 10.4 | |
| 6 | PGUQU-3-F | 3.0 | $\varepsilon_{av.}$ (20° C., 1 kHz) = | 7.1 | |
| 7 | PGUQU-4-F | 6.5 | $k_1$(20° C.) = | t.b.d. | pN |

-continued

Mixture M-46:

Composition Compound

| No. | Abbreviation | c/% | Physical properties | | |
|---|---|---|---|---|---|
| 8 | PGUQU-5-F | 3.0 | $k_3$(20° C.) = | t.b.d. | pN |
| 9 | CC-3-V | 43.0 | $\gamma_1$ (20° C.) = | t.b.d. | mPa·s |
| 10 | CCP-V-1 | 4.5 | $V_0$ (20° C.) = | t.b.d. | V |
| 11 | PGP-1-2V | 2.5 | | | |
| 12 | PGP-2-2V | 7.5 | | | |
| 13 | PGP-3-2V | 2.0 | | | |
| Σ | | 100.0 | | | |

50 ppm of the compound of the formula I-1-1a are added to the mixture. The resultant mixtures are investigated as described above. They are distinguished, in particular, by excellent heat stability.

Example 47

Mixture M-47:

Composition Compound

| No. | Abbreviation | c/% | Physical properties | | |
|---|---|---|---|---|---|
| 1 | CCU-2-F | 7.5 | T(N, I) = | 83 | ° C. |
| 2 | CCU-3-F | 10.0 | $n_e$ (20° C., 589.3 nm) = | 1.5928 | |
| 3 | CCQU-2-F | 3.0 | $\Delta n$ (20° C., 589.3 nm) = | 0.1103 | |
| 4 | CCQU-3-F | 4.0 | $\varepsilon_\parallel$ (20° C., 1 kHz) = | 16.7 | |
| 5 | PUQU-3-F | 8.0 | $\Delta\varepsilon$ (20° C., 1 kHz) = | 13.1 | |
| 6 | APUQU-2-F | 6.0 | $\varepsilon_{av.}$(20° C., 1 kHz) = | 8.0 | |
| 7 | APUQU-3-F | 6.5 | $k_1$(20° C.) = | 12.9 | pN |
| 8 | PGUQU-3-F | 4.0 | $k_3$(20° C.) = | 12.7 | pN |
| 9 | PGUQU-4-F | 6.5 | $\gamma_1$ (20° C.) = | 94 | mPa·s |
| 10 | CC-3-V | 15.0 | $V_0$ (20° C.) = | 1.04 | V |
| 11 | CC-3-V1 | 8.0 | | | |
| 12 | CC-3-4 | 8.0 | | | |
| 13 | CCP-V-1 | 7.0 | | | |
| 14 | PGP-2-2V | 6.5 | | | |
| Σ | | 100.0 | | | |

50 ppm of the compound of the formula I-1-1a are added to the mixture. The resultant mixtures are investigated as described above. They are distinguished, in particular, by excellent heat stability.

Example 48

Mixture M-48:

Composition Compound

| No. | Abbreviation | c/% | Physical properties | | |
|---|---|---|---|---|---|
| 1 | CPU-3-F | 7.0 | T(N, I) = | 100.8 | ° C. |
| 2 | CCQU-3-F | 10.0 | $n_e$ (20° C., 589.3 nm) = | 1.5924 | |
| 3 | CCGU-3-F | 6.0 | $\Delta n$ (20° C., 589.3 nm) = | 0.1080 | |
| 4 | PGUQU-3-F | 2.0 | $\varepsilon_\parallel$ (20° C., 1 kHz) = | 8.6 | |
| 5 | PGUQU-4-F | 6.0 | $\Delta\varepsilon$ (20° C., 1 kHz) = | 5.8 | |
| 6 | PGUQU-5-F | 2.5 | $\varepsilon_{av.}$(20° C., 1 kHz) = | 4.7 | |
| 7 | PPGU-3-F | 0.5 | $k_1$(20° C.) = | 15.5 | pN |
| 8 | CC-3-V | 34.5 | $k_3$(20° C.) = | 18.3 | pN |
| 9 | CC-3-V1 | 8.0 | $\gamma_1$ (20° C.) = | 87 | mPa·s |

Mixture M-48:

Composition Compound

| No. | Abbreviation | c/% | Physical properties | | |
|---|---|---|---|---|---|
| 10 | CC-3-2V1 | 3.0 | $V_0$ (20° C.) = | 1.72 | V |
| 11 | CCP-V-1 | 5.5 | | | |
| 12 | CCP-V2-1 | 5.5 | | | |
| 13 | CPPC-3-3 | 1.5 | | | |
| 14 | PGP-2-2V | 5.0 | | | |
| 15 | CPGP-5-2 | 3.0 | | | |
| Σ | | 100.0 | | | |

50 ppm of the compound of the formula I-1-1a are added to the mixture. The resultant mixtures are investigated as described above. They are distinguished, in particular, by excellent heat stability.

Example 49

Mixture M-49:

Composition Compound

| No. | Abbreviation | c/% | Physical properties | | |
|---|---|---|---|---|---|
| 1 | CCU-2-F | 2.0 | T(N, I) = | 82.5 | ° C. |
| 2 | CCU-3-F | 7.0 | $n_e$ (20° C., 589.3 nm) = | 1.5921 | |
| 3 | CCQU-2-F | 2.0 | $\Delta n$ (20° C., 589.3 nm) = | 0.1101 | |
| 4 | CCQU-3-F | 7.0 | $\varepsilon_\parallel$ (20° C., 1 kHz) = | 16.5 | |
| 5 | PUQU-3-F | 8.0 | $\Delta\varepsilon$ (20° C., 1 kHz) = | 12.9 | |
| 6 | APUQU-2-F | 7.0 | $\varepsilon_{av.}$(20° C., 1 kHz) = | 7.9 | |
| 7 | APUQU-3-F | 7.0 | $k_1$(20° C.) = | 12.6 | pN |
| 8 | PGUQU-3-F | 4.0 | $k_3$(20° C.) = | 13.0 | pN |
| 9 | PGUQU-4-F | 7.5 | $\gamma_1$ (20° C.) = | 88 | mPa·s |
| 10 | CC-3-V | 25.0 | $V_0$ (20° C.) = | 1.04 | V |
| 11 | CC-3-V1 | 3.0 | $V_{90}/V_{10}$ (20° C.) = | t.b.d. | |
| 12 | CC-3-4 | 6.0 | | | |
| 13 | CCP-V-1 | 9.0 | | | |
| 14 | PGP-2-2V | 5.5 | | | |
| Σ | | 100.0 | | | |

50 ppm of the compound of the formula I-1-1a are added to the mixture. The resultant mixtures are investigated as described above. They are distinguished, in particular, by excellent heat stability.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A liquid-crystal medium having positive dielectric anisotropy, which comprises
a) one or more compounds of the formula I,

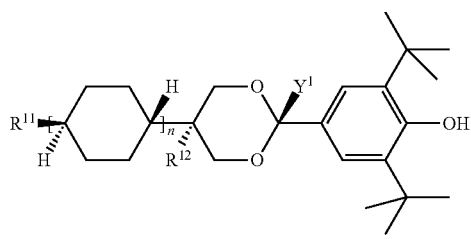

I in which
n denotes 1,
$R^{11}$ denotes H, F, Cl, a straight-chain or branched alkyl chain having 1-20 C atoms, in which one —CH$_2$— group or a plurality of —CH$_2$— groups may be replaced by —O—, —C(=O)— or

but two adjacent —CH$_2$— groups cannot be replaced by —O—, a hydrocarbon radical which contains a cycloalkanediyl unit or an alkylcycloalkanediyl unit, and in which one —CH$_2$— group or a plurality of —CH$_2$— groups may be replaced by —O— or —C(=O)—, but two adjacent —CH$_2$— groups cannot be replaced by —O—,
$R^{12}$ denotes H, F, Cl, CN, CF$_3$, OCF$_3$ or a straight-chain or branched alkyl chain having 1-20 C atoms, in which one —CH$_2$— group or a plurality of —CH$_2$— groups may be replaced by —O— or —C(=O)—, but two adjacent —CH$_2$—groups cannot be replaced by —O—,
$Y^1$ denotes H, F, Cl, CN, CF$_3$, OCF$_3$ or a straight-chain or branched alkyl chain having 1-20 C atoms, in which one —CH$_2$— group or a plurality of —CH$_2$— groups may be replaced by —O— or —C(=O)—, but two adjacent —CH$_2$— groups cannot be replaced by —O—, and

on each appearance, independently of one another, denotes

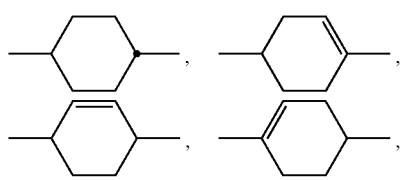

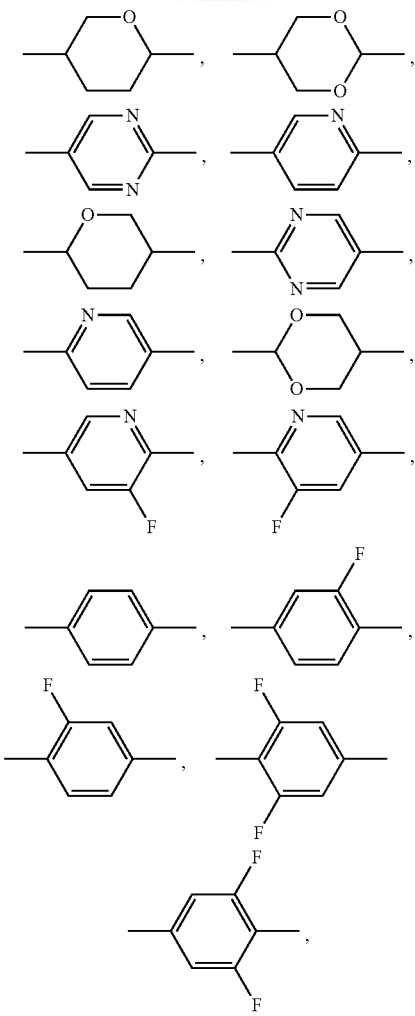

where, in the case of cyclohexanediyl and in the case of the cyclohexenediyl units, one or more H atoms may also be replaced, independently of one another, by F, Cl or CN, and b) one or more compounds selected from the group of the compounds of the formulae II-2h, II-2k, III-2d, III-2e and III-2k II-2h

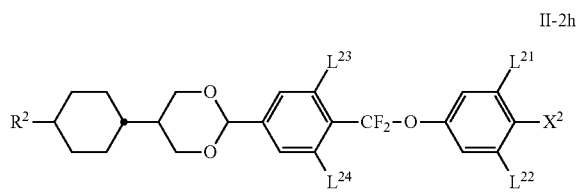

II-2k

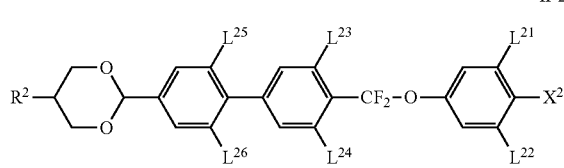

-continued

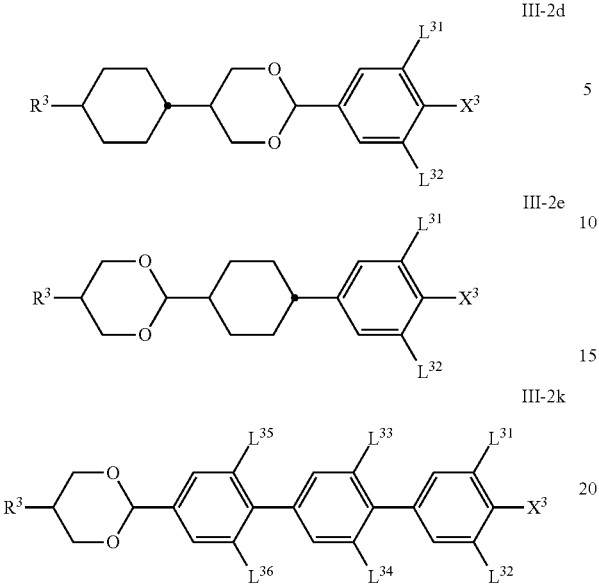

in which
R² and R³, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,
$L^{21}$, $L^{22}$, $L^{23}$, $L^{24}$, $L^{25}$, $L^{26}$, $L^{31}$, $L^{32}$, $L^{33}$, $L^{34}$, $L^{35}$ and $L^{36}$, independently of one another, denote H or F, and
X² and X³, independently of one another, denote halogen, halogenated alkyl or alkoxy having 1 to 3 C atoms or halogenated alkenyl or alkenyloxy having 2 or 3 C atoms and
one or more dielectrically neutral compounds of the formula V,

V

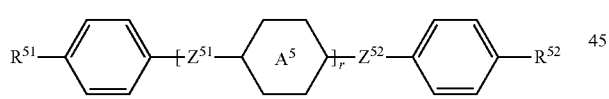

in which
R⁵¹ and R⁵², independently of one another, have the meaning indicated for R² and R³,

on each occurrence, independently of one another, denotes

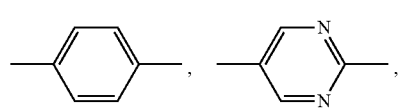

-continued

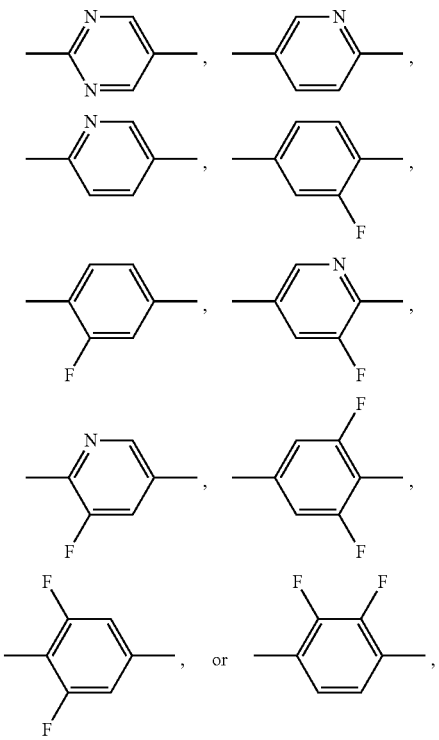

$Z^{51}$ and $Z^{52}$, independently of one another and, if $Z^{51}$ occurs twice, also these independently of one another, denote —CH₂CH₂—, —COO—, trans-CH=CH—, trans-CF=CF—, —CH₂O—, —CF₂O— or a single bond, and
r denotes 0, 1 or 2.

2. A medium according to claim 1, which additionally comprises one or more compounds selected from the group of the compounds of the formulae II and III, other than a compound of formulae II-2h, II-2k, III-2d, III-2e and III-2k,

II

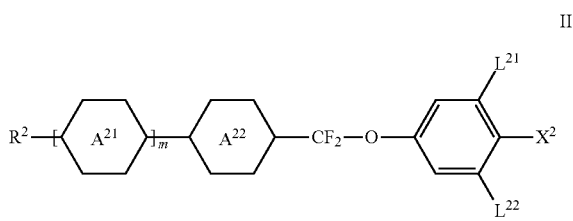

III

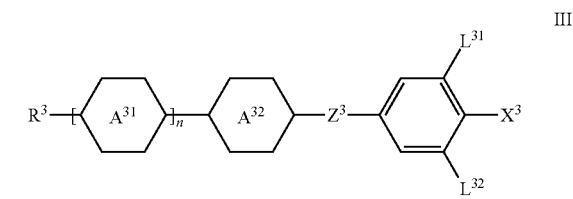

in which
R² and R³, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

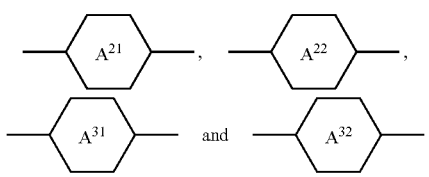

on each appearance, independently of one another, denote

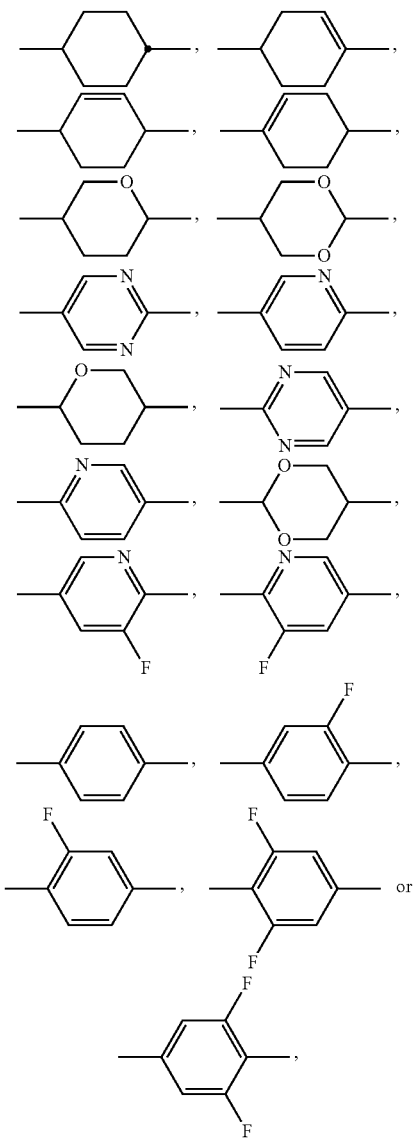

$L^{21}$, $L^{22}$, $L^{31}$ and $L^{32}$, independently of one another, denote H or F, $X^2$ and $X^3$, independently of one another, denote halogen, halogenated alkyl or alkoxy having 1 to 3 C atoms or halogenated alkenyl or alkenyloxy having 2 or 3 C atoms, $Z^3$ denotes —CH$_2$CH$_2$—, —CF$_2$CF$_2$—, —COO—, trans-CH=CH—, trans-CF=CF—, —CH$_2$O— or a single bond, and m and n, independently of one another, denote 0, 1, 2 or 3.

3. A medium according to claim 1, which additionally comprises
one or more compounds of the formula IV

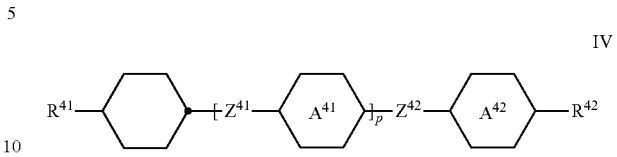

IV in which
$R^{41}$ and $R^{42}$, independently of one another, have the meaning indicated for $R^2$ above claim 1,

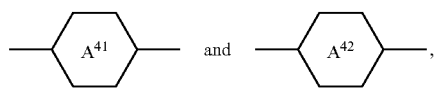

independently of one another, and, if

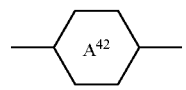

occurs twice, also these independently of one another, denote

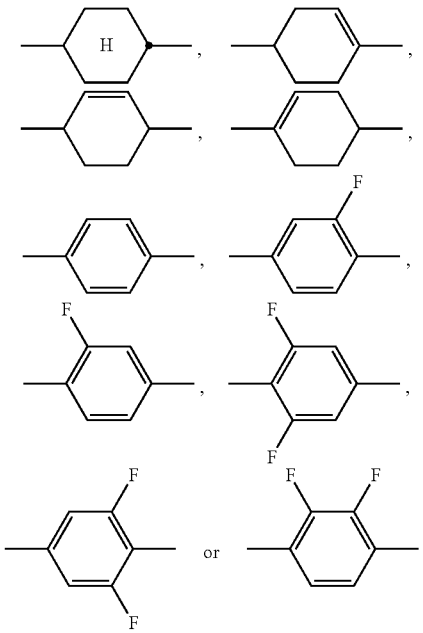

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

4. A medium according to claim 1, wherein the total concentration of the compounds of the formula I in the medium is in the range from 1 ppm to 20,000 ppm.

5. A medium according to claim 1, wherein the compounds of the formula I are compounds selected from the group of the compounds of the formula I-2,

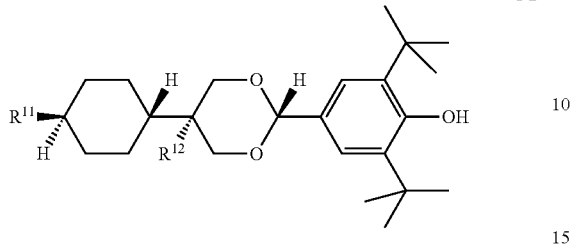

I-2 in which the parameters have the meanings indicated in claim 1 under formula I.

6. A medium according to claim 2, which comprises one or more compounds of the formula II.

7. A medium according claim 2, which comprises one or more compounds of the formula III.

8. A liquid-crystal display, which contains a medium according to claim 1.

9. A display according to claim 8 which is addressed by an active matrix.

10. A method which comprises including a medium according to claim 1 in a liquid-crystal display.

11. A process for the preparation of a medium according to claim 1, wherein one or more compounds of the formula I, as given in claim 1, are mixed with
   one or more of the compounds of the formulae II-2h, II-2k, III-2d, III-2e and III-2k as given in claim 1,
   one or more compounds of formula V as given in claim 1 and optionally
   one or more further mesogenic compounds and/or
   one or more additives.

12. A medium of claim 1 which comprises one or more compounds of the formula I, and one or more compounds selected from the group of the compounds of the formulae II-2h.

13. A medium of claim 1 which comprises one or more compounds of the formula I, and one or more compounds selected from the group of the compounds of the formulae II-2h and II-2k.

14. A medium of claim 1 which comprises one or more compounds of the formula I, and one or more compounds selected from the group of the compounds of the formulae III-2d, III-2e and III-2k.

15. A liquid-crystal medium having positive dielectric anisotropy, which comprises
   a) one or more compounds of the formula I, in an amount of 100 ppm or more effective to stabilize the voltage holding ratio of the mixture in response to exposure to elevated temperature,

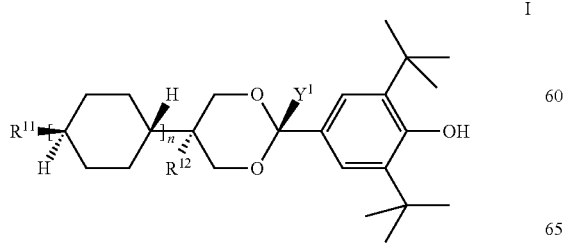

I in which
n denotes 1,
$R^{11}$ denotes H, F, Cl, a straight-chain or branched alkyl chain having 1-20 C atoms, in which one —$CH_2$— group or a plurality of —$CH_2$— groups may be replaced by —O—, —C(=O)— or

but two adjacent —$CH_2$—groups cannot be replaced by —O—, a hydrocarbon radical which contains a cycloalkanediyl unit or an alkylcycloalkanediyl unit, and in which one —$CH_2$— group or a plurality of —$CH_2$— groups may be replaced by —O— or —C(=O)—, but two adjacent —$CH_2$— groups cannot be replaced by —O—, $R^{12}$ denotes H, F, Cl, CN, $CF_3$, $OCF_3$ or a straight-chain or branched alkyl chain having 1-20 C atoms, in which one —$CH_2$— group or a plurality of —$CH_2$— groups may be replaced by —O— or —C(=O)—, but two adjacent —$CH_2$—groups cannot be replaced by —O—, $Y^1$ denotes H, F, Cl, CN, $CF_3$, $OCF_3$ or a straight-chain or branched alkyl chain having 1-20 C atoms, in which one —$CH_2$— group or a plurality of —$CH_2$— groups may be replaced by —O— or —C(=O)—, but two adjacent —$CH_2$—groups cannot be replaced by —O—, and

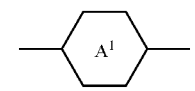

on each appearance, independently of one another, denotes

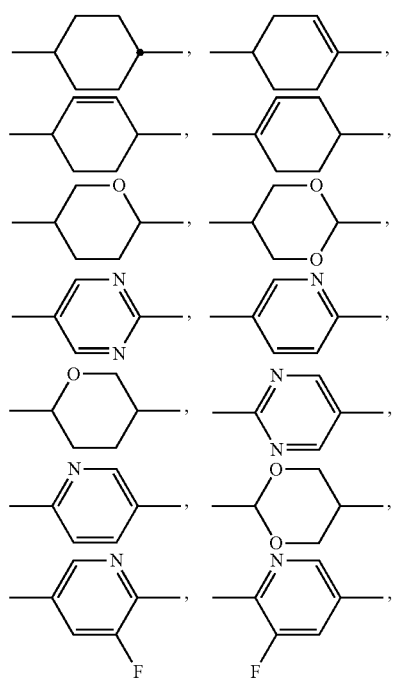

-continued

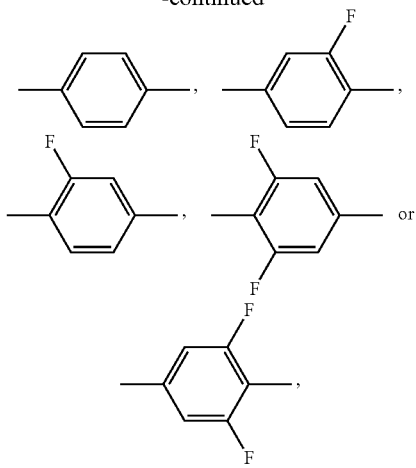

where, in the case of cyclohexanediyl and in the case of the cyclohexenediyl units, one or more H atoms may also be replaced, independently of one another, by F, Cl or CN, and b) one or more compounds selected from the group of the compounds of the formulae II-2h, II-2k, III-2d, III-2e and III-2k

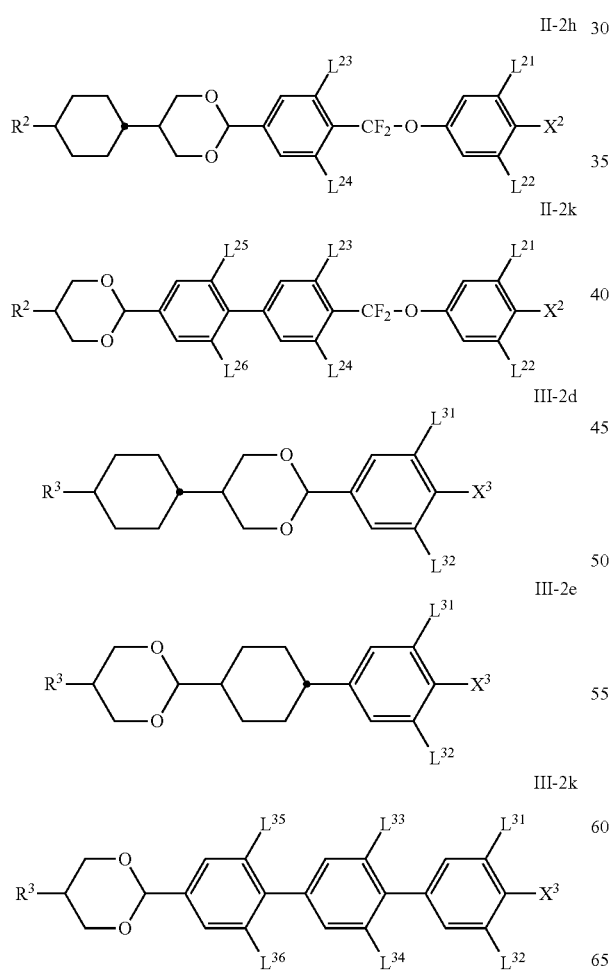

in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, $L^{21}$, $L^{22}$, $L^{23}$, $L^{24}$, $L^{25}$, $L^{26}$, $L^{31}$, $L^{32}$, $L^{33}$, $L^{34}$, $L^{35}$ and $L^{36}$, independently of one another, denote H or F, and $X^2$ and $X^3$, independently of one another, denote halogen, halogenated alkyl or alkoxy having 1 to 3 C atoms or halogenated alkenyl or alkenyloxy having 2 or 3 C atoms and one or more dielectrically neutral compounds of the formula V,

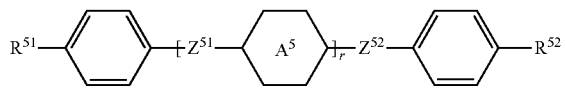

in which $R^{51}$ and $R^{52}$, independently of one another, have the meaning indicated for $R^2$ and $R^3$,

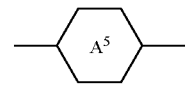

on each occurrence, independently of one another, denotes

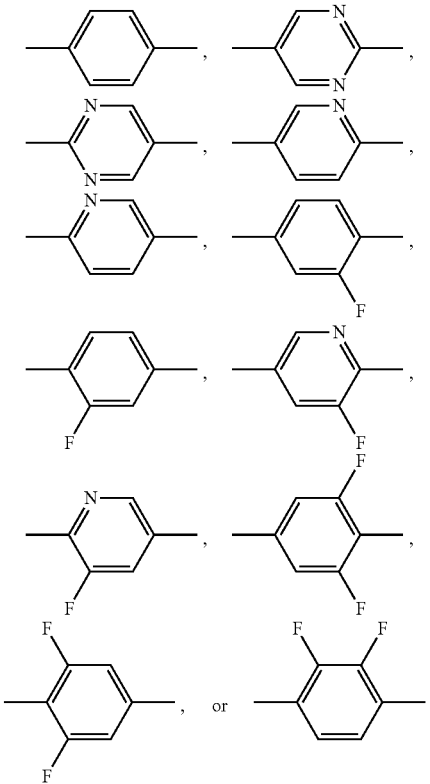

$Z^{51}$ and $Z^{52}$, independently of one another and, if $Z^{51}$ occurs twice, also these independently of one another, denote —$CH_2CH_2$—, —COO—, trans-CH=CH—, trans-CF=CF—, —$CH_2O$—, —$CF_2O$— or a single bond, and r denotes 0, 1 or 2.

* * * * *